(12) United States Patent
Hsu et al.

(10) Patent No.: US 8,908,288 B2
(45) Date of Patent: Dec. 9, 2014

(54) IMAGE CAPTURING OPTICAL LENS ASSEMBLY

(71) Applicant: Largan Precision Co., Ltd., Taichung (TW)

(72) Inventors: Chih-Wen Hsu, Taichung (TW); Tsung-Han Tsai, Taichung (TW); Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 286 days.

(21) Appl. No.: 13/661,296

(22) Filed: Oct. 26, 2012

(65) Prior Publication Data

US 2013/0321932 A1 Dec. 5, 2013

(30) Foreign Application Priority Data

Jun. 5, 2012 (TW) .............................. 101120133 A

(51) Int. Cl.
*G02B 13/18* (2006.01)
*G02B 3/02* (2006.01)
*G02B 9/60* (2006.01)

(52) U.S. Cl.
USPC .......................................... 359/714; 359/767

(58) Field of Classification Search
CPC ....... G02B 13/0045; G02B 13/18; G02B 9/60
USPC .......................................... 359/767, 763, 714
See application file for complete search history.

(56) References Cited

U.S. PATENT DOCUMENTS

2011/0157724 A1 6/2011 Baba
2012/0314304 A1* 12/2012 Huang .......................... 359/759

FOREIGN PATENT DOCUMENTS

JP 2009-294528 A 12/2009

* cited by examiner

*Primary Examiner* — Ali M Harrington
(74) *Attorney, Agent, or Firm* — CKC & Partners Co., Ltd.

(57) ABSTRACT

An image capturing optical lens assembly includes, in order from an object side to an image side, a first lens element, a second lens element, a third lens element, a fourth lens element and a fifth lens element. The first lens element has positive refractive power. The second lens element has positive refractive power. The third lens element has negative refractive power. The fourth lens element has positive refractive power. The fifth lens element with negative refractive power is made of plastic material, and has an image-side surface being concave at a paraxial region and being convex at a peripheral region, wherein at least one of an object-side surface and the image-side surface of the fifth lens element is aspheric.

30 Claims, 29 Drawing Sheets

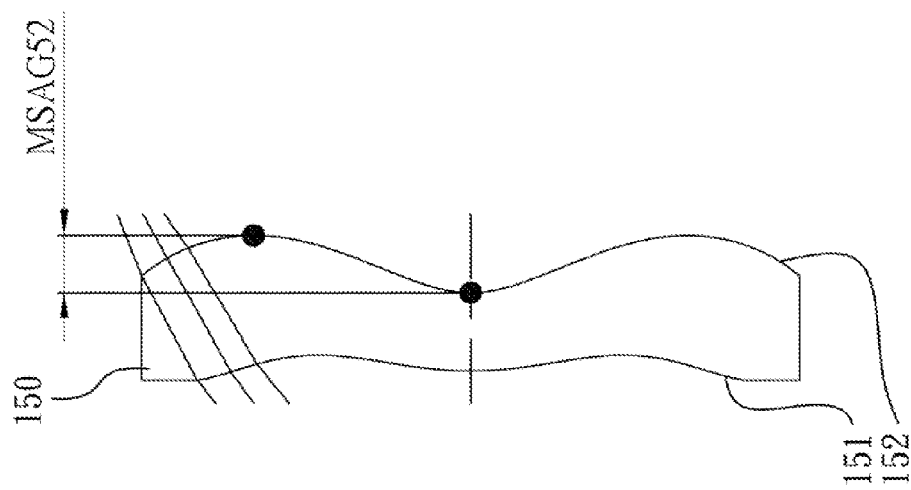

IMAGE CAPTURING OPTICAL LENS ASSEMBLY

RELATED APPLICATIONS

The application claims priority to Taiwan Application Serial Number 101120133, filed Jun. 5, 2012, which is herein incorporated by reference.

BACKGROUND

1. Technical Field

The present invention relates to an image capturing optical lens to assembly. More particularly, the present invention relates to a compact image capturing optical lens assembly applicable to electronic products and three-dimensional (3D) image applications thereof.

2. Description of Related Art

In recent years, with the popularity of mobile products with camera functionalities, the demand of miniaturized optical lens systems is increasing. The sensor of a conventional photographing camera is typically a CCD (Charge-Coupled Device) or a CMOS (Complementary Metal-Oxide Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a structure of four-element lens such as the one disclosed in U.S. Pat. No. 7,869,142. Due to the popularity of mobile products with high-end specifications, such as smart phones and PDAs (Personal Digital Assistants), the requirements for high resolution and image quality of modern compact optical lens systems has been increasing significantly. However, the conventional four-element lens structure cannot satisfy these requirements of the compact optical lens system.

Although other conventional optical lens systems with five-element lens structure such as the ones disclosed in U.S. Pat. No. 8,000,030 enhances image quality; however, the optical lens system has a first lens element with positive refractive power and a second lens element with negative refractive power, so that the telephoto functionality cannot be obtained. Therefore, the total track length of the optical lens system cannot be reduced easily and will be hard to apply to the compact electronic products.

SUMMARY

According to one aspect of the present disclosure, an mage capturing optical lens assembly includes, in order from an object side to an image side, a first lens element, a second lens element, a third lens element, a fourth lens element and a fifth lens element. The first lens element has positive refractive power. The second lens element has positive refractive power. The third lens element has negative refractive power. The fourth lens element has positive refractive power. The fifth lens element with negative refractive power is made of plastic material, and has an image-side surface being concave at a paraxial region and being convex at a peripheral region, wherein at least one of an object-side surface and the image-side surface of the fifth lens element is aspheric. When a focal length of the first lens element is f1, a focal length of the second lens element is f2, a focal length of the fourth lens element is f4, a focal length of the image capturing optical lens assembly is f, and a curvature radius of an image-side surface of the third lens element is R6, the following relationships are satisfied:

$0 < f2/f1 < 0.90;$ $0 < f4/f1 < 0.30;$ and $-0.35 < f/R6 \leq 0.85.$

According to another aspect of the present disclosure, an image to capturing optical lens assembly includes, in order from an object side to an image side, a first lens element, a second lens element, a third lens element, a fourth lens element and a fifth lens element. The first lens element has positive refractive power. The second lens element has positive refractive power. The third lens element has negative refractive power. The fourth lens element has positive refractive power. The fifth lens element with negative refractive power made of plastic material, and has an image-side surface being concave at a paraxial region and being convex at a peripheral region, wherein at least one of an object-side surface and the image-side surface of the fifth lens element is aspheric. When a focal length of the first lens element is Edi f1, a focal length of the second lens element is f2, an axial distance between the third lens element and the fourth lens element is T34, an axial distance between the fourth lens element and the fifth lens element is T45, a central thickness of the fourth lens element is CT4, a focal length of the image capturing optical lens assembly is f, and a curvature radius of an image-side surface of the third lens element is R6, the following relationships are satisfied:

$0 < f2/f1 < 0.90;$ $0 < (T34+T45)/CT4 < 1.0;$ and $-0.35 < f/R6 \leq 0.85.$

According to yet another aspect of the present disclosure, an image capturing optical lens assembly includes, in order from an object side to an image side, a first lens element, a second lens element, a third lens element, a fourth lens element and a fifth lens element. The first lens element has positive refractive power. The second lens element with positive refractive power has an object-side surface being convex at a paraxial region. The third to lens element with negative refractive power has an object-side surface being concave at a paraxial region. The fourth lens element with positive refractive power is made of plastic material, and has an object-side surface being concave at a paraxial region and an image-side surface being convex at a paraxial region, wherein the object-side surface and the image-side surface of the fourth lens element are aspheric. The fifth lens element with negative refractive power made of plastic material, and has an image-side surface being concave at a paraxial region and being convex at a peripheral region, wherein at least one of an object-side surface and the image-side surface of the fifth lens element is aspheric. The image capturing optical lens assembly further includes a stop located between an object and the second lens element. When a focal length of the first lens element is f1 a focal length of the second lens element is f2, a focal length of the fourth lens element is f4, a focal length of the image capturing optical lens assembly is f, and a curvature radius of an image-side surface of the third lens element is R6, the following relationships are satisfied:

$0 \leq f2/f1 < 0.90;$ $0 < f4/f1 < 0.30;$ and $-0.85 \leq f/R6 \leq 0.85.$

BRIEF DESCRIPTION OF THE DRAWINGS

The invention can be more fully understood by reading the following detailed description of the embodiment, with reference made to the accompanying drawings as follows:

FIG. 29 shows MSAG52 of the fifth lens element of the image capturing optical lens assembly as illustrated in FIG. 1.

DETAILED DESCRIPTION

Figure 1:
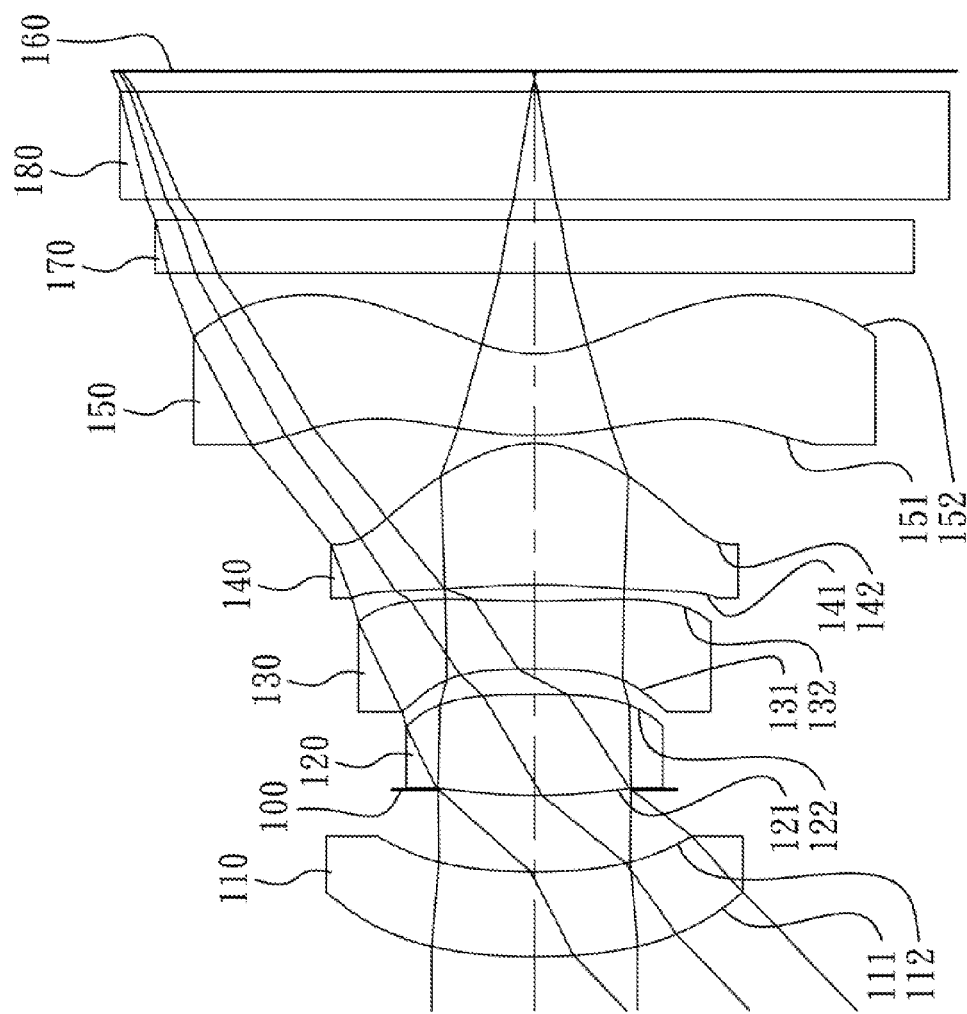
FIG. 1 is a schematic view of an image capturing optical lens assembly to according to the 1st embodiment of the present disclosure.

An image capturing optical lens assembly includes, in order from an object side to an image side, a first lens element, a second lens element, a third lens element, a fourth lens element and a fifth lens element.

The first lens element with positive refractive power provides the required refractive power for the image capturing optical lens assembly.

The second lens element with positive efractive power can enhance the telephoto functionality of the image capturing optical lens assembly by combining with the positive refractive power of the first lens element for reducing the total track length thereof. The second lens element can have an abject-side surface being convex at a paraxial region and an image-side surface being convex at a paraxial region, so that the telephoto functionality can be enhanced by properly adjusting the positive refractive power of the second lens element.

The third lens element with negative refractive power can correct the aberration generated from the first lens element and the second lens element which have positive refractive power. The third lens element can have an object-side surface being concave at a paraxial region and an image-side surface being convex at a peripheral region, so that the astigmatism of the image capturing optical lens assembly can be corrected.

The fourth lens element with positive refractive power balances the distribution of the positive refractive power of the first lens element and the second lens element, so that the sensitivity of the image capturing optical lens assembly can be reduced. The fourth lens element can have an object-side surface being concave at a paraxial region and an image-side surface being convex at a paraxial region, so that the astigmatism of the image capturing optical lens assembly can be corrected.

The fifth lens element has negative refractive power, so that the principal point of the image capturing optical lens assembly can be positioned away from an image plane, and the total track length of the image capturing optical lens assembly can be reduced while the back focal length be reduced so as to maintain the compact size of the image capturing optical lens assembly. The fifth lens element can have an object-side surface being convex at a paraxial region, and an image-side surface being concave at a paraxial region and being convex at a peripheral region, thus the angle at which the incident light projects onto an image sensor from the off-axis field can be effectively reduced, and the aberration of the off-axis field can be further corrected.

When a focal length of the first lens element is f1, and a focal length of the second lens element is f2, the following relationship is satisfied:

$$0 < f2/f1 < 0.90.$$

Therefore, the refractive angle of the incident light projecting onto the image capturing optical lens assembly can be effectively reduced, so that the excessive aberration of the image capturing optical lens assembly can be effectively avoided and the stray light can be reduced.

f1 and f2 can further satisfy the following relationship:

$$0 < f2/f1 < 0.50.$$

When the focal length of the first lens element is f1, and a focal length of the fourth lens element is f4, the following relationship is satisfied:

$$0 < f4/f1 < 0.30,$$

Therefore, the sensitivity of the image capturing optical lens assembly can be reduced by balancing the distribution of the positive refractive power of the fourth lens element.

When a focal length of the image capturing optical lens assembly is f, and a curvature radius of the image-side surface of the third lens element is R6, the following relationship is satisfied:

$$-0.85 \le f/R6 \le 0.85,$$

Therefore, the aberration generated from the first lens element and the second lens element can be corrected by properly adjusting the curvature of the image-side surface of the third lens element.

f and R6 can further satisfy the following relationship:

$$-0.35 < f/R6 \le 0.85.$$

Furthermore, f and R6 can better satisfy the following relationship:

$$0 < f/R6 < 0.85.$$

When a distance in parallel with an optical axis from a critical point on the image-side surface of the fifth lens element to an axial vertex on the image-side surface of the fifth lens element is WISAG52, and a central thickness of the fifth lens element is CT5, the following relationship is satisfied:

$$0.4 < MSAG52/CT5 < 1.5.$$

Therefore, the variation of the curvature of the fifth lens element would not be extreme, so that the required space for assembling the image capturing optical lens assembly can be reduced and the arrangement of the lens elements would be more compact. Furthermore, it is favorable for manufacturing and assembling the image capturing optical lens assembly by properly adjusting the thickness of the fifth lens element.

When an axial distance between the third lens element and the fourth lens element is T34, an axial distance between the fourth lens element and the fifth lens element is T45, and a central thickness of the fourth lens element is CT4, the following relationship is satisfied:

$$0 < (T34+T45)/CT4 < 1.0,$$

Therefore, it is favorable for assembling the image capturing optical lens assembly and keeping the assembly compact by properly adjusting the distances between the lens elements and the thickness of the lens elements.

T34, T45 and CT4 can further satisfy the following relationship:

$$0 < (T34+T45)/CT4 < 0.75.$$

Furthermore, T34, T45 and CT4 can better satisfy the following relationship:

$$0 < (T34+T45)/CT4 < 0.50.$$

When a sum of the central thickness from the first through fifth lens elements is $\Sigma CT$, and an axial distance between an object-side surface of the first lens element and the mage-side surface of the fifth lens element is Td, the following relationship is satisfied:

$$0.75 < \Sigma CT/Td < 0.90.$$

Therefore, the arrangement of the thickness of the lens elements can effectively reduce the total track length of the image capturing optical lens assembly.

When an Abbe number of the first lens element is V1, and an Abbe number of the second lens element is V2, the following relationship is satisfied:

$$1.5 < V2/V1 < 3.0.$$

Therefore, the chromatic aberration of the image capturing optical lens assembly can be corrected.

The image capturing optical lens assembly can further includes a stop, such as an aperture stop. When an axial distance between the stop and an image-side surface of the second lens element is Dsr4, and a central thickness of the second lens element is CT2, the following relationship is satisfied:

$$0.7 < Dsr4/CT2 \le 1.0.$$

Therefore, it is favorable for not only obtaining a good balance between the telecentric and wide-angle functionalities but also for manufacturing and assembling the lens elements.

When a curvature radius of the object-side surface of the third lens element is R5, and a curvature radius of the image-side surface of the third lens element is R6, the following relationship is satisfied:

$$-2.5 < R5/R6 < 0.$$

Therefore, the negative refractive power of the third lens element can be more proper by adjusting the curvature of the surfaces of the third lens element, so that the aberration generated from the first lens element and the second lens element with positive refractive power can be effectively corrected.

According to the image capturing optical lens assembly of the present disclosure, the lens elements thereof can be made of glass or plastic material. When the lens elements are made of glass material, the distribution of the refractive power of the image capturing optical lens assembly may be more flexible to design. When the lens elements are made of plastic material, the manufacturing cost can be effectively reduced. Furthermore, surfaces of each lens element can be aspheric, so that it is easier to make the surfaces into non-spherical shapes. As a result, more controllable variables are obtained, and the aberration is reduced as well as the number of required lens elements can be reduced while constructing an optical system. Therefore, the total track length of the image capturing optical lens assembly can also be reduced.

According to the image capturing optical lens assembly of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the paraxial region of the surface is convex, and when the lens element has a concave surface, it indicates that the paraxial region of the surface is concave.

According to the image capturing optical lens assembly of the present disclosure, a critical point is a non-axial point of the lens surface where its tangent is perpendicular to the optical axis.

According to the image capturing optical lens assembly of the present disclosure, the optical image lens system can include at least one stop, such as an aperture stop, a glare stop, or a field stop, etc. Said glare stop or said field stop is allocated for reducing stray light while retaining high image quality. Furthermore, an aperture stop can be configured as a front stop or a middle stop. A front stop which can be disposed between an object and the first lens element provides a longer distance from an exit pupil of the system to an image plane and thereby the generated telecentric effect improves the image-sensing efficiency of an image sensor. A middle stop which can be disposed between the first lens element and the image plane is favorable for enlarging the field of view of the system and thereby provides a wider field of view for the same.

According to the above description of the present disclosure, the following 1st-14th specific embodiments are provided for further explanation.

1st Embodiment

Figure 2:
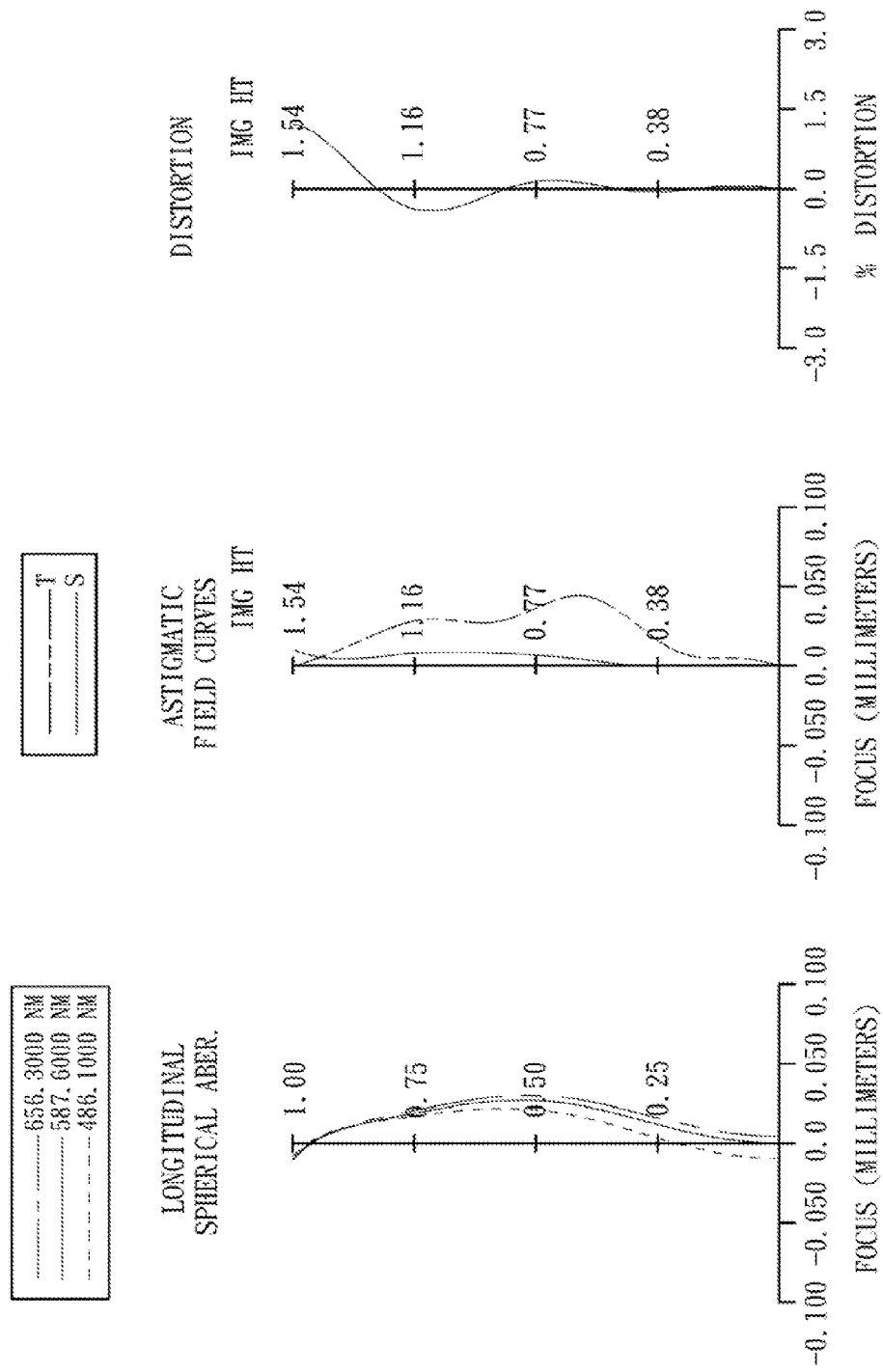
FIG. 2 shows spherical aberration curves, astigmatic field curves and a distortion curve of the image capturing optical lens assembly according to the 1st Embodiment.

FIG. 1 is a schematic view of an image capturing optical lens assembly according to the 1st embodiment of the present disclosure. FIG. 2 shows spherical aberration curves, astigmatic field curves and a distortion curve of the image capturing optical lens assembly according to the 1st embodiment. In FIG. 1, the image capturing optical lens assembly includes, in order from an object side to an image side, a first lens element 110, an aperture stop 100, a second lens element 120, a third lens element 130, a fourth lens element 140, a fifth lens element 150, an IR-cut filter 170, a cover glass 180 and an image plane 160.

The first lens element 110 with positive refractive power has an object-side surface 111 being convex at a paraxial region and an image-side surface 112 being concave at a paraxial region. The first lens element 110 is made of plastic material, and has the object-side surface 11 and the image-side surface 112 being aspheric.

The second lens element 120 with positive refractive power has an object-side surface 121 being convex at a paraxial region and an image-side surface 122 being convex at a paraxial region. The second lens element 120 is made of plastic material, and has the object-side surface 121 and the image-side surface 122 being aspheric.

The third lens element 130 with negative refractive power has an object-side surface 131 being concave at a paraxial region, and an image-side surface 132 being concave at a paraxial region and being convex at a peripheral region. The third lens element 130 is made of plastic material, and has the object-side surface 131 and the image-side surface 132 being aspheric.

The fourth lens element 140 with positive refractive power has an object-side surface 141 being concave at a paraxial region and an image-side surface 142 being convex at a paraxial region. The fourth lens element 140 is made of plastic material, and has the object-side surface 141 and the image-side surface 142 being aspheric.

The fifth lens element 150 with negative refractive power has an object-side surface 151 being convex at a paraxial region, and an image-side surface 152 being concave at a paraxial region and being convex at a peripheral region. The fifth lens element 150 is made of plastic material, and has the object-side surface 151 and the image-side surface 152 being aspheric.

The IR-cut filter 170 and the cover glass 180 are located between the fifth lens element 150 and the image plane 160 in sequence, wherein the IR-cut filter 170 is made of glass, and the IR-cut filter 170 and the cover glass 180 will not affect the focal length of the image capturing optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the image capturing optical lens assembly according to the 1st embodiment, when a focal length of the image capturing optical lens assembly is f, an f-number of the image capturing optical lens assembly is Fno, and half of the maximal field of view of the image capturing optical lens assembly is HFOV, these parameters have the following values:

f=1.57 mm;

Fno=2.05; and

HFOV=44.0 degrees.

In the image capturing optical lens assembly according to the 1st embodiment, when an Abbe number of the first lens element 110 is V1, and an Abbe number of the second lens element 120 is V2, the following relationship is satisfied:

V2/V1=2.35.

In the image capturing optical lens assembly according to the 1st embodiment, when an axial distance between the third lens element 130 and the fourth lens element 140 is T34, an axial distance between the fourth lens element 140 and the fifth lens element 150 is T45, and a central thickness of the fourth lens element 140 is CT4, the following relationship is satisfied:

(T34+T45)/CT4=0.17.

In the image capturing optical lens assembly according to the 1st embodiment, when a curvature radius of the object-side surface 131 of the third lens element 130 is R5, a curvature radius of the image-side surface 132 of the third lens element 130 is R6, and the focal length of the image capturing optical lens assembly is f, the following relationships are satisfied:

R5/R6=−1.62; and f/R6=0.50,

In the image capturing optical lens assembly according to the 1st embodiment, when a focal length of the first lens element 110 is f1, a focal length of the second lens element 120 is f2, and a focal length of the fourth lens element 140 is f4, the following relationships are satisfied:

$f4/f1=0.02$; and $f2/f1=0.05$.

FIG. 29 shows MSAG52 of the fifth lens element 150 of the image capturing optical lens assembly as illustrated in FIG. 1. When a distance in parallel with an optical axis from a critical point on the image-side surface 152 of the fifth lens element 150 to an axial vertex on the image-side surface 152 of the fifth lens element 150 is MSAG52, and a central thickness of the fifth lens element 150 is CT5, the following relationship is satisfied:

$MSAG52/CT5=0.74$.

In the image capturing optical lens assembly according to the 1st embodiment, when an axial distance between the aperture stop 100 and the image-side surface 122 of the second lens element 120 is Dsr4, and a central thickness of the second lens element 120 is CT2, the following relationship is satisfied:

$Dsr4/CT2=0.94$.

In the image capturing optical lens assembly according to the 1st embodiment, when a sum of the central thickness from the first through fifth lens elements (110-150) is ΣCT, and an axial distance between an object-side surface 111 of the first lens element 110 and the image-side surface 152 of the fifth lens element 150 is Td, and the following relationship is satisfied:

$\Sigma CT/Td=0.79$.

The detailed optical data of the 1st embodiment are shown in Table 1 and the aspheric surface data are shown in Table 2 below.

TABLE 1

1st Embodiment
f = 1.57 mm, Fno = 2.05, HFOV = 44.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 2.325 | (ASP) | 0.315 | Plastic | 1.634 | 23.8 | 52.71 |
| 2 | | 2.367 | (ASP) | 0.305 | | | | |
| 3 | Ape. Stop | Plano | | −0.022 | | | | |
| 4 | Lens 2 | 2.059 | (ASP) | 0.375 | Plastic | 1.544 | 55.9 | 2.70 |
| 5 | | −4.784 | (ASP) | 0.094 | | | | |
| 6 | Lens 3 | −5.088 | (ASP) | 0.250 | Plastic | 1.634 | 23.8 | −3.03 |
| 7 | | 3.137 | (ASP) | 0.062 | | | | |
| 8 | Lens 4 | −2.801 | (ASP) | 0.526 | Plastic | 1.544 | 55.9 | 0.84 |
| 9 | | −0.418 | (ASP) | 0.030 | | | | |
| 10 | Lens 5 | 1.374 | (ASP) | 0.300 | Plastic | 1.535 | 56.3 | −1.26 |
| 11 | | 0.418 | (ASP) | 0.300 | | | | |
| 12 | IR-cut filter | Plano | | 0.200 | Glass | 1.517 | 64.2 | — |
| 13 | | Plano | | 0.075 | | | | |
| 14 | Cover glass | Plano | | 0.400 | Glass | 1.517 | 64.2 | — |
| 15 | | Plano | | 0.074 | | | | |
| 16 | Image | Plano | | — | | | | |

Note:
Reference wavelength (d-line) is 587.6 nm.

TABLE 2

Aspheric Coefficients

| | Surface # | | | | |
|---|---|---|---|---|---|
| | 1 | 2 | 4 | 5 | 6 |
| k = | −3.1449E+00 | −9.0000E+01 | −4.2391E+01 | −5.5104E+00 | −6.1106E+00 |
| A4 = | 2.9567E−01 | 1.5115E+00 | 4.6594E−01 | −1.5038E+00 | −2.6808E+00 |
| A6 = | 2.4295E−01 | −6.2208E+00 | −2.4755E+00 | −1.7287E+00 | 2.2740E+00 |
| A8 = | −1.3594E+00 | 2.6253E+01 | 1.0421E+00 | −2.4276E+00 | −4.7266E+01 |
| A10 = | 3.5210E+00 | −5.4170E+01 | −3.3384E+01 | 6.5333E+00 | 2.7326E+02 |
| A12 = | −2.9787E+00 | 3.5760E+01 | −6.7484E−08 | 1.0493E−06 | −3.8695E+02 |
| A14 = | −4.2245E−06 | 6.7945E−07 | | | |

| | Surface # | | | | |
|---|---|---|---|---|---|
| | 7 | 8 | 9 | 10 | 11 |
| k = | 7.6656E−01 | 1.5000E+01 | −3.4717E+00 | −3.9189E+00 | −4.6381E+00 |
| A4 = | −9.8526E−01 | 5.6554E−01 | −1.5368E+00 | −3.0798E−01 | −2.2036E−01 |
| A6 = | 1.6500E+00 | −4.4391E−01 | 6.3198E+00 | −8.8540E−01 | −2.5501E−01 |
| A8 = | −2.8593E+00 | 1.5722E+00 | −2.4335E+01 | 2.2164E+00 | 6.8398E−01 |
| A10 = | −1.3481E−01 | −1.2740E+01 | 5.9223E+01 | −2.4745E+00 | −8.2286E−01 |
| A12 = | | 4.3128E+01 | −6.1656E+01 | 1.6981E+00 | 5.8512E−01 |
| A14 = | | −6.7678E+01 | 2.1204E+01 | −6.6056E−01 | −2.2980E−01 |
| A16 = | | 4.0885E+01 | | 1.0817E−01 | 3.7554E−02 |

In Table 1, the curvature radius, the thickness and the focal length are shown in millimeters (mm). Surface numbers 0-16 represent the surfaces sequentially arranged from the object-side to the Image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
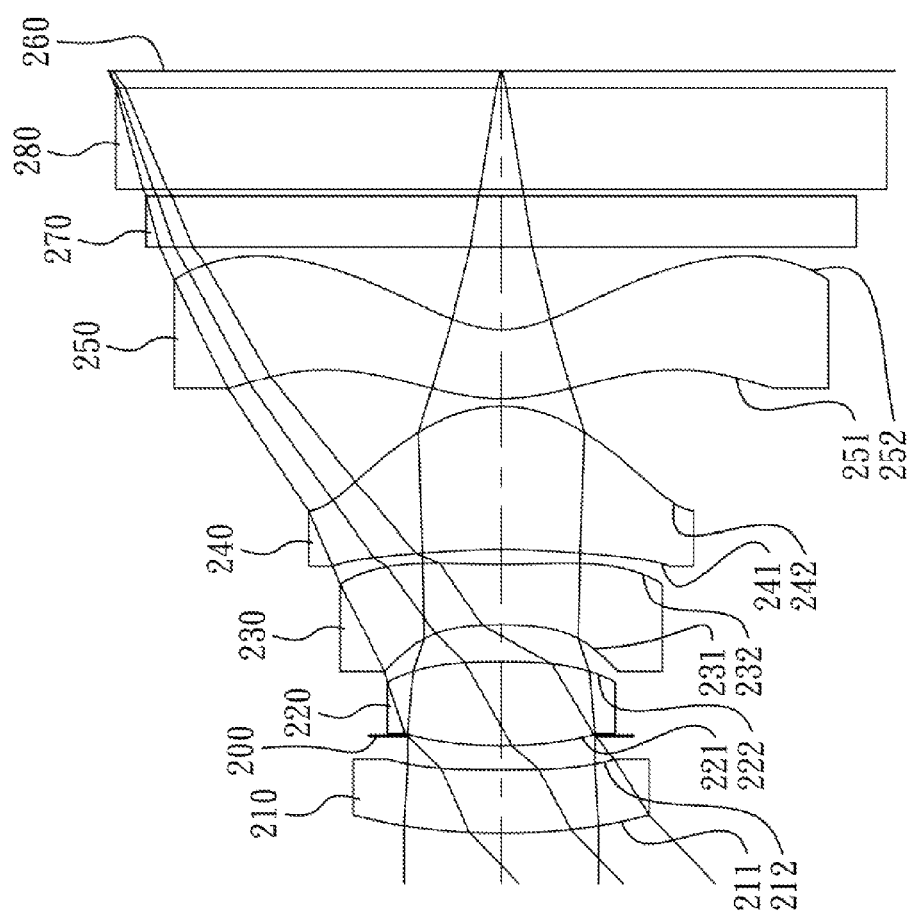
FIG. 3 is a schematic view of an image capturing optical lens assembly according to the 2nd embodiment of the present disclosure.
Figure 4:
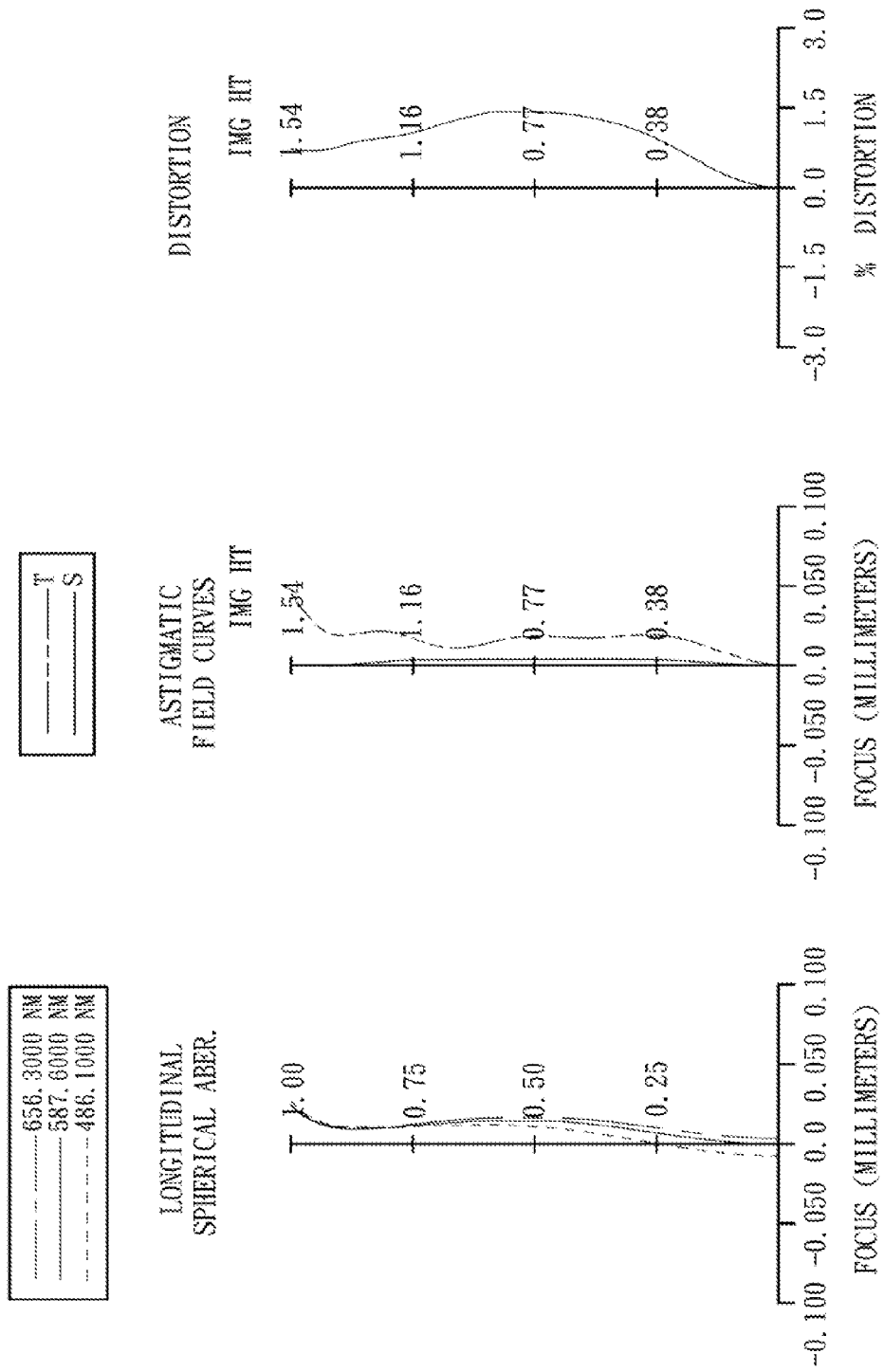
FIG. 4 shows spherical aberration curves, astigmatic field curves and a distortion curve of the image capturing optical lens assembly according to the 2nd Embodiment.

FIG. 3 is a schematic view of an image capturing optical lens assembly according to the 2nd embodiment of the present disclosure. FIG. 4 shows spherical aberration curves, astigmatic field curves and a distortion curve of the image capturing optical lens assembly according to the 2nd embodiment. FIG. 3, the image capturing optical lens assembly includes, in order from an object side to an image side, a first lens element 210, an aperture stop 200, a second lens element 220, a third lens element 230, a fourth lens element 240, a fifth lens element 250, an IR-cut filter 270, a cover glass 280 and an image plane 260.

The first lens element 210 with positive refractive power has an object-side surface 211 being convex at a paraxial region and an image-side surface 212 being concave at a paraxial region. The first lens element 210 is made of plastic material, and has the object-side surface 211 and the image-side surface 212 being aspheric.

The second lens element 220 with positive refractive power has an object-side surface 221 being convex at a paraxial region and an image-side surface 222 being convex at a paraxial region. The second lens element 220 is made of plastic material, and has the object-side surface 221 and the image-side surface 222 being aspheric.

The third lens element 230 with negative refractive power has an object-side surface 231 being concave at a paraxial region, and an image-side surface 232 being concave at a paraxial region and being convex at a peripheral region. The third lens element 230 is made of plastic material, and has the object-side surface 231 and the image-side surface 232 being aspheric.

The fourth lens element 240 with positive refractive power has an object-side surface 241 being concave at a paraxial region and an image-side surface 242 being convex at a paraxial region. The fourth lens element 240 is made of plastic material, and has the object-side surface 241 and the image-side surface 242 being aspheric.

The fifth lens element 250 with negative refractive power has an object-side surface 251 being convex at a paraxial region, and an image-side surface 252 being concave at a paraxial region and being convex at a peripheral region. The fifth lens element 250 is made of plastic material, and has the object-side surface 251 and the image-side surface 252 being aspheric.

The IR-cut filter 270 and the cover glass 280 are located between the fifth lens element 250 and the image plane 260 in sequence, wherein the IR-cut filter 270 is made of glass, and the IR-cut filter 270 and the cover glass 280 will not affect the focal length of the image capturing optical lens assembly.

The detailed optical data of the 2nd embodiment are shown in Table 3 and the aspheric surface data are shown in Table 4 below.

TABLE 3

2nd Embodiment
f = 1.58 mm, Fno = 2.06, HFOV = 44.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 2.752 | (ASP) | 0.248 | Plastic | 1.634 | 23.8 | 9.05 |
| 2 | | 5.101 | (ASP) | 0.134 | | | | |
| 3 | Ape. Stop | Plano | | −0.038 | | | | |
| 4 | Lens 2 | 1.848 | (ASP) | 0.331 | Plastic | 1.544 | 55.9 | 2.12 |
| 5 | | −2.868 | (ASP) | 0.143 | | | | |
| 6 | Lens 3 | −1.635 | (ASP) | 0.240 | Plastic | 1.634 | 23.8 | −1.74 |
| 7 | | 3.556 | (ASP) | 0.058 | | | | |
| 8 | Lens 4 | −2.581 | (ASP) | 0.562 | Plastic | 1.544 | 55.9 | 1.05 |
| 9 | | −0.504 | (ASP) | 0.030 | | | | |
| 10 | Lens 5 | 0.765 | (ASP) | 0.274 | Plastic | 1.544 | 55.9 | −2.24 |
| 11 | | 0.411 | (ASP) | 0.325 | | | | |
| 12 | IR-cut filter | Plano | | 0.200 | Glass | 1.517 | 64.2 | — |
| 13 | | Plano | | 0.025 | | | | |
| 14 | Cover glass | Plano | | 0.400 | Glass | 1.517 | 64.2 | — |
| 15 | | Plano | | 0.066 | | | | |
| 16 | Image | Plano | | — | | | | |

Note:
Reference wavelength (d-line) is 587.6 nm.

TABLE 4

Aspheric Coefficients

| | Surface # | | | | |
|---|---|---|---|---|---|
| | 1 | 2 | 4 | 5 | 6 |
| k = | −6.4346E−01 | −1.0001E+01 | 4.2464E+00 | −9.7860E+00 | −3.9067E+00 |
| A4 = | 6.4020E−02 | 6.6329E−01 | 4.2516E−01 | −1.1817E+00 | −3.1189E+00 |
| A6 = | 7.3225E−01 | −2.3261E+00 | −1.3972E+00 | 6.8115E−01 | 1.6826E+00 |
| A8 = | −5.2842E+00 | 1.8383E+01 | 6.6535E+00 | −1.4295E+01 | −3.7770E+01 |

TABLE 4-continued

| Aspheric Coefficients | | | | |
|---|---|---|---|---|
| A10 = | 1.3098E+01 | −9.4596E+01 | −1.9474E+01 | 5.6082E+01 | 2.5004E+02 |
| A12 = | −1.1492E+01 | 2.6289E+02 | | | −3.0890E+02 |

| | Surface # | | | | |
|---|---|---|---|---|---|
| | 7 | 8 | 9 | 10 | 11 |
| k = | −6.8689E+01 | 1.2886E+01 | −1.9898E+00 | −1.5168E+00 | −2.8606E+00 |
| A4 = | −1.0628E+00 | 7.6217E−01 | −4.4028E−01 | −1.4113E+00 | −7.4329E−01 |
| A6 = | 1.6852E+00 | 3.2879E+00 | −2.5508E−01 | 2.5263E+00 | 1.4128E+00 |
| A8 = | −2.2226E+00 | 1.4828E+01 | 2.7199E+00 | −3.6884E+00 | −2.0288E+00 |
| A10 = | | 5.0795E+01 | −4.6379E+00 | 3.6919E+00 | 1.8721E+00 |
| A12 = | | 1.1406E+02 | 2.7835E+00 | −2.3178E+00 | −1.0528E+00 |
| A14 = | | 1.4085E+02 | 1.3917E+01 | 8.5097E−01 | 3.2461E−01 |
| A16 = | | 7.2822E+01 | −1.7306E+01 | −1.4133E−01 | −4.1779E−02 |

In the image capturing optical lens assembly according to the 2nd embodiment, the definitions of f, Fno, HFOV, V1, V2, T34, T45, CT2, CT4, CT5, R5, R6, f1, f2, f4, MSAG52, Dsr4, ΣCT and Td are the same as those stated in the 1st embodiment with corresponding values for the 2nd embodiment. Moreover, these parameters can be calculated from Table 3 and Table 4 as the following values and satisfy the following relationships:

| f (mm) | 1.58 | f/R6 | 0.44 |
|---|---|---|---|
| Fno | 2.06 | f4/f1 | 0.12 |
| HFOV (deg.) | 44.0 | f2/f1 | 0.23 |
| V2/V1 | 2.35 | MSAG52/CT5 | 1.05 |
| (T34 + T45)/CT4 | 0.16 | Dsr4/CT2 | 0.89 |
| R5/R6 | −0.46 | ΣCT/Td | 0.84 |

3rd Embodiment

Figure 5:
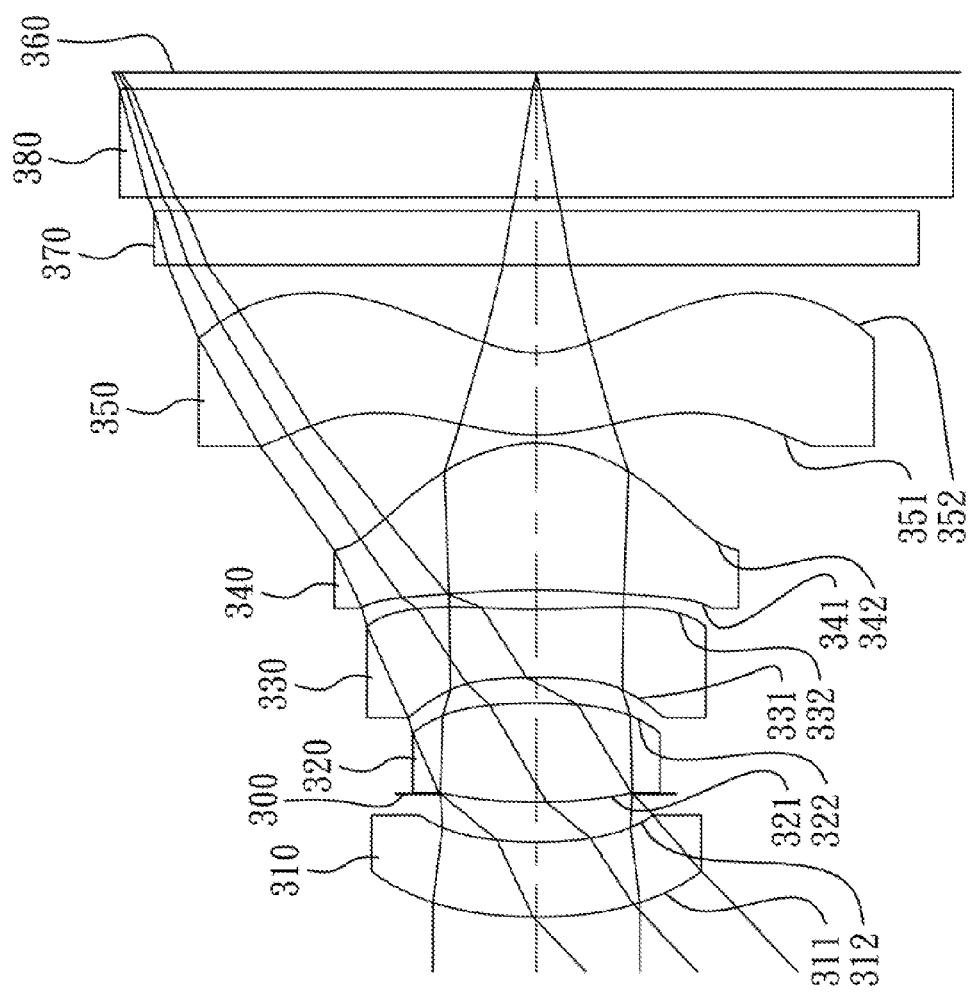
FIG. 5 is a schematic view of an image capturing optical lens assembly Edi according to the 3rd embodiment of the present disclosure.
Figure 6:
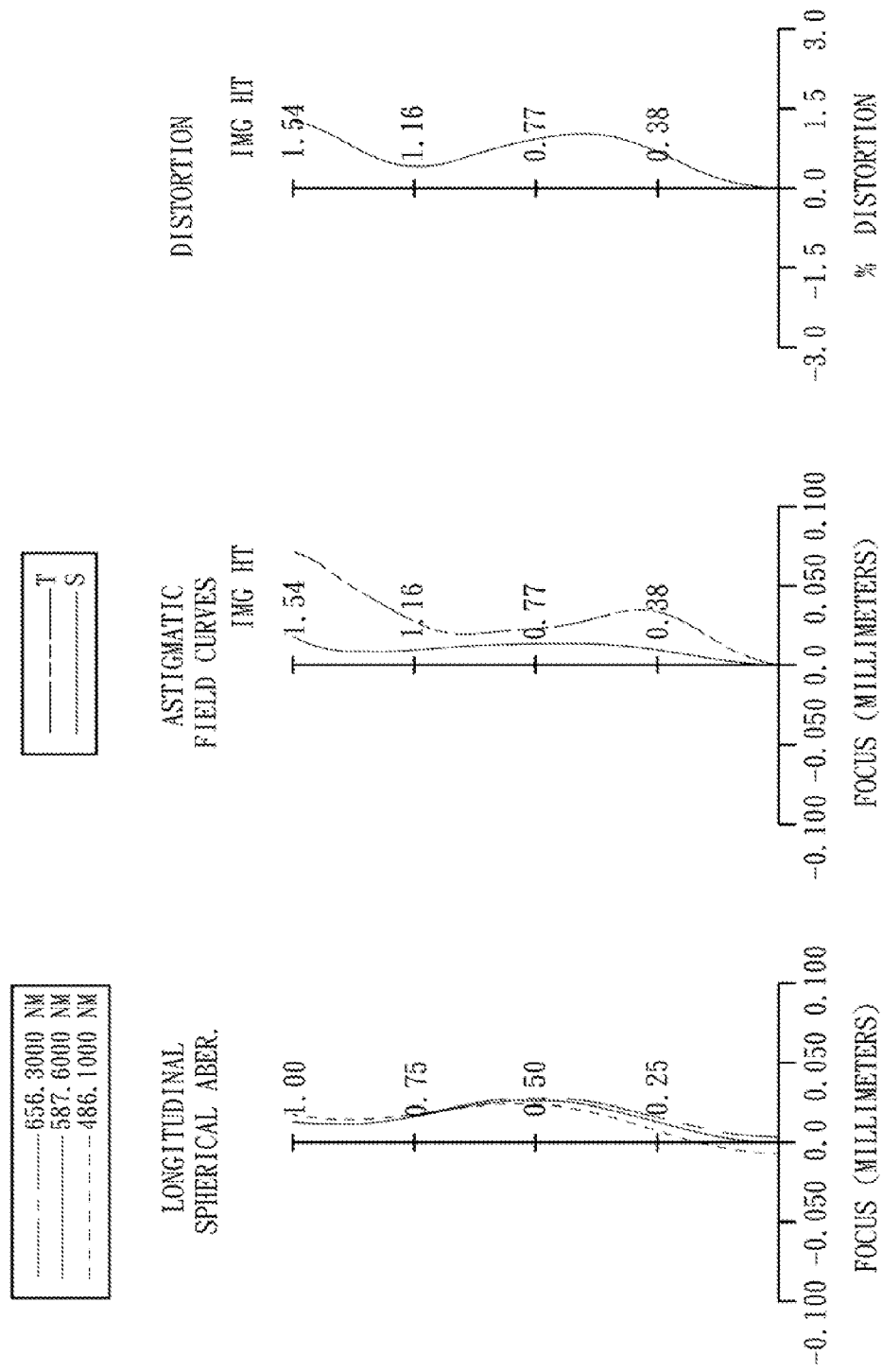
FIG. 6 shows spherical aberration curves, astigmatic field curves and a distortion curve of the image capturing optical lens assembly according to the 3rd Embodiment.

FIG. 5 is a schematic view of an image capturing optical lens assembly to according to the 3rd embodiment of the present disclosure. FIG. 6 shows spherical aberration curves, astigmatic field curves and a distortion curve of the image capturing optical lens assembly according to the 3rd embodiment. In FIG. 5, the image capturing optical lens assembly includes, in order from an object side to an image side, a first lens element 310, an aperture stop 300, a second lens element 320, a third lens element 330, a fourth lens element 340, a fifth lens element 350, an IR-cut filter 370, a cover glass 380 and an image plane 360.

The first lens element 310 with positive refractive power has an object-side surface 311 being convex at a paraxial region and an image-side surface 312 being concave at a paraxial region. The first lens element 310 is made of plastic material, and has the object-side surface 31 and the image-side surface 312 being aspheric.

The second lens element 320 with positive refractive power has an object-side surface 321 being convex at a paraxial region and an image-side surface 322 being convex at a paraxial region. The second lens element 320 is made of plastic material, and has the object-side surface 321 and the image-side surface 322 being aspheric.

The third lens element 330 with negative refractive power has an object-side surface 331 being concave at a paraxial region, and an image-side surface 332 being concave at a paraxial region and being convex at a peripheral region. The third lens element 330 is made of plastic material, and has the object-side surface 331 and the image-side surface 332 being aspheric.

The fourth lens element 340 with positive refractive power has an object-side surface 341 being concave at a paraxial region and an image-side surface 342 being convex at a paraxial region. The fourth lens element 340 is made of plastic material, and has the object-side surface 341 and the image-side surface 342 being aspheric.

The fifth lens element 350 with negative refractive power has an object-side surface 351 being convex at a paraxial region, and an image-side surface 352 being concave at a paraxial region and being convex at a peripheral region. The fifth lens element 350 is made of plastic material, and has the object-side surface 351 and the image-side surface 352 being aspheric.

The IR-cut filter 370 and the cover glass 380 are located between the fifth lens element 350 and the image plane 360 in sequence, wherein the IR-cut filter 370 is made of glass, and the IR-cut filter 370 and the cover glass 380 will not affect the focal length of the image capturing optical lens assembly.

The detailed optical data of the 3rd embodiment are shown in Table 5 and the aspheric surface data are shown in Table 6 below.

TABLE 5

3rd Embodiment
f = 1.57 mm, Fno = 2.06, HFOV = 44.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.690 | (ASP) | 0.278 | Plastic | 1.634 | 23.8 | 51.45 |
| 2 | | 1.669 | (ASP) | 0.177 | | | | |
| 3 | Ape. Stop | Plano | | −0.031 | | | | |
| 4 | Lens 2 | 2.044 | (ASP) | 0.363 | Plastic | 1.544 | 55.9 | 2.13 |
| 5 | | −2.514 | (ASP) | 0.096 | | | | |
| 6 | Lens 3 | −3.068 | (ASP) | 0.250 | Plastic | 1.634 | 23.8 | −2.29 |
| 7 | | 2.833 | (ASP) | 0.071 | | | | |

TABLE 5-continued

3rd Embodiment
f = 1.57 mm, Fno = 2.06, HFOV = 44.0 deg.

| Surface # | | Curvature Radius | | Thickness | Material | Index | Abbe # | Focal length |
|---|---|---|---|---|---|---|---|---|
| 8 | Lens 4 | −2.496 | (ASP) | 0.543 | Plastic | 1.544 | 55.9 | 1.10 |
| 9 | | −0.518 | (ASP) | 0.030 | | | | |
| 10 | Lens 5 | 0.786 | (ASP) | 0.300 | Plastic | 1.544 | 55.9 | −2.30 |
| 11 | | 0.418 | (ASP) | 0.325 | | | | |
| 12 | IR-cut filter | Plano | | 0.200 | Glass | 1.517 | 64.2 | — |
| 13 | | Plano | | 0.050 | | | | |
| 14 | Cover glass | Plano | | 0.400 | Glass | 1.517 | 64.2 | — |
| 15 | | Plano | | 0.059 | | | | |
| 16 | Image | Plano | | — | | | | |

Note:
Reference wavelength (d-line) is 587.6 nm.

TABLE 6

Aspheric Coefficients

| Surface # | | | | | |
|---|---|---|---|---|---|
| | 1 | 2 | 4 | 5 | 6 |
| k = | 8.0191E−01 | 5.7452E−02 | 3.5432E+00 | 9.9035E−01 | 1.0000E+00 |
| A4 = | 3.5517E−01 | 1.2097E+00 | 3.2434E−01 | −1.5771E+00 | −3.0559E+00 |
| A6 = | 5.2649E−01 | −2.5983E+00 | −7.6230E−01 | 1.3395E+00 | 4.4098E+00 |
| A8 = | −3.2531E+00 | 2.8413E+01 | 3.8097E+00 | −1.5543E+01 | −3.9788E+01 |
| A10 = | 1.1833E+01 | −8.7768E+01 | −5.7095E+01 | 4.2709E+01 | 2.0774E+02 |
| A12 = | −1.6576E+01 | 8.5619E+01 | | | −2.1499E+02 |

| Surface # | | | | | |
|---|---|---|---|---|---|
| | 7 | 8 | 9 | 10 | 11 |
| k = | −4.1466E+01 | 1.3397E+01 | −1.6785E+00 | −3.0485E+00 | −3.1069E+00 |
| A4 = | −9.3263E−01 | 9.1279E−01 | −3.0707E−01 | −1.3608E+00 | −8.7532E−01 |
| A6 = | 1.7935E+00 | −3.4215E+00 | −2.4770E−01 | 2.5110E+00 | 1.5484E+00 |
| A8 = | −3.3704E+00 | 1.4653E+01 | 2.2432E+00 | −3.7288E+00 | −2.1195E+00 |
| A10 = | | −5.1011E+01 | −4.4988E+00 | 3.6723E+00 | 1.8700E+00 |
| A12 = | | 1.1494E+02 | 4.8248E+00 | −2.2276E+00 | −1.0131E+00 |
| A14 = | | −1.4209E+02 | 1.6426E+01 | 8.5905E−01 | 3.0609E−01 |
| A16 = | | 7.2792E+01 | −2.4445E+01 | −1.7474E−01 | −3.9630E−02 |

In the image capturing optical lens assembly according to the 3rd embodiment, the definitions of f, Fno, HFOV, V1, V2, T34, T45, CT2, CT4, CT5, R5, R6, f1, f2, f4, MSAG52, IDsr4, ΣCT and Td are the same as those stated in the 1st embodiment with corresponding values for the 3rd embodiment. Moreover, these parameters can be calculated from Table 5 and Table 6 as the following values and satisfy the following relationships:

| | | | |
|---|---|---|---|
| f (mm) | 1.57 | f/R6 | 0.55 |
| Fno | 2.06 | f4/f1 | 0.02 |
| HFOV (deg.) | 44.0 | f2/f1 | 0.04 |
| V2/V1 | 2.35 | MSAG52/CT5 | 0.74 |
| (T34 + T45)/CT4 | 0.19 | Dsr4/CT2 | 0.91 |
| R5/R6 | −1.08 | ΣCT/Td | 0.83 |

4th Embodiment

Figure 7:
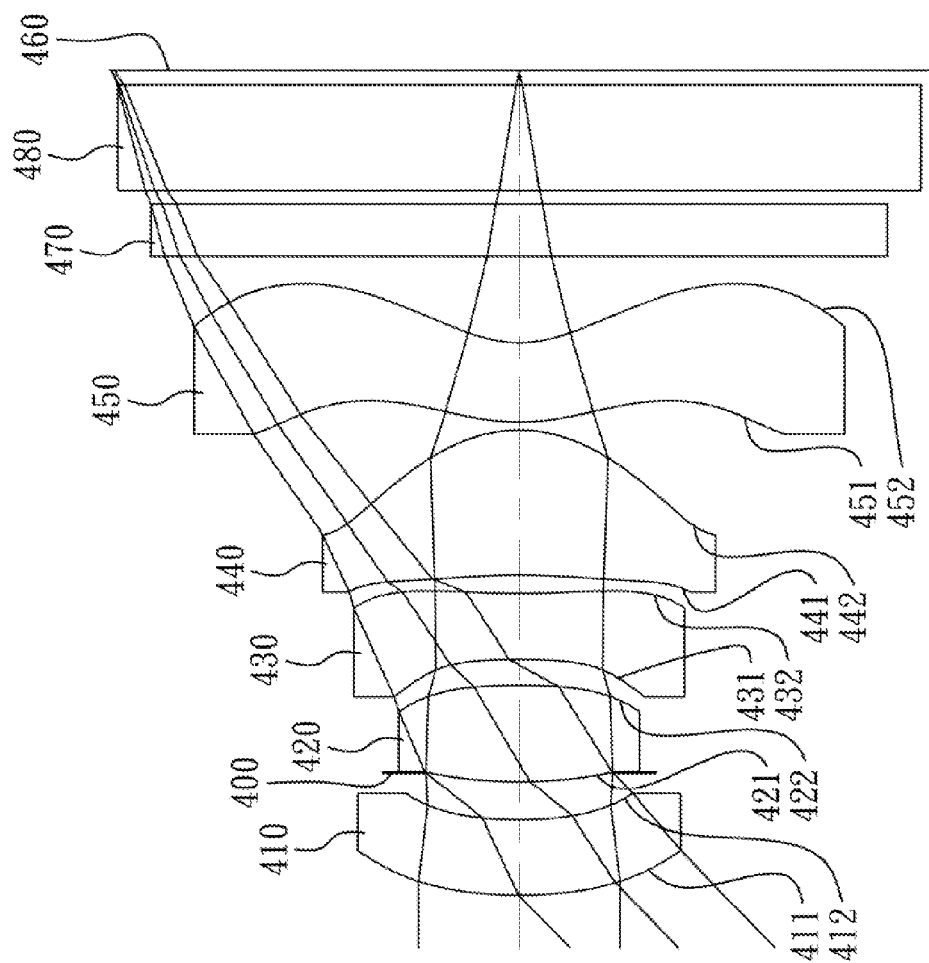
FIG. 7 is a schematic view of an image capturing optical lens assembly according to the 4th embodiment of the present disclosure.
Figure 8:
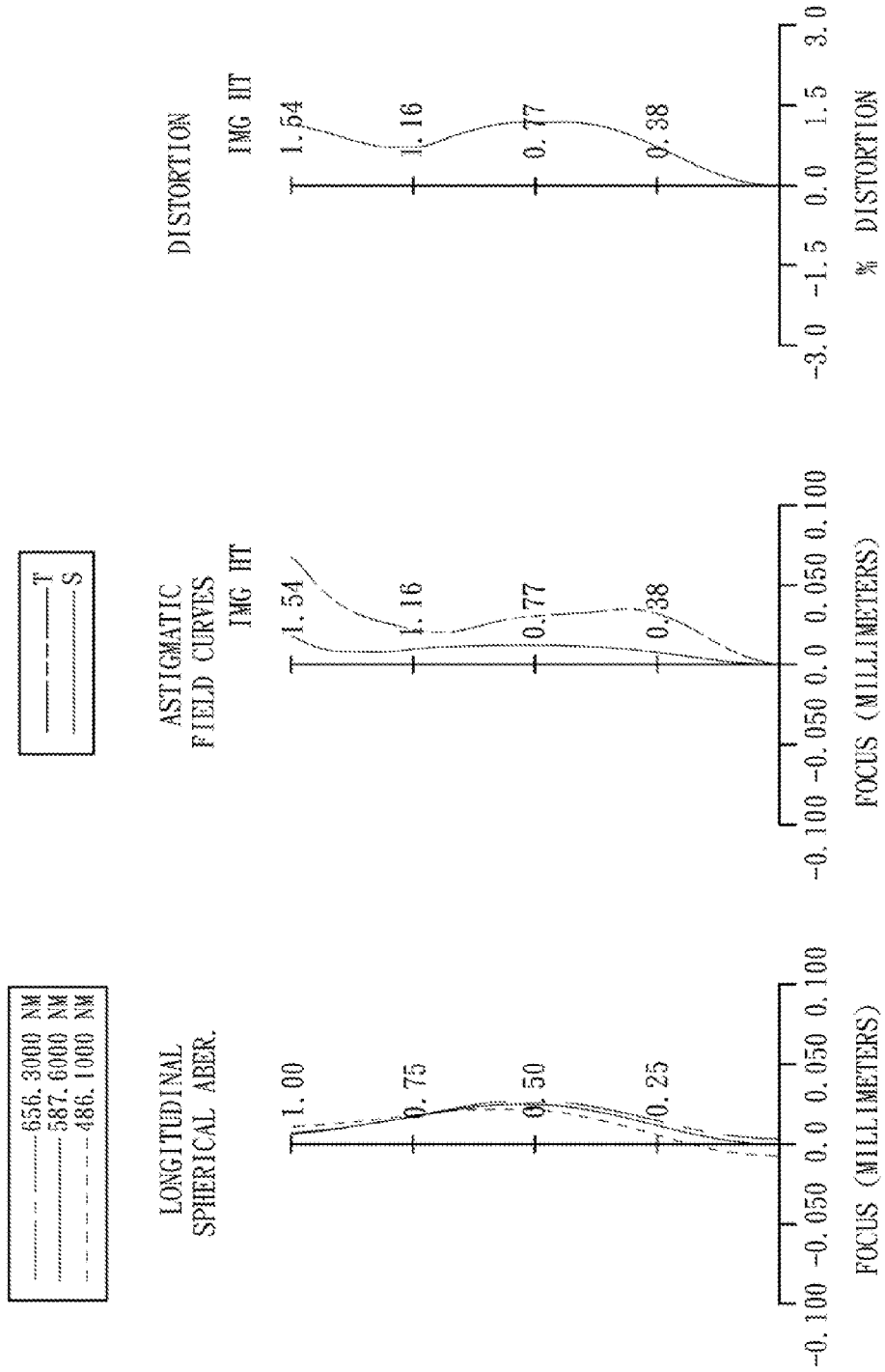
FIG. 8 shows spherical aberration curves, astigmatic field curves and a distortion curve of the image capturing optical lens assembly according to the 4th Embodiment.

FIG. 7 is a schematic view of an image capturing optical lens assembly according to the 4th embodiment of the present disclosure. FIG. 8 shows spherical aberration curves, astigmatic field curves and a distortion curve of the image capturing optical lens assembly according to the 4th embodiment. FIG. 7, the image capturing optical lens assembly includes, in order from an object side to an image side, a first lens element 410, an aperture stop 400, a second lens element 420, a third lens element 430, a fourth lens element 440, a fifth lens element 450, an I'R-cut filter 470, a cover glass 480 and an image plane 460.

The first lens element 410 with positive refractive power has an object-side surface 411 being convex at a paraxial region and an image-side surface 412 being concave at a paraxial region. The first lens element 410 is made of plastic material, and has the object-side surface 411 and the image-side surface 412 being aspheric.

The second lens element 420 with positive refractive power has an object-side surface 421 being convex at a paraxial region and an image-side surface 422 being convex at a paraxial region. The second lens element 420 is made of plastic material, and has the object-side surface 421 and the image-side surface 422 being aspheric.

The third lens element 430 with negative refractive power has an object-side surface 431 being concave at a paraxial region, and an image-side surface 432 being concave at a paraxial region and being convex at a peripheral region. The third lens element 430 is made of plastic material, and has the object-side surface 431 and the image-side surface 432 being aspheric.

The fourth lens element 440 with positive refractive power has an object-side surface 441 being concave at a paraxial region and an image-side surface 442 being convex at a paraxial region. The fourth lens element 440 is made of plastic material, and has the object-side surface 441 and the image-side surface 442 being aspheric.

The fifth lens element 450 with negative refractive power has an object-side surface 451 being convex at a paraxial region, and an image-side surface 452 being concave at a paraxial region and being convex at a peripheral region. The fifth lens element 450 is made of plastic material, and has the object-side surface 451 and the image-side surface 452 being aspheric.

The IR-cut filter 470 and the cover glass 480 are located between the fifth lens element 450 and the image plane 460 in sequence, wherein the IR-cut filter 470 is made of glass, and the IR-cut filter 470 and the cover glass 480 will not affect the focal length of the image capturing optical lens assembly.

The detailed optical data of the 4th embodiment are shown in Table 7 and the aspheric surface data are shown in Table 8 below.

TABLE 7

4th Embodiment
f = 1.57 mm, Fno = 2.06, HFOV = 44.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.661 | (ASP) | 0.284 | Plastic | 1.634 | 23.8 | 110.46 |
| 2 | | 1.589 | (ASP) | 0.179 | | | | |
| 3 | Ape. Stop | Plano | | −0.034 | | | | |
| 4 | Lens 2 | 1.952 | (ASP) | 0.364 | Plastic | 1.544 | 55.9 | 2.18 |
| 5 | | −2.824 | (ASP) | 0.098 | | | | |
| 6 | Lens 3 | −3.918 | (ASP) | 0.250 | Plastic | 1.634 | 23.8 | −2.45 |
| 7 | | 2.642 | (ASP) | 0.069 | | | | |
| 8 | Lens 4 | −2.533 | (ASP) | 0.549 | Plastic | 1.544 | 55.9 | 1.09 |
| 9 | | −0.517 | (ASP) | 0.030 | | | | |
| 10 | Lens 5 | 0.816 | (ASP) | 0.300 | Plastic | 1.544 | 55.9 | −2.28 |
| 11 | | 0.429 | (ASP) | 0.325 | | | | |
| 12 | IR-cut filter | Plano | | 0.200 | Glass | 1.517 | 64.2 | — |
| 13 | | Plano | | 0.050 | | | | |
| 14 | Cover glass | Plano | | 0.400 | Glass | 1.517 | 64.2 | — |
| 15 | | Plano | | 0.056 | | | | |
| 16 | Image | Plano | | — | | | | |

Note:
Reference wavelength (d-line) is 587.6 nm.

TABLE 8

Aspheric Coefficients

| | Surface # | | | | |
|---|---|---|---|---|---|
| | 1 | 2 | 4 | 5 | 6 |
| k = | 3.5607E−01 | −6.2394E−01 | 4.4490E+00 | −1.2457E+01 | −2.3986E+01 |
| A4 = | 3.4174E−01 | 1.2006E+00 | 3.3699E−01 | −1.5347E+00 | −2.9861E+00 |
| A6 = | 5.4835E−01 | −2.5302E+00 | −1.1759E+00 | 1.2582E+00 | 4.4360E+00 |
| A8 = | −3.2235E+00 | 2.8561E+01 | 5.6016E+00 | −1.5210E+01 | −4.1258E+01 |
| A10 = | 1.0783E+01 | −9.8576E+01 | −4.5449E+01 | 4.6404E+01 | 2.0111E+02 |
| A12 = | −1.4646E+01 | 1.1732E+02 | | | −1.9307E+02 |

| | Surface # | | | | |
|---|---|---|---|---|---|
| | 7 | 8 | 9 | 10 | 11 |
| k = | −2.4906E+01 | 1.3867E+01 | −1.7670E+00 | −2.3538E+00 | −3.1282E+00 |
| A4 = | −8.9876E−01 | 9.6474E−01 | −3.3465E−01 | −1.4309E+00 | −8.4952E−01 |
| A6 = | 1.7342E+00 | −3.4500E+00 | −3.0967E−01 | 2.5180E+00 | 1.5085E+00 |
| A8 = | −3.5633E+00 | 1.4587E+01 | 2.2003E+00 | −3.7173E+00 | −2.1054E+00 |
| A10 = | | −5.1290E+01 | −4.3985E+00 | 3.6844E+00 | 1.8795E+00 |
| A12 = | | 1.1445E+02 | 5.1679E+00 | −2.2191E+00 | −1.0183E+00 |
| A14 = | | −1.4164E+02 | 1.6858E+01 | 8.4600E−01 | 3.0282E−01 |
| A16 = | | 7.5251E+01 | −2.5701E+01 | −1.7262E−01 | −3.7671E−02 |

In the image capturing optical lens assembly according to the 4th embodiment, the definitions of f, Fno, HFOV, V1, V2, T34, T45, CT2, CT4, CT5, R5, R6, f1, f2, f4, MSAG52, Dsr4, ΣCT and Td are the same as those stated in the 1st embodiment with corresponding values for the 4th embodiment. Moreover, these parameters can be calculated from Table 7 and Table 8 as the following values and satisfy the following relationships:

| | | | |
|---|---|---|---|
| f (mm) | 1.57 | f/R6 | 0.59 |
| Fno | 2.06 | f4/f1 | 0.01 |
| HFOV (deg.) | 44.0 | f2/f1 | 0.02 |
| V2/V1 | 2.35 | MSAG52/CT5 | 0.74 |
| (T34 + T45)/CT4 | 0.18 | Dsr4/CT2 | 0.91 |
| R5/R6 | −1.48 | ΣCT/Td | 0.84 |

5th Embodiment

Figure 9:
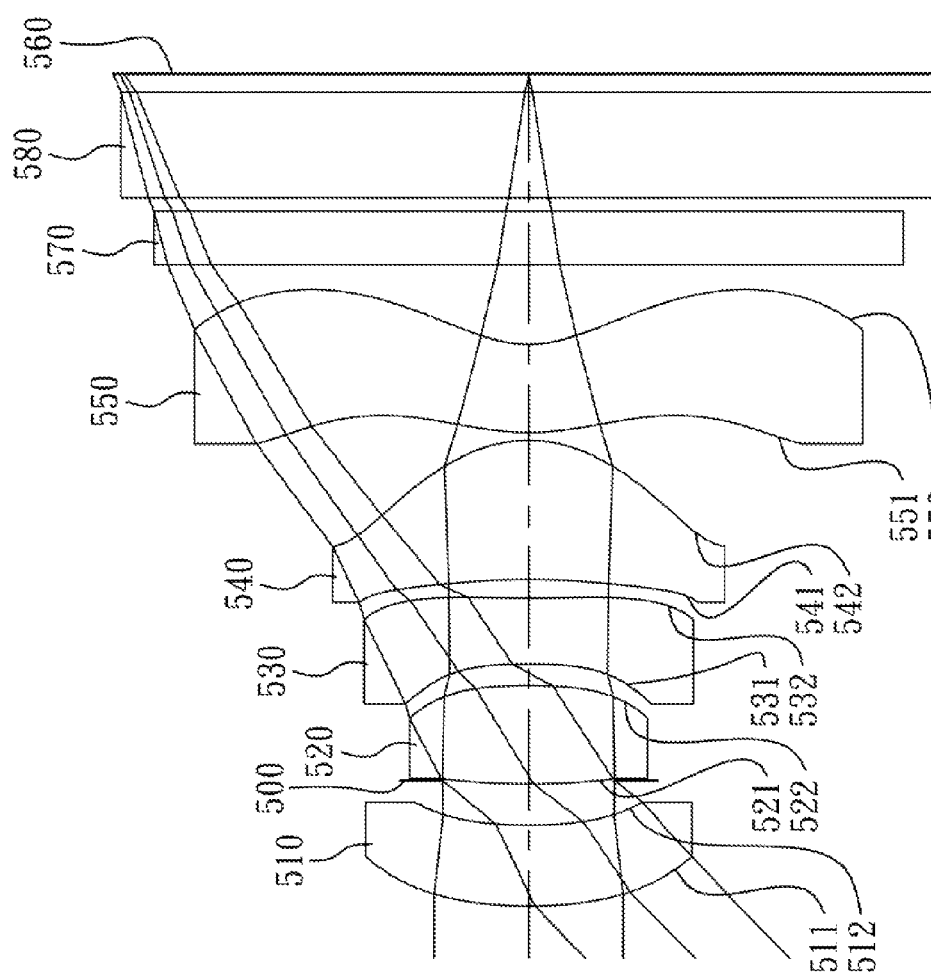
FIG. 9 is a schematic view of an image capturing optical lens assembly according to the 5th embodiment of the present disclosure.
Figure 10:
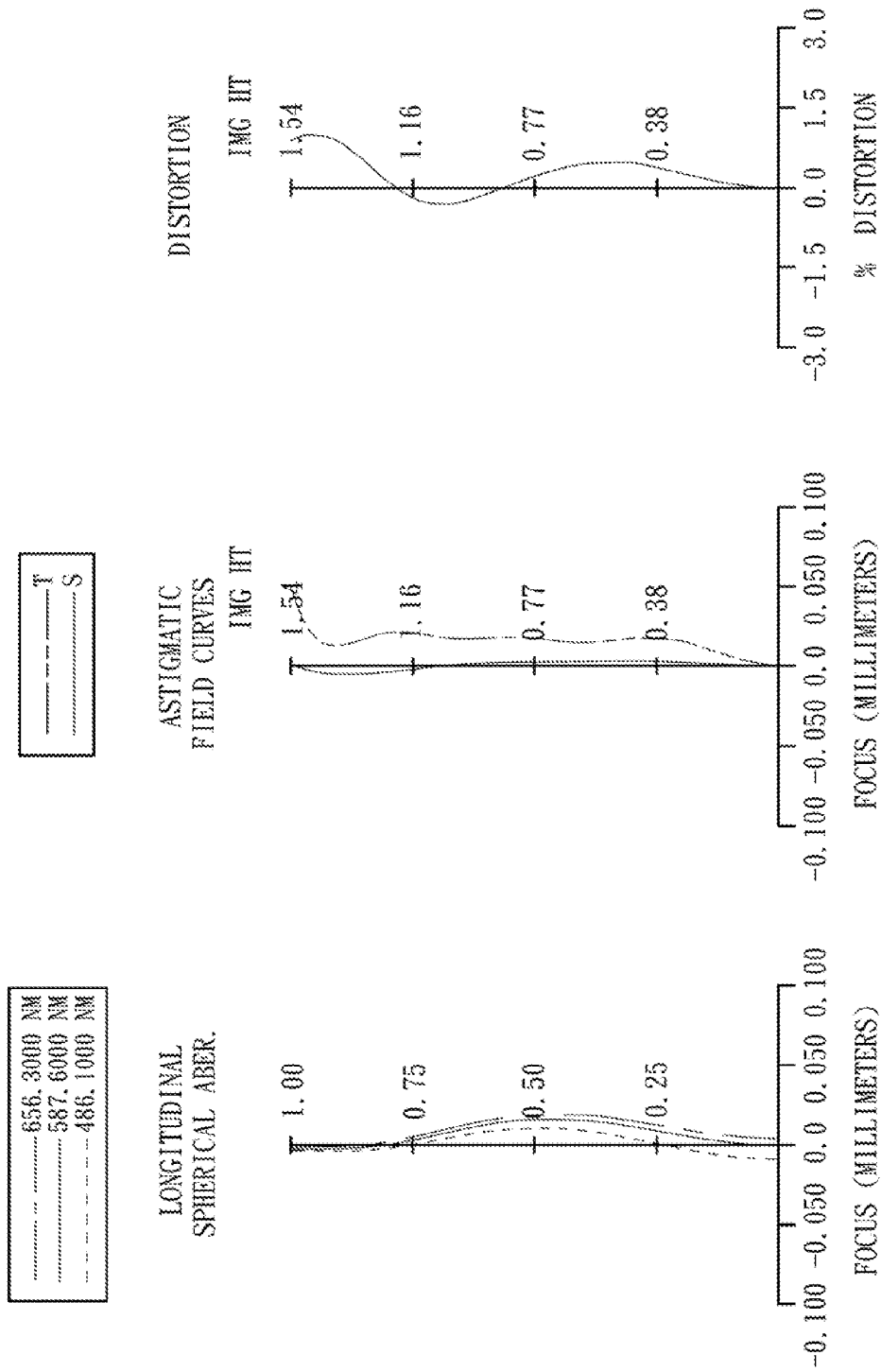
FIG. 10 shows spherical aberration curves, astigmatic field curves and a distortion curve of the image capturing optical lens assembly according to the 5th Embodiment.

FIG. 9 is a schematic view of an image capturing optical lens assembly according to the 5th embodiment of the present disclosure. FIG. 10 shows spherical aberration curves, astigmatic field curves and a distortion curve of the image capturing optical lens assembly according to the 5th embodiment. FIG. 9, the image capturing optical lens assembly includes, in order from an object side to an image side, a first lens element 510, an aperture stop 500, a second lens element 520, a third lens element 530, a fourth lens element 540, a fifth lens element 550 an IR-cut filter 570, a cover glass 580 and an image plane 560.

The first lens element 510 with positive refractive power has an object-side surface 511 being convex at a paraxial region and an image-side surface 512 being concave at a paraxial region. The first lens element 510 is made of plastic material, and has the object-side surface 511 and the image-side surface 512 being aspheric.

The second lens element 520 with positive refractive power has an object-side surface 521 being convex at a paraxial region and an image-side surface 522 being convex at a paraxial region. The second lens element 520 is made of plastic material, and has the object-side surface 521 and the image-side surface 522 being aspheric.

The third lens element 530 with negative refractive power has an object-side surface 531 being concave at a paraxial region, and an image-side surface 532 being concave at a paraxial region and being convex at a peripheral region. The third lens element 530 is made of plastic material, and has the object-side surface 531 and the image-side surface 532 being aspheric.

The fourth lens element 540 with positive refractive power has an object-side surface 541 being concave at a paraxial region and an image-side surface 542 being convex at a paraxial region. The fourth lens element 540 is made of plastic material, and has the object-side surface 541 and the image-side surface 542 being aspheric.

The fifth lens element 550 with negative refractive power has an object-side surface 551 being convex at a paraxial region, and an image-side surface 552 being concave at a paraxial region and being convex at a peripheral region. The fifth lens element 550 is made of plastic material, and has the object-side surface 551 and the image-side surface 552 being aspheric.

The IR-cut filter 570 and the cover glass 580 are located between the fifth lens element 550 and the image plane 560 in sequence, wherein the IR-cut filter 570 is made of glass, and the IR-cut filter 570 and the cover glass 580 will not affect the focal length of the image capturing optical lens assembly.

The detailed optical data of the 5th embodiment are shown in Table 9 and the aspheric surface data are shown in Table 10 below.

TABLE 9

5th Embodiment
f = 1.58 mm, Fno = 2.22, HFOV = 44.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.657 | (ASP) | 0.305 | Plastic | 1.634 | 23.8 | 16.62 |
| 2 | | 1.826 | (ASP) | 0.169 | | | | |
| 3 | Ape. Stop | Plano | | −0.014 | | | | |
| 4 | Lens 2 | 2.888 | (ASP) | 0.369 | Plastic | 1.544 | 55.9 | 2.38 |
| 5 | | −2.246 | (ASP) | 0.081 | | | | |
| 6 | Lens 3 | −2.350 | (ASP) | 0.250 | Plastic | 1.634 | 23.8 | −2.41 |
| 7 | | 4.534 | (ASP) | 0.071 | | | | |
| 8 | Lens 4 | −2.473 | (ASP) | 0.522 | Plastic | 1.544 | 55.9 | 1.08 |
| 9 | | −0.509 | (ASP) | 0.030 | | | | |
| 10 | Lens 5 | 0.944 | (ASP) | 0.334 | Plastic | 1.544 | 55.9 | −2.09 |
| 11 | | 0.452 | (ASP) | 0.300 | | | | |
| 12 | IR-cut filter | Plano | | 0.200 | Glass | 1.517 | 64.2 | — |
| 13 | | Plano | | 0.050 | | | | |
| 14 | Cover glass | Plano | | 0.400 | Glass | 1.517 | 64.2 | — |
| 15 | | Plano | | 0.069 | | | | |
| 16 | Image | Plano | | — | | | | |

Note:
Reference wavelength (d-line) is 587.6 nm.

TABLE 10

Aspheric Coefficients

| Surface # | | | | |
|---|---|---|---|---|
| 1 | 2 | 4 | 5 | 6 |
| k = 3.6291E−01 | −4.6181E+00 | −1.1144E+01 | −1.5447E+01 | −4.5854E+01 |
| A4 = 3.7017E−01 | 1.2741E+00 | 2.9495E−01 | −1.7894E+00 | −3.1722E+00 |
| A6 = 4.6951E−01 | −3.8138E+00 | −1.8373E+00 | 1.3354E−02 | 4.4804E+00 |
| A8 = −3.0455E+00 | 3.8161E+01 | 1.2404E+01 | −7.0453E+00 | −3.6627E+01 |
| A10 = 1.3208E+01 | −1.1864E+02 | −1.4936E+02 | −8.3306E−01 | 1.9920E+02 |
| A12 = −1.8504E+01 | 4.0189E+00 | | | −2.4787E+02 |

| Surface # | | | | |
|---|---|---|---|---|
| 7 | 8 | 9 | 10 | 11 |
| k = −7.7711E+01 | 1.2977E+01 | −1.7868E+00 | −2.0138E+00 | −3.3898E+00 |
| A4 = −1.0036E+00 | 5.9064E−01 | −4.1718E−01 | −1.4541E+00 | −8.1809E−01 |
| A6 = 2.2964E+00 | −2.7316E+00 | −2.2298E−01 | 2.5811E+00 | 1.4514E+00 |
| A8 = −4.3515E+00 | 1.5623E+01 | 2.5690E+00 | −3.6644E+00 | −2.0519E+00 |
| A10 = | −5.4635E+01 | −4.6955E+00 | 3.6599E+00 | 1.8839E+00 |
| A12 = | 1.0813E+02 | 4.7456E+00 | −2.2811E+00 | −1.0285E+00 |
| A14 = | −1.2243E+02 | 1.5991E+01 | 8.3262E−01 | 2.9749E−01 |
| A16 = | 6.1883E+01 | −2.3784E+01 | −1.4041E−01 | −3.4701E−02 |

In the image capturing optical lens assembly according to the 5th embodiment, the definitions of f, Fno, HFOV, V1, V2, T34, T45, CT2, CT4, CT5, R5, R6, f1, f2, f4, MSAG52, Dsr4, ΣCT and Td are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f (mm) | 1.58 | f/R6 | 0.35 |
| Fno | 2.22 | f4/f1 | 0.06 |
| HFOV (deg.) | 44.0 | f2/f1 | 0.14 |
| V2/V1 | 2.35 | MSAG52/CT5 | 0.62 |
| (T34 + T45)/CT4 | 0.19 | Dsr4/CT2 | 0.96 |
| R5/R6 | −0.52 | ΣCT/Td | 0.84 |

6th Embodiment

Figure 11:
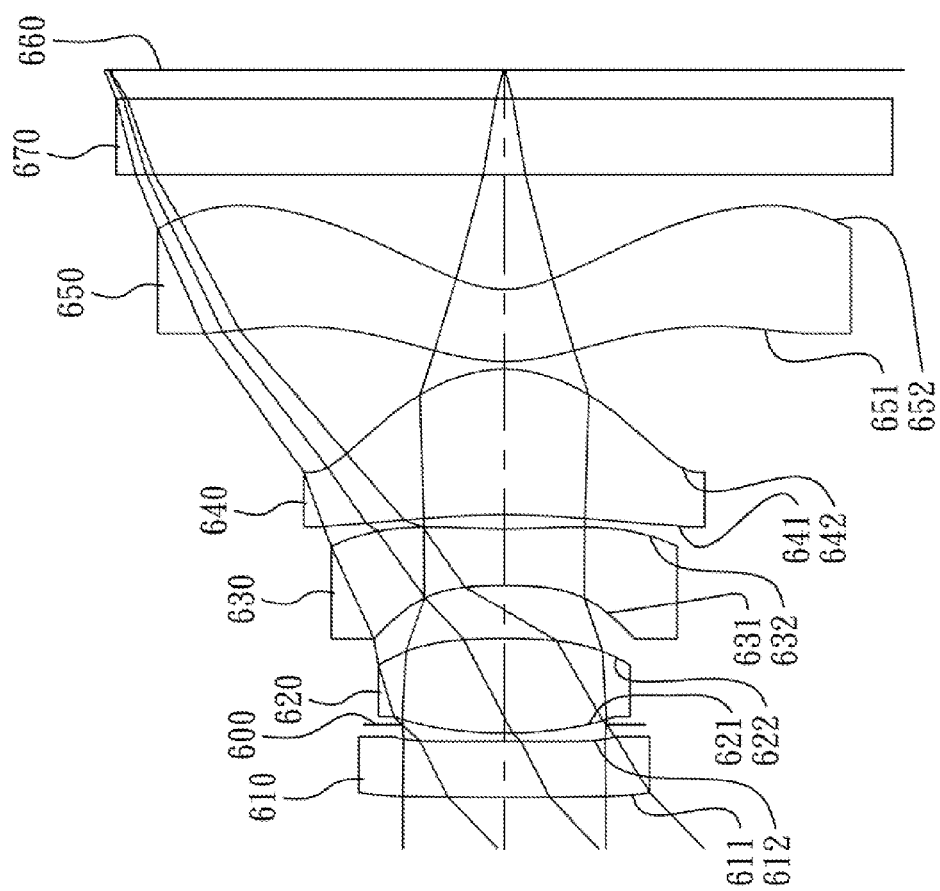
FIG. 11 is a schematic view of an image capturing optical lens assembly to according to the 6th embodiment of the present disclosure.
Figure 12:
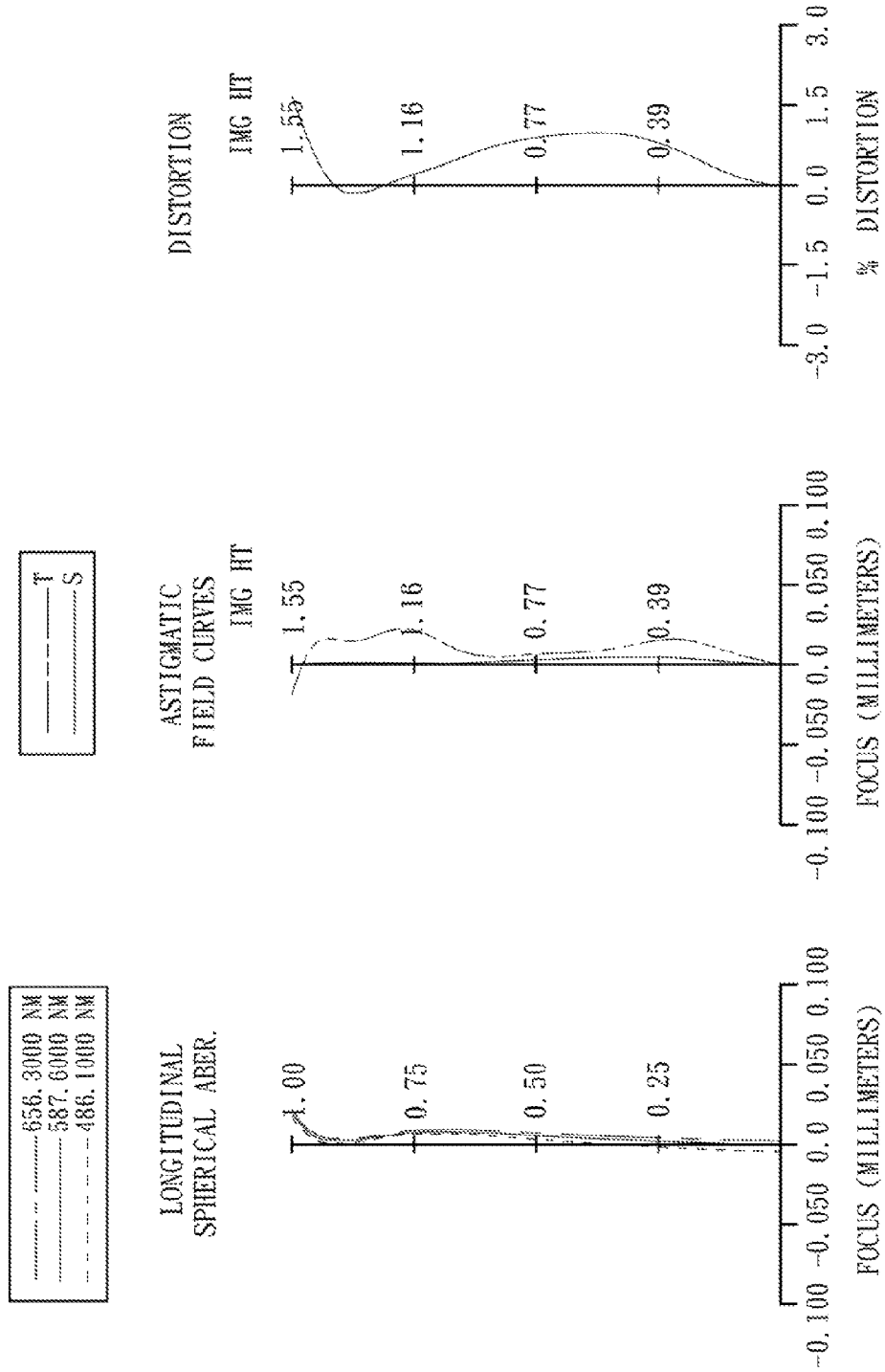
FIG. 12 shows spherical aberration curves, astigmatic field curves and a distortion curve of the image capturing optical lens assembly according to the 6th Embodiment.

FIG. 11 is a schematic view of an image capturing optical lens assembly according to the 6th embodiment of the present disclosure. FIG. 12 shows spherical aberration curves, astigmatic field curves and a distortion curve of the image capturing optical lens assembly according to the 6th embodiment. In FIG. 11, the image capturing optical lens assembly includes, in order from an object side to an image side, a first lens element 610, an aperture stop 600, a second lens element 620, a third lens element 630, a fourth lens element 640, a to fifth lens element 650, an IR-cut filter 670 and an image plane 660.

The first lens element 610 with positive refractive power has an object-side surface 611 being convex at a paraxial region and an image-side surface 612 being convex at a paraxial region. The first lens element 610 is made of plastic material, and has the object-side surface 611 and the image-side surface 612 being aspheric.

The second lens element 620 with positive refractive power has an object-side surface 621 being convex at a paraxial region and an image-side surface 622 being convex at a paraxial region. The second lens element 620 is made of plastic material, and has the object-side surface 621 and the image-side surface 622 being aspheric.

The third lens element 630 with negative refractive power has an object-side surface 631 being concave at a paraxial region, and an image-side surface 632 being concave at a paraxial region and being convex at a peripheral region. The third lens element 630 is made of plastic material, and has the object-side surface 631 and the image-side surface 632 being aspheric.

The fourth lens element 640 with positive refractive power has an object-side surface 641 being concave at a paraxial region and an image-side surface 642 being convex at a paraxial region. The fourth lens element 640 is made of plastic material, and has the object-side surface 641 and the image-side surface 642 being aspheric.

The fifth lens element 650 with negative refractive power has an object-side surface 651 being convex at a paraxial region, and an image-side surface 652 being concave at a paraxial region and being convex at a peripheral region. The fifth lens element 650 is made of plastic material, and has the object-side surface 651 and the image-side surface 652 being aspheric.

The IR-cut filter 670 is made of glass and is located between the fifth lens element 650 and the image plane 660, and will not affect the focal length of the image capturing optical lens assembly.

The detailed optical data of the 6th embodiment are shown in Table 11 and the aspheric surface data are shown in Table 12 below

TABLE 11

6th Embodiment
f = 1.57 mm, Fno = 1.98, HFOV = 44.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 18.980 | (ASP) | 0.222 | Plastic | 1.544 | 55.9 | 13.35 |
| 2 | | −11.720 | (ASP) | 0.065 | | | | |
| 3 | Ape. Stop | Plano | | −0.033 | | | | |
| 4 | Lens 2 | 1.697 | (ASP) | 0.369 | Plastic | 1.544 | 55.9 | 2.09 |
| 5 | | −3.172 | (ASP) | 0.210 | | | | |
| 6 | Lens 3 | −2.182 | (ASP) | 0.220 | Plastic | 1.640 | 23.3 | −1.82 |
| 7 | | 2.608 | (ASP) | 0.056 | | | | |
| 8 | Lens 4 | −2.641 | (ASP) | 0.573 | Plastic | 1.544 | 55.9 | 1.06 |
| 9 | | −0.509 | (ASP) | 0.030 | | | | |
| 10 | Lens 5 | 0.735 | (ASP) | 0.281 | Plastic | 1.535 | 56.3 | −2.14 |
| 11 | | 0.388 | (ASP) | 0.450 | | | | |
| 12 | IR-cut filter | Plano | | 0.300 | Glass | 1.517 | 64.2 | — |
| 13 | | Plano | | 0.112 | | | | |
| 14 | Image | Plano | | — | | | | |

Note:
Reference wavelength (d-line) is 587.6 nm.

TABLE 12

Aspheric Coefficients

| | Surface # | | | | |
|---|---|---|---|---|---|
| | 1 | 2 | 4 | 5 | 6 |
| k = | −1.0000E+00 | 3.0000E+00 | 1.2855E+00 | −8.1536E+00 | −5.1248E+00 |
| A4 = | −7.6783E−02 | 5.4530E−01 | 3.4767E−01 | −1.1971E+00 | −3.0167E+00 |
| A6 = | 9.4839E−01 | −1.4502E+00 | −2.1323E+00 | 1.1010E+00 | 3.0645E+00 |
| A8 = | −4.3768E+00 | 2.0359E+01 | 7.5543E+00 | −1.3050E+01 | −3.7550E+01 |
| A10 = | 1.3954E+01 | −1.1635E+02 | −2.3521E+00 | 4.0980E+01 | 2.3477E+02 |
| A12 = | −1.3608E+01 | 4.0141E+02 | | | −3.5785E+02 |

| | Surface # | | | | |
|---|---|---|---|---|---|
| | 7 | 8 | 9 | 10 | 11 |
| k = | −5.0000E+01 | 1.1859E+01 | −2.0454E+00 | −1.9490E+00 | −2.7390E+00 |
| A4 = | −1.0824E+00 | 7.0428E−01 | −4.5130E−01 | −1.3147E+00 | −7.4894E−01 |
| A6 = | 1.8281E+00 | −3.1481E+00 | −2.2488E−01 | 2.5827E+00 | 1.4663E+00 |
| A8 = | −1.6457E+00 | 1.5095E+01 | 2.7271E+00 | −3.7102E+00 | −2.0608E+00 |
| A10 = | | −5.0760E+01 | −4.7483E+00 | 3.6694E+00 | 1.8757E+00 |
| A12 = | | 1.1348E+02 | 2.6640E+00 | −2.3282E+00 | −1.0529E+00 |
| A14 = | | −1.4168E+02 | 1.4039E+01 | 8.5428E−01 | 3.2517E−01 |
| A16 = | | 7.5345E+01 | −1.6781E+01 | −1.3710E−01 | −4.1748E−02 |

In the image capturing optical lens assembly according to the 6th embodiment, the definitions of f, Fno, HFOV, V1, V2, T34, T45, CT2, CT4, CT5, R5, R6, ft f2, f4, MSAG52, Dsr4, ΣCT and Td are the same as those stated in the 1st embodiment with corresponding values for the 6th embodiment. Moreover, these parameters can be calculated from Table 1 and Table 12 as the following values and satisfy the following relationships:

| f (mm) | 1.57 | f/R6 | 0.60 |
|---|---|---|---|
| Fno | 1.98 | f4/f1 | 0.08 |
| HFOV (deg.) | 44.0 | f2/f1 | 0.16 |
| V2/V1 | 1.00 | MSAG52/CT5 | 1.18 |
| (T34 + T45)/CT4 | 0.15 | Dsr4/CT2 | 0.91 |
| R5/R6 | −0.84 | ΣCT/Td | 0.84 |

7th Embodiment

Figure 13:
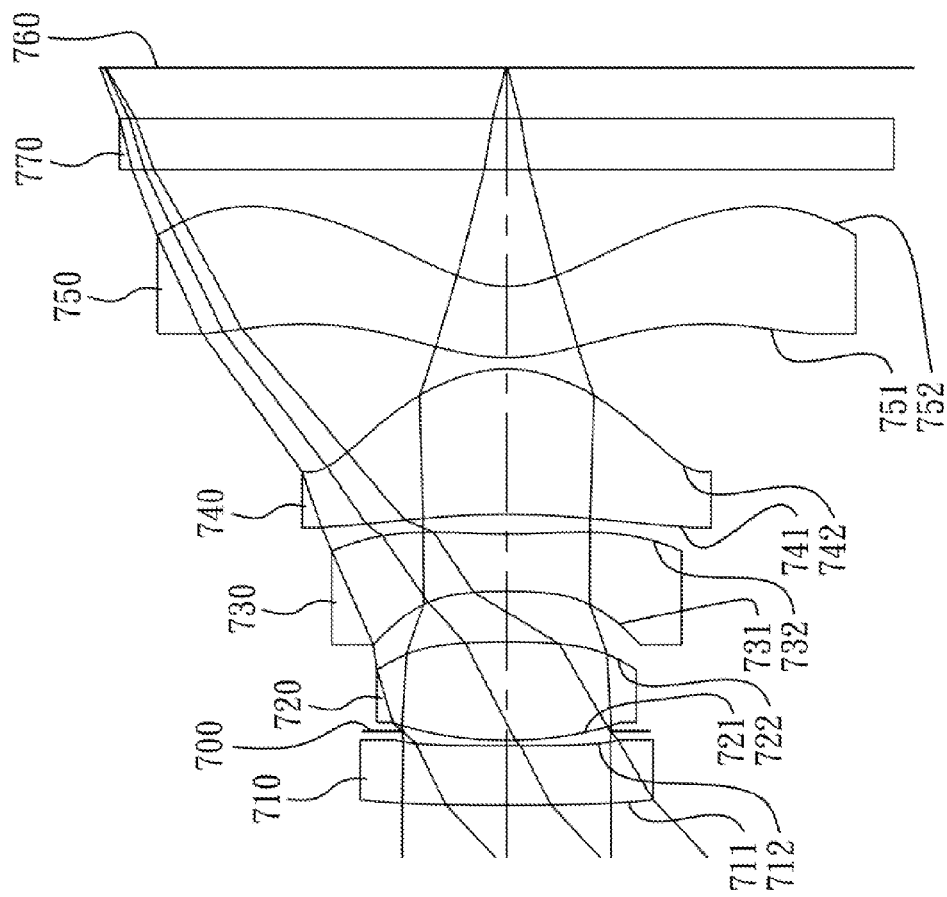
FIG. 13 is a schematic view of an image capturing optical lens assembly according to the 7th embodiment of the present disclosure.
Figure 14:
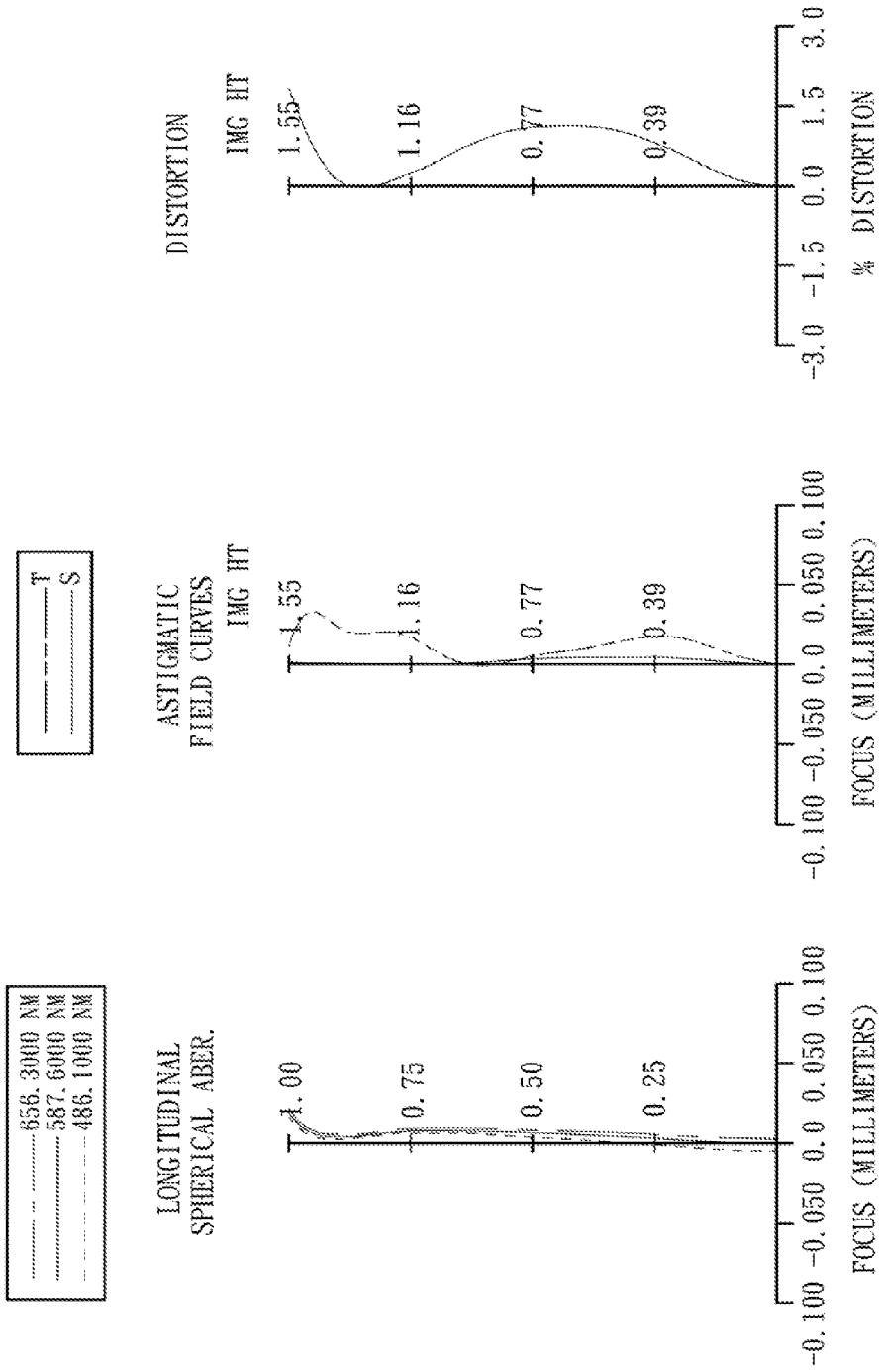
FIG. 14 shows spherical aberration curves, astigmatic field curves and a distortion curve of the image capturing optical lens assembly according to the 7th Embodiment.

FIG. 13 is a schematic view of an image capturing optical lens assembly according to the 7th embodiment of the present disclosure. FIG. 14 shows spherical aberration curves, astigmatic field curves and a distortion curve of the image capturing optical lens assembly according to the 7th embodiment. In FIG. 13, the image capturing optical lens assembly includes, in order from an object side to an image side, a first lens element 710, an aperture stop 700, a second lens element 720, a third lens element 730, a fourth lens element 740, a fifth lens element 750, an IR-cut filter 770 and an image plane 760.

The first lens element 710 with positive refractive power has an object-side surface 711 being convex at a paraxial region and an image-side surface 712 being concave at a paraxial region. The first lens element 710 is made of plastic material, and has the object-side surface 711 and the image-side surface 712 being aspheric.

The second lens element 720 with positive refractive power has an object-side surface 721 being convex at a paraxial region and an image-side surface 722 being convex at a paraxial region. The second lens element 720 is made of plastic material, and has the object-side surface 721 and the image-side surface 722 being aspheric.

The third lens element 730 with negative refractive power has an object-side surface 731 being concave at a paraxial region, and an image-side surface 732 being concave at a paraxial region and being convex at a peripheral region. The third lens element 730 is made of plastic material, and has the object-side surface 731 and the image-side surface 732 being aspheric.

The fourth lens element 740 with positive refractive power has an object-side surface 741 being concave at a paraxial region and an image-side surface 742 being convex at a paraxial region. The fourth lens element 740 is made of plastic material, and has the object-side surface 741 and the image-side surface 742 being aspheric.

The fifth lens element 750 with negative refractive power has an object-side surface 751 being convex at a paraxial region, and an image-side surface 752 being concave at a paraxial region and being convex at a peripheral region. The fifth lens element 750 is made of plastic material, and has the object-side surface 751 and the image-side surface 752 being aspheric.

The IR-cut filter 770 is made of glass and is located between the fifth lens element 750 and the image plane 760, and will not affect the focal length of the image capturing optical lens assembly.

The detailed optical data of the 7th embodiment are shown in Table 13 and the aspheric surface data are shown in Table 14 below.

TABLE 13

7th Embodiment
f = 1.61 mm, Fno = 2.00, HFOV = 43.3 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 9.854 | (ASP) | 0.233 | Plastic | 1.535 | 56.3 | 20.50 |
| 2 | | 96.852 | (ASP) | 0.055 | | | | |
| 3 | Ape. Stop | Plano | | −0.035 | | | | |
| 4 | Lens 2 | 1.546 | (ASP) | 0.378 | Plastic | 1.544 | 55.9 | 2.05 |
| 5 | | −3.660 | (ASP) | 0.197 | | | | |
| 6 | Lens 3 | −2.364 | (ASP) | 0.220 | Plastic | 1.640 | 23.3 | −1.95 |
| 7 | | 2.732 | (ASP) | 0.076 | | | | |
| 8 | Lens 4 | −2.619 | (ASP) | 0.563 | Plastic | 1.544 | 55.9 | 1.09 |
| 9 | | −0.519 | (ASP) | 0.044 | | | | |
| 10 | Lens 5 | 0.737 | (ASP) | 0.273 | Plastic | 1.535 | 56.3 | −2.13 |
| 11 | | 0.389 | (ASP) | 0.450 | | | | |
| 12 | IR-cut filter | Plano | | 0.200 | Glass | 1.517 | 64.2 | — |
| 13 | | Plano | | 0.196 | | | | |
| 14 | Image | Plano | | — | | | | |

Note:
Reference wavelength (d-line) is 587.6 nm.

TABLE 14

Aspheric Coefficients

| | Surface # | | | | |
|---|---|---|---|---|---|
| | 1 | 2 | 4 | 5 | 6 |
| k = | −1.0000E+00 | −1.0000E+00 | −3.5985E−01 | −7.5381E+00 | −1.3772E+01 |
| A4 = | −7.5127E−02 | 4.4628E−01 | 2.7957E−01 | −1.1963E+00 | −2.9506E+00 |
| A6 = | 8.8504E−01 | −1.8065E+00 | −2.0377E+00 | 1.0425E+00 | 3.1036E+00 |
| A8 = | −4.4994E+00 | 2.2315E+01 | 8.3850E+00 | −1.2839E+01 | −3.8772E+01 |
| A10 = | 1.3559E+01 | −1.1271E+02 | −5.9778E+00 | 3.7250E+01 | 2.3036E+02 |
| A12 = | −1.2811E+01 | 3.5621E+02 | | | −3.4319E+02 |

| | Surface # | | | | |
|---|---|---|---|---|---|
| | 7 | 8 | 9 | 10 | 11 |
| k = | −3.0000E+01 | 1.1442E+01 | −2.1043E+00 | −2.0443E+00 | −2.7423E+00 |
| A4 = | −1.1512E+00 | 6.4282E−01 | −4.4544E−01 | −1.3269E+00 | −7.7339E−01 |
| A6 = | 1.8250E+00 | −3.1103E+00 | −2.1148E−01 | 2.5852E+00 | 1.4789E+00 |
| A8 = | −1.3976E+00 | 1.5228E+01 | 2.7095E+00 | −3.7017E+00 | −2.0704E+00 |
| A10 = | | −5.0724E+01 | −4.8380E+00 | 3.6687E+00 | 1.8765E+00 |
| A12 = | | 1.1339E+02 | 2.5749E+00 | −2.3301E+00 | −1.0508E+00 |
| A14 = | | −1.4187E+02 | 1.4052E+01 | 8.5303E−01 | 3.2560E−01 |
| A16 = | | 7.5368E+01 | −1.6430E+01 | −1.3620E−01 | −4.2207E−02 |

In the image capturing optical lens assembly according to the 7th embodiment, the definitions of f, Fno, HFOV, V1, V2, T34, T45, CT2, CT4, CT5, R5, R6, f1, f2, f4, MSAG52, Dsr4, ΣCT and Td are the same as those stated in the 1st embodiment with corresponding values for the 7th embodiment. Moreover, these parameters can be calculated from Table 13 and Table 14 as the following values and satisfy the following relationships:

| | | | |
|---|---|---|---|
| f (mm) | 1.61 | f/R6 | 0.59 |
| Fno | 2.00 | f4/f1 | 0.05 |
| HFOV (deg.) | 43.3 | f2/f1 | 0.10 |
| V2/V1 | 0.99 | MSAG52/CT5 | 1.14 |
| (T34 + T45)/CT4 | 0.21 | Dsr4/CT2 | 0.91 |
| R5/R6 | −0.87 | ΣCT/Td | 0.83 |

8th Embodiment

Figure 15:
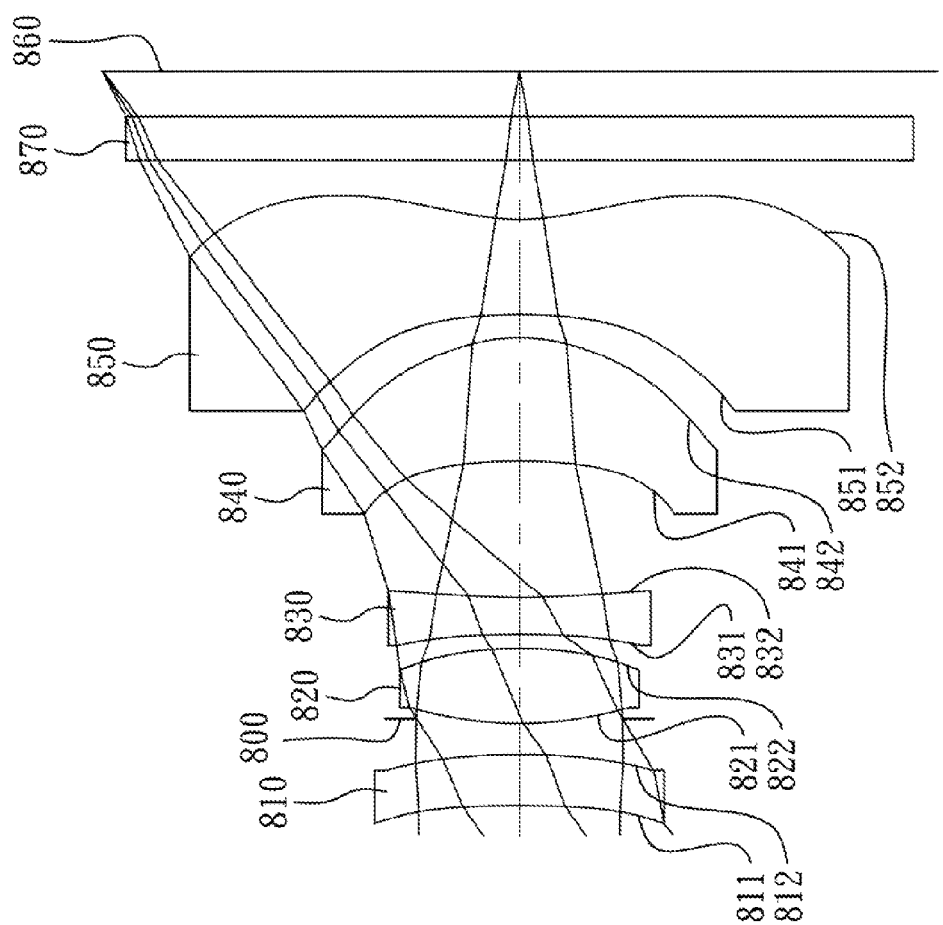
FIG. 15 is a schematic view of an image capturing optical lens assembly according to the 8th embodiment of the present disclosure.
Figure 16:
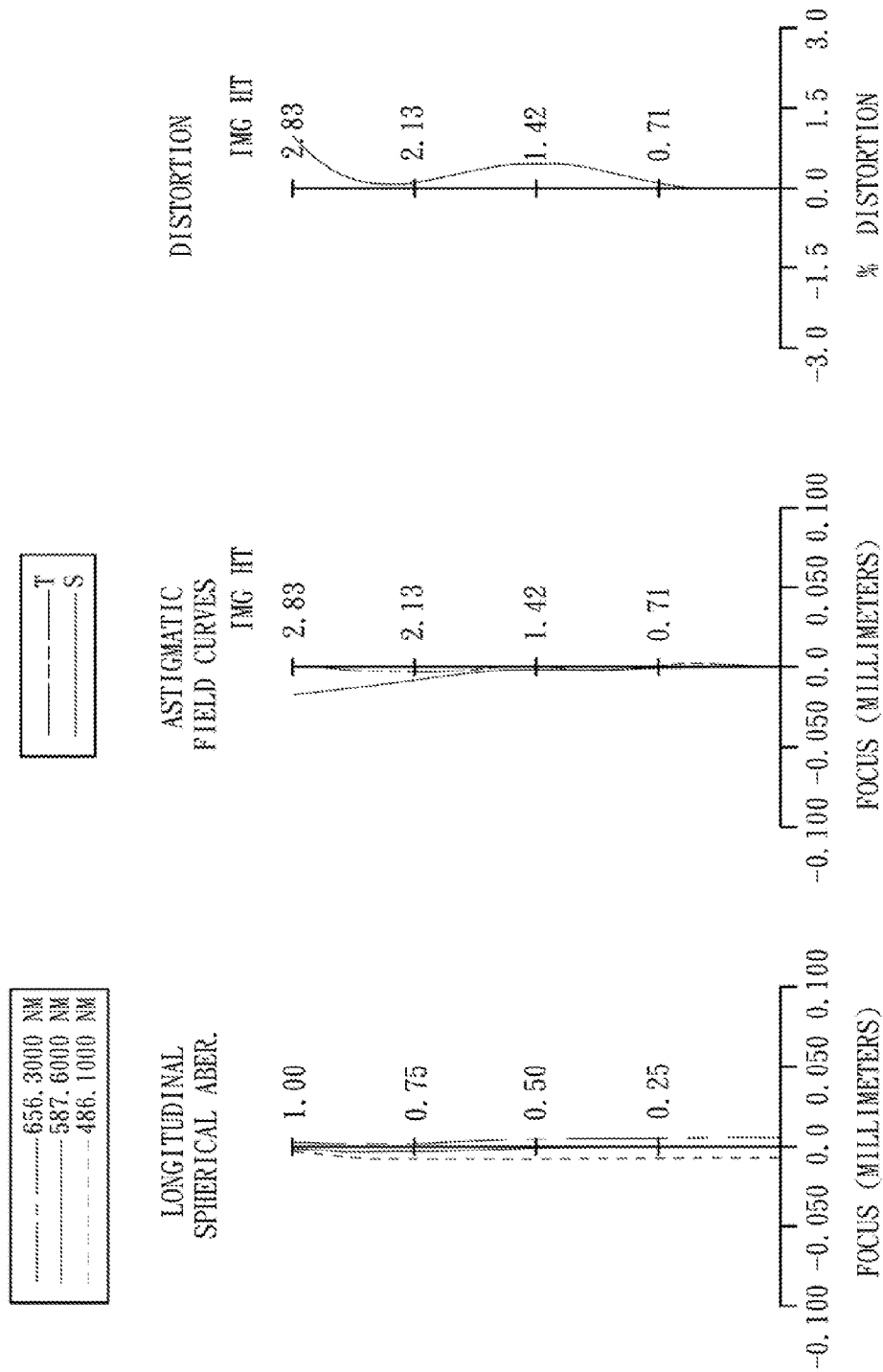
FIG. 16 shows spherical aberration curves, astigmatic field curves and a distortion curve of the image capturing optical lens assembly according to the 8th Embodiment.

FIG. 15 is a schematic view of an image capturing optical lens assembly according to the 8th embodiment of the present disclosure. FIG. 16 shows spherical aberration curves, astigmatic field curves and a distortion curve of the to image capturing optical lens assembly according to the 8th embodiment. FIG. 15, the image capturing optical lens assembly includes, in order from an object side to an image side, a first lens element 810, an aperture stop 800, a second lens element 820, a third lens element 830, a fourth lens element 840, a fifth lens element 850, an IR-cut filter 870 and an image plane 860.

The first lens element 810 with positive refractive power has an object-side surface 811 being concave at a paraxial region and an image-side surface 812 being convex at a paraxial region. The first lens element 810 is made of plastic material, and has the object-side surface 811 and the image-side surface 812 being aspheric.

The second lens element 820 with positive refractive power has an object-side surface 821 being convex at a paraxial region and an image-side surface 822 being convex at a paraxial region. The second lens element 820 is made of glass material, and has the object-side surface 821 and the image-side surface 822 being aspheric.

The third lens element 830 with negative refractive power has an object-side surface 831 being concave at a paraxial region and an image-side surface 832 being concave at a paraxial region. The third lens element 830 is made of plastic material, and has the object-side surface 831 and the image-side surface 832 being aspheric.

The fourth lens element 840 with positive refractive power has an object-side surface 841 being concave at a paraxial region and an image-side surface 842 being convex at a paraxial region. The fourth lens element 840 is made of plastic material, and has the object-side surface 841 and the image-side surface 842 being aspheric.

The fifth lens element 850 with negative refractive power has an object-side surface 851 being concave at a paraxial region, and an image-side surface 852 being concave at a paraxial region and being convex at a peripheral region. The fifth lens element 850 is made of plastic material, and has the object-side surface 851 and the image-side surface 852 being aspheric.

The IR-cut filter 870 is made of glass and is located between the fifth lens element 850 and the image plane 860, and will not affect the focal length of the image capturing optical lens assembly.

The detailed optical data of the 8th embodiment are shown in Table 15 and the aspheric surface data are shown in Table 16 below.

TABLE 15

8th Embodiment
f = 3.82 mm, Fno = 2.80, HFOV = 36.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | −13.559 (ASP) | 0.350 | Plastic | 1.640 | 23.3 | 20.64 |
| 2 | | −6.757 (ASP) | 0.247 | | | | |
| 3 | Ape. Stop | Plano | −0.033 | | | | |
| 4 | Lens 2 | 2.481 (ASP) | 0.510 | Glass | 1.542 | 62.9 | 2.45 |
| 5 | | −2.666 (ASP) | 0.094 | | | | |
| 6 | Lens 3 | −9.437 (ASP) | 0.250 | Plastic | 1.633 | 23.4 | −4.99 |
| 7 | | 4.778 (ASP) | 0.932 | | | | |
| 8 | Lens 4 | −3.261 (ASP) | 0.837 | Plastic | 1.640 | 23.3 | 2.53 |
| 9 | | −1.189 (ASP) | 0.158 | | | | |
| 10 | Lens 5 | −4.013 (ASP) | 0.648 | Plastic | 1.633 | 23.4 | −1.64 |
| 11 | | 1.489 (ASP) | 0.400 | | | | |
| 12 | IR-cut filter | Plano | 0.300 | Glass | 1.517 | 64.2 | — |
| 13 | | Plano | 0.307 | | | | |
| 14 | Image | Plano | — | | | | |

Note:
Reference wavelength (d-line) is 587.6 nm.

TABLE 16

Aspheric Coefficients

| | Surface # | | | | |
|---|---|---|---|---|---|
| | 1 | 2 | 4 | 5 | 6 |
| k = | 1.0000E+01 | 8.9476E+00 | 3.3761E+00 | 1.4950E+00 | 1.0000E+01 |
| A4 = | −1.1454E−01 | −1.1527E−01 | −4.7586E−02 | −7.0248E−03 | −1.2092E−01 |
| A6 = | 1.7010E−02 | 7.6180E−02 | 2.0795E−02 | −5.8664E−02 | 2.9657E−02 |
| A8 = | 2.3942E−02 | −6.4195E−03 | −6.9425E−02 | 2.1705E−02 | 4.8607E−02 |

TABLE 16-continued

| Aspheric Coefficients | | | | |
|---|---|---|---|---|
| A10 = | −1.8348E−02 | −2.6961E−02 | 1.3241E−02 | 3.0389E−02 | 3.1663E−03 |
| A12 = | 6.6573E−03 | 2.2185E−02 | −5.9374E−02 | −6.9840E−02 | 9.5331E−03 |

| Surface # | | | | |
|---|---|---|---|---|
| | 7 | 8 | 9 | 10 | 11 |
| k = | −4.2924E+01 | −1.2629E+00 | −4.5719E+00 | 4.3012E+00 | −1.0000E+01 |
| A4 = | −5.9843E−02 | −3.9993E−02 | −9.4307E−02 | −8.6021E−02 | −7.3738E−02 |
| A6 = | 2.2691E−02 | −6.9406E−02 | −8.5448E−03 | −3.8436E−02 | 2.2225E−02 |
| A8 = | 2.0207E−02 | −4.5155E−02 | −4.2101E−03 | 3.0305E−02 | −5.2936E−03 |
| A10 = | −1.0724E−02 | 2.6135E−02 | −2.0945E−03 | 2.0042E−03 | 7.1766E−04 |
| A12 = | 6.2971E−03 | −1.4039E−02 | 3.7558E−03 | −2.7160E−03 | −4.6209E−05 |

In the image capturing optical lens assembly according to the 8th embodiment, the definitions of f, Fno, HFOV, V1, V2, T34, T45, CT2, CT4, CT5, R5, R6, f1, f2, f4, MSAG52, Dsr4, ΣCT and Td are the same as those stated in the 1st embodiment with corresponding values for the 8th embodiment. Moreover, these parameters can be calculated from Table 15 and Table 16 as the following values and satisfy the following relationships:

| f (mm) | 3.82 | f/R6 | 0.80 |
|---|---|---|---|
| Fno | 2.80 | f4/f1 | 0.12 |
| HFOV (deg.) | 36.3 | f2/f1 | 0.12 |
| V2/V1 | 2.70 | MSAG52/CT5 | 0.25 |
| (T34 + T45)/CT4 | 1.30 | Dsr4/CT2 | 0.94 |
| R5/R6 | −1.99 | ΣCT/Td | 0.65 |

9th Embodiment

Figure 17:
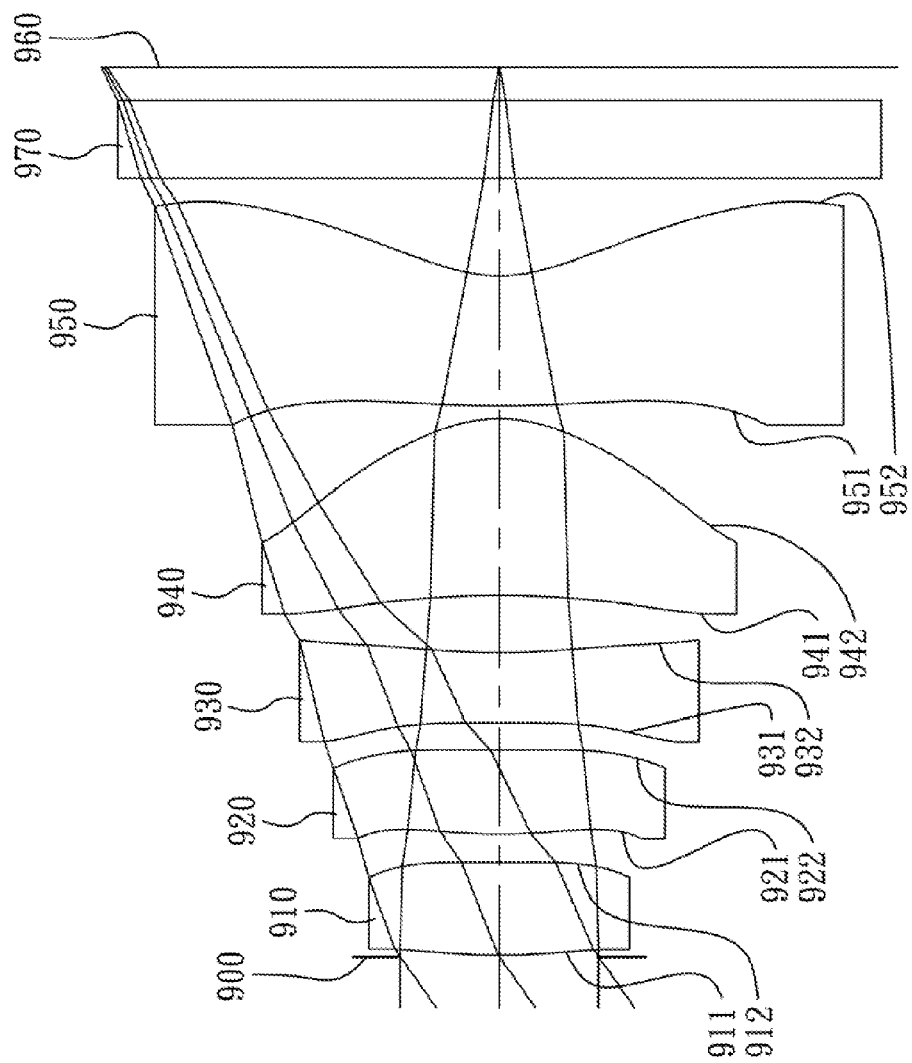
FIG. 17 is a schematic view of an image capturing optical lens assembly according to the 9th embodiment of the present disclosure.
Figure 18:
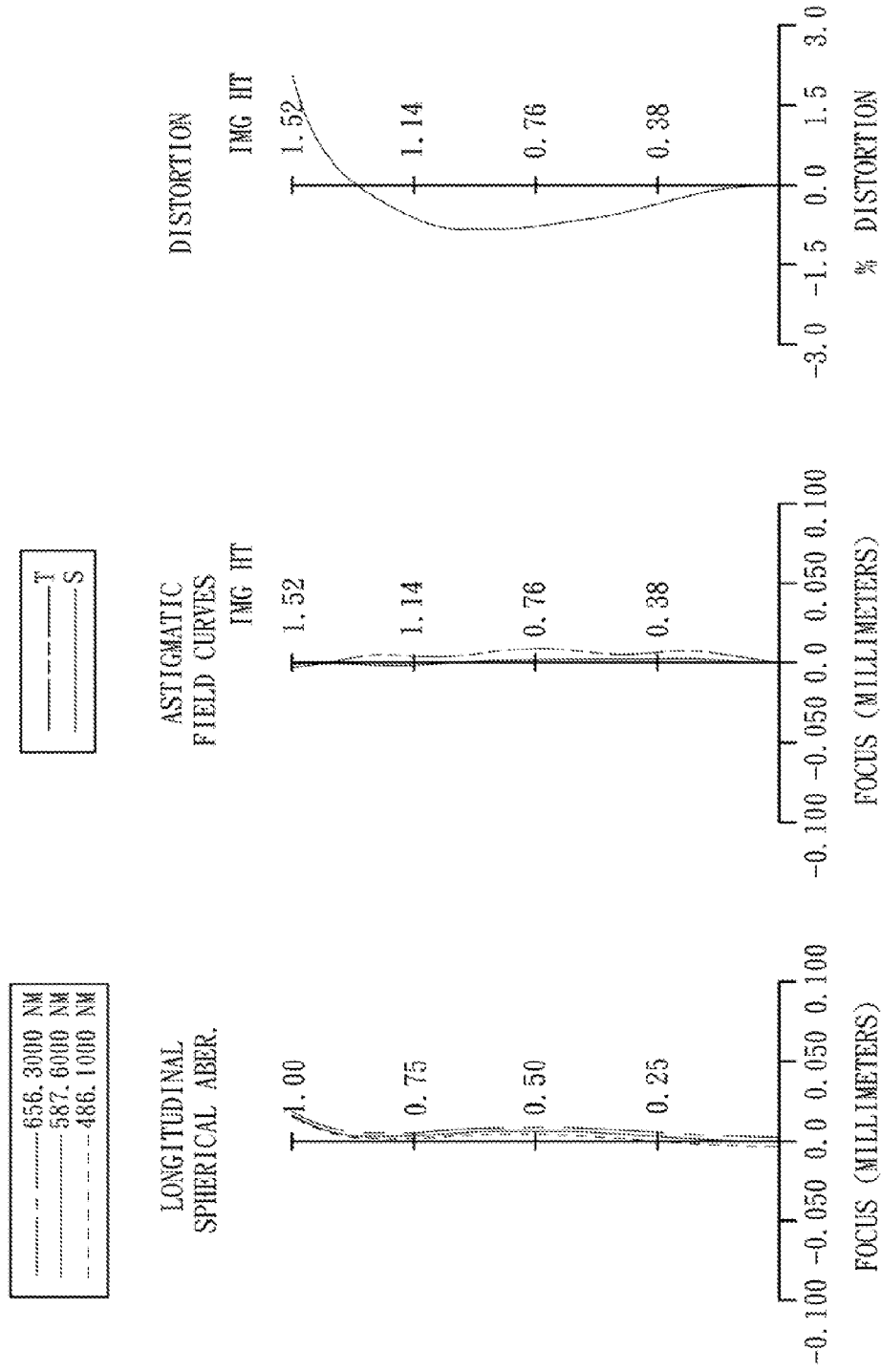
FIG. 18 shows spherical aberration curves, astigmatic field curves and a distortion curve of the image capturing optical lens assembly according to the 9th Embodiment.

FIG. 17 is a schematic view of an image capturing optical lens assembly according to the 9th embodiment of the present disclosure. FIG. 18 shows spherical aberration curves, astigmatic field curves and a distortion curve of the image capturing optical lens assembly according to the 9th embodiment. FIG. 17, the image capturing optical lens assembly includes, in order from an object side to an image side, an aperture stop 900, a first lens element 910, a second lens element 920, a third lens element 930, a fourth lens element 940, a fifth lens element 950, an IR-cut filter 970 and an image plane 960.

The first lens element 910 with positive refractive power has an object-side surface 911 being convex at a paraxial region and an image-side surface 912 being concave at a paraxial region. The first lens element 910 is made of plastic material, and has the object-side surface 911 and the image-side surface 912 being aspheric.

The second lens element 920 with positive refractive power has an object-side surface 921 being convex at a paraxial region and an image-side surface 922 being concave at a paraxial region. The second lens element 920 is made of plastic material, and has the object-side surface 921 and the image-side surface 922 being aspheric.

The third lens element 930 with negative refractive power has an object-side surface 931 being convex at a paraxial region and an image-side surface 932 being concave at a paraxial region. The third lens element 930 is made of plastic material, and has the object-side surface 931 and the image-side surface 932 being aspheric.

The fourth lens element 940 with positive refractive power has an object-side surface 941 being concave at a paraxial region and an image-side surface 942 being convex at a paraxial region. The fourth lens element 940 is made of plastic material, and has the object-side surface 941 and the image-side surface 942 being aspheric.

The fifth lens element 950 with negative refractive power has an object-side surface 951 being convex at a paraxial region, and an image-side surface 952 being concave at a paraxial region and being convex at a peripheral region. The fifth lens element 950 is made of plastic material, and has the object-side surface 951 and the image-side surface 952 being aspheric.

The IR-cut filter 970 is made of glass and is located between the fifth lens element 950 and the image plane 960, and will not affect the focal length of the image capturing optical lens assembly.

The detailed optical data of the 9th embodiment are shown in Table 17 and the aspheric surface data are shown in Table 18 below.

TABLE 17

9th Embodiment
f = 2.14 mm, Fno = 2.80, HFOV = 34.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.006 | | | | |
| 2 | Lens 1 | 2.594 (ASP) | 0.356 | Plastic | 1.544 | 55.9 | 4.96 |
| 3 | | 62.194 (ASP) | 0.110 | | | | |
| 4 | Lens 2 | 2.025 (ASP) | 0.324 | Plastic | 1.544 | 55.9 | 4.37 |
| 5 | | 12.891 (ASP) | 0.105 | | | | |
| 6 | Lens 3 | 231.030 (ASP) | 0.270 | Plastic | 1.632 | 23.4 | −4.02 |
| 7 | | 2.513 (ASP) | 0.218 | | | | |
| 8 | Lens 4 | −3.398 (ASP) | 0.683 | Plastic | 1.544 | 55.9 | 1.14 |
| 9 | | −0.561 (ASP) | 0.050 | | | | |

TABLE 17-continued

9th Embodiment
f = 2.14 mm, Fno = 2.80, HFOV = 34.8 deg.

| Surface # | | Curvature Radius | | Thickness | Material | Index | Abbe # | Focal length |
|---|---|---|---|---|---|---|---|---|
| 10 | Lens 5 | 4.453 | (ASP) | 0.501 | Plastic | 1.583 | 30.2 | −1.18 |
| 11 | | 0.571 | (ASP) | 0.375 | | | | |
| 12 | IR-cut filter | Plano | | 0.300 | Glass | 1.517 | 64.2 | — |
| 13 | | Plano | | 0.125 | | | | |
| 14 | Image | Plano | | — | | | | |

Note:
Reference wavelength (d-line) is 587.6 nm.

TABLE 18

Aspheric Coefficients

Surface #

| | 2 | 3 | 4 | 5 | 6 |
|---|---|---|---|---|---|
| k = | −2.0095E+01 | −5.0000E+01 | −2.1403E+01 | −5.0000E+01 | −5.0000E+01 |
| A4 = | −7.5972E−02 | −8.5969E−01 | −4.5346E−01 | −5.1447E−01 | −9.0657E−01 |
| A6 = | −6.0096E−01 | −5.9495E−01 | −1.1971E+00 | 1.8239E−02 | 1.3287E+00 |
| A8 = | 2.0453E+00 | 2.8291E+00 | −4.4368E−01 | −1.6531E+00 | −9.9280E−01 |
| A10 = | −1.4697E+01 | −9.9027E+00 | 3.0550E−01 | 4.8368E+00 | 2.6188E+00 |
| A12 = | 5.6231E−01 | −5.9214E−02 | 2.2322E+00 | −2.0724E+00 | −2.2998E+00 |
| A14 = | 5.4807E−03 | 1.3692E−01 | −5.4079E+00 | 8.0262E−02 | |

Surface #

| | 7 | 8 | 9 | 10 | 11 |
|---|---|---|---|---|---|
| k = | −1.0000E+00 | −1.0000E+00 | −3.2847E+00 | −1.0000E+00 | −5.2198E+00 |
| A4 = | −5.0101E−01 | 1.1237E−01 | −3.2414E−01 | −1.2209E−01 | −1.2311E−01 |
| A6 = | 7.8753E−01 | −2.6602E−01 | 3.2139E−01 | −2.9346E−01 | 2.2392E−03 |
| A8 = | −6.4419E−01 | 1.7074E−01 | −1.5709E−01 | 5.0458E−01 | 5.2424E−02 |
| A10 = | 2.2740E−01 | 2.8315E−01 | −5.5291E−02 | −2.2138E−01 | −2.7372E−02 |
| A12 = | 1.2788E−01 | −1.3795E−01 | 2.5178E−01 | −1.3845E−01 | −3.8515E−03 |
| A14 = | | −1.0057E−02 | −6.1133E−02 | 9.8040E−02 | 3.5376E−03 |

In the image capturing optical lens assembly according to the 9th embodiment, the definitions of f, Fno, HFOV, V1, V2, T34, T45, CT2, CT4, CT5, R5, R6, f1, f2, f4, MSAG52, Dsr4, ΣCT and Td are the same as those stated in the 1st embodiment with corresponding values for the 9th embodiment. Moreover, these parameters can be calculated from Table 17 and Table 18 as the following values and satisfy the following relationships:

| f (mm) | 2.14 | f/R6 | 0.85 |
|---|---|---|---|
| Fno | 2.80 | f4/f1 | 0.23 |
| HFOV (deg.) | 34.8 | f2/f1 | 0.88 |
| V2/V1 | 1.00 | MSAG52/CT5 | 0.57 |
| (T34 + T45)/CT4 | 0.39 | Dsr4/CT2 | 2.46 |
| R5/R6 | 91.94 | ΣCT/Td | 0.82 |

10th Embodiment

Figure 19:
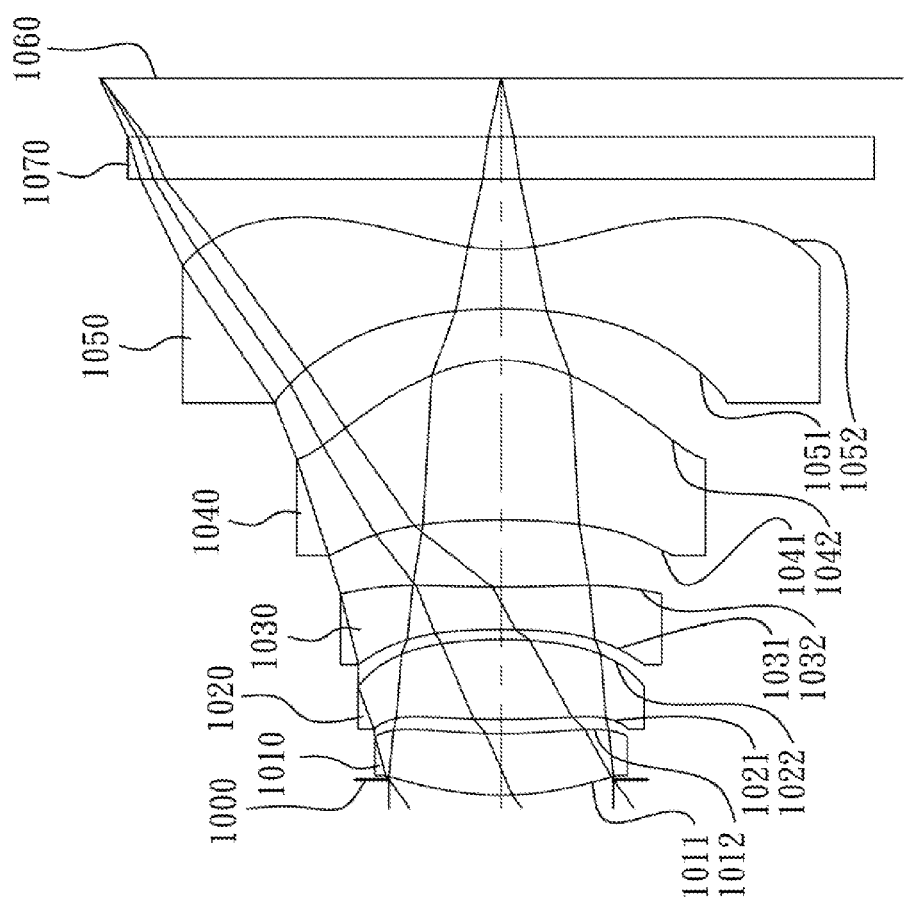
FIG. 19 is a schematic view of an image capturing optical lens assembly according to the 10th embodiment of the present disclosure.
Figure 20:
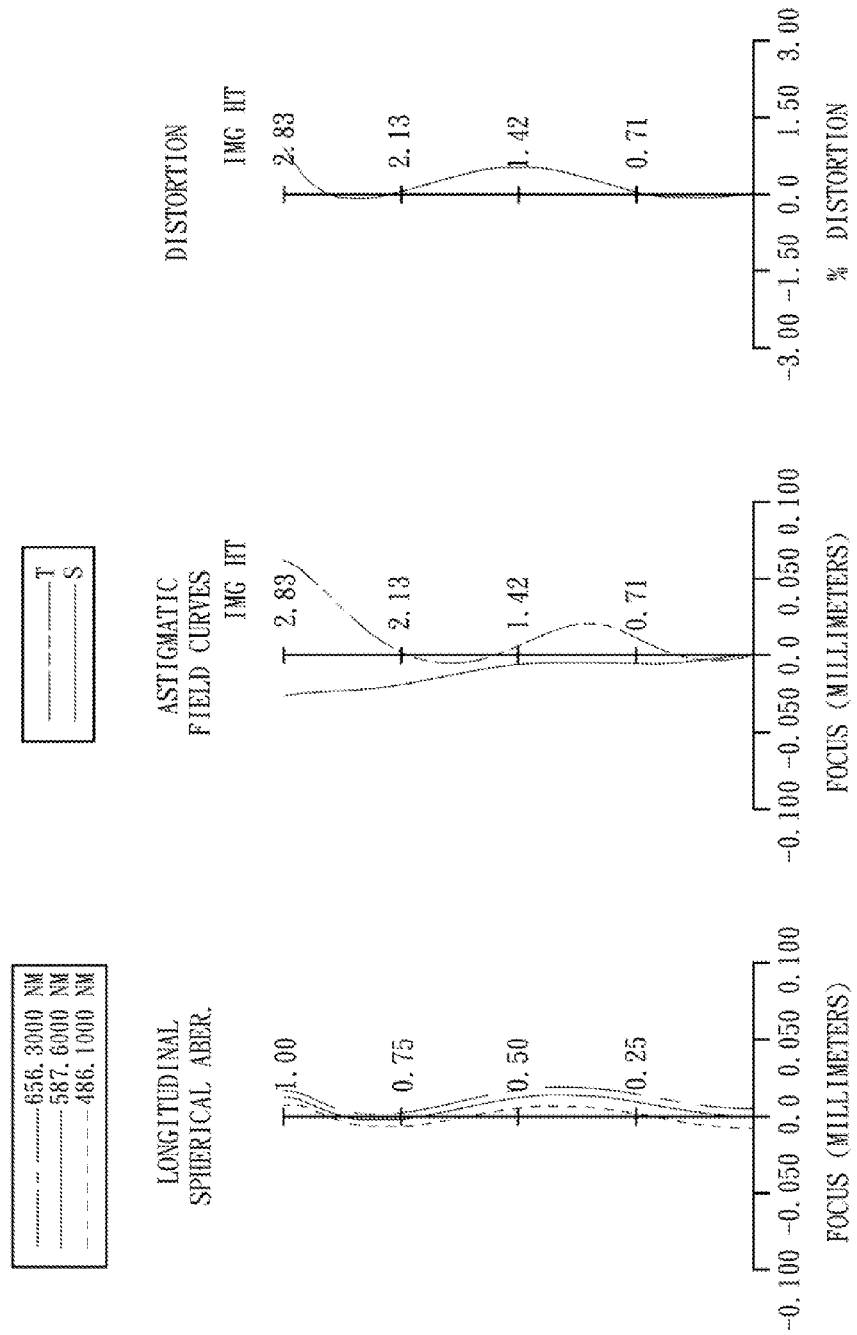
FIG. 20 shows spherical aberration curves, astigmatic field curves and a distortion curve of the image capturing optical lens assembly according to the 10th Embodiment.

FIG. 19 is a schematic view of an image capturing optical lens assembly according to the 10th embodiment of the present disclosure. FIG. 20 shows spherical aberration curves, astigmatic field curves and a distortion curve of the image capturing optical lens assembly according to the 10th embodiment, in FIG. 19, the image capturing optical lens assembly includes, in order from an object side to an image side, an aperture stop 1000, a first lens element 1010, a second lens element 1020, a third lens element 1030, a fourth lens element 1040, a fifth lens element 1050, an IR-cut filter 1070 and an image plane 1060.

The first lens element 1010 with positive refractive power has an object-side surface 1011 being convex at a paraxial region and an image-side surface 1012 being concave at a paraxial region. The first lens element 1010 is made of plastic material, and has the object-side surface 1011 and the image-side surface 1012 being aspheric.

The second lens element 1020 with positive refractive power has an object-side surface 1021 being convex at a paraxial region and an image-side surface 1022 being convex at a paraxial region. The second lens element 1020 is made of plastic material, and has the object-side surface 1021 and the image-side surface 1022 being aspheric.

The third lens element 1030 with negative refractive power has an object-side surface 1031 being concave at a paraxial region, and an image-side surface 1032 being concave at a paraxial region and being convex at a peripheral region. The third lens element 1030 is made of plastic material, and has the object-side surface 1031 and the image-side surface 1032 being aspheric.

The fourth lens element 1040 with positive refractive power has an object-side surface 1041 being concave at a paraxial region and an image-side surface 1042 being convex at a paraxial region. The fourth lens element 1040 is made of plastic material, and has the abject-side surface 1041 and the image-side surface 1042 being aspheric.

The fifth lens element 1050 with negative refractive power has an object-side surface 1051 being concave at a paraxial region, and an image-side surface 1052 being concave at a paraxial region and being convex at a peripheral region. The fifth lens element 1050 is made of plastic material, and has the object-side surface 1051 and the image-side surface 1052 being aspheric.

The IR-cut filter 1070 is made of glass and is located between the fifth lens element 1050 and the image plane 1060, and will not affect the focal length of the image capturing optical lens assembly.

The detailed optical data of the 10th embodiment are shown in Table 19 and the aspheric surface data are shown in Table 20 below.

| f (mm) | 3.82 | f/R6 | 0.46 |
|---|---|---|---|
| Fno | 2.40 | f4/f1 | 0.28 |
| HFOV (deg.) | 36.3 | f2/f1 | 0.49 |
| V2/V1 | 1.00 | MSAG52/CT5 | 0.55 |
| (T34 + T45)/CT4 | 0.75 | Dsr4/CT2 | 1.76 |
| R5/R6 | −0.55 | ΣCT/Td | 0.74 |

TABLE 19

10th Embodiment
f = 3.82 mm, Fno = 2.40, HFOV = 36.3 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.110 | | | | |
| 2 | Lens 1 | 2.201 | (ASP) | 0.442 | Plastic | 1.544 | 55.9 | 7.49 |
| 3 | | 4.445 | (ASP) | 0.100 | | | | |
| 4 | Lens 2 | 5.785 | (ASP) | 0.568 | Plastic | 1.544 | 55.9 | 3.65 |
| 5 | | −2.918 | (ASP) | 0.070 | | | | |
| 6 | Lens 3 | −4.656 | (ASP) | 0.300 | Plastic | 1.633 | 23.4 | −4.69 |
| 7 | | 8.389 | (ASP) | 0.480 | | | | |
| 8 | Lens 4 | −5.605 | (ASP) | 1.133 | Plastic | 1.544 | 55.9 | 2.13 |
| 9 | | −1.029 | (ASP) | 0.366 | | | | |
| 10 | Lens 5 | −3.300 | (ASP) | 0.422 | Plastic | 1.530 | 55.8 | −1.77 |
| 11 | | 1.373 | (ASP) | 0.500 | | | | |
| 12 | IR-cut filter | Plano | | 0.300 | Glass | 1.517 | 64.2 | — |
| 13 | | Plano | | 0.419 | | | | |
| 14 | Image | Plano | | — | | | | |

Note:
Reference wavelength (d-line) is 587.6 nm.

TABLE 20

Aspheric Coefficients

| | Surface # | | | | |
|---|---|---|---|---|---|
| | 2 | 3 | 4 | 5 | 6 |
| k = | −7.2312E−01 | −1.4292E+01 | −1.5000E+01 | −4.8451E+00 | −1.5000E+01 |
| A4 = | −1.3412E−02 | −3.1216E−02 | −4.2314E−02 | −3.4194E−02 | −1.0031E−01 |
| A6 = | 1.7027E−02 | −8.1117E−02 | −5.6942E−02 | −1.2787E−01 | −7.6333E−02 |
| A8 = | −1.0435E−01 | −7.3832E−02 | −1.2676E−01 | −4.2261E−03 | −2.7225E−02 |
| A10 = | 1.2063E−01 | −5.4938E−02 | −5.5374E−02 | 1.5150E−02 | 7.9719E−02 |
| A12 = | −8.7563E−02 | 3.3716E−02 | 6.1353E−03 | −8.4815E−03 | −2.2516E−02 |

| | Surface # | | | | |
|---|---|---|---|---|---|
| | 7 | 8 | 9 | 10 | 11 |
| k = | −1.0170E+01 | 1.5000E+01 | −2.6878E+00 | 1.0956E+00 | −7.4867E+00 |
| A4 = | −7.7567E−02 | 6.4444E−02 | −2.5078E−02 | −7.9925E−03 | −5.6144E−02 |
| A6 = | −4.6559E−03 | 3.0893E−02 | −1.2324E−02 | −3.5105E−02 | 1.3474E−02 |
| A8 = | −6.2250E−03 | 4.8720E−02 | 6.0027E−03 | 1.8040E−02 | −2.8103E−03 |
| A10 = | 4.9848E−03 | 7.5048E−03 | 1.2169E−03 | −1.5640E−03 | 3.6889E−04 |
| A12 = | 3.5252E−03 | 8.1203E−03 | −4.3134E−04 | −7.1898E−04 | −3.8055E−05 |
| A14 = | | | 3.0526E−04 | 5.0159E−05 | 1.7602E−06 |

In the image capturing optical lens assembly according to the 10th embodiment, the definitions of f, Fno, HFOV, V1, V2, T34, T45, CT2, CT4, CT5, R5, R6, f1, f2, f4, MSAG52, Dsr4, ΣCT and Td are the same as those stated in the 1st embodiment with corresponding values for the 10th embodiment. Moreover, these parameters can be calculated from Table 19 and Table 20 as the following values and satisfy the following relationships:

11th Embodiment

Figure 21:
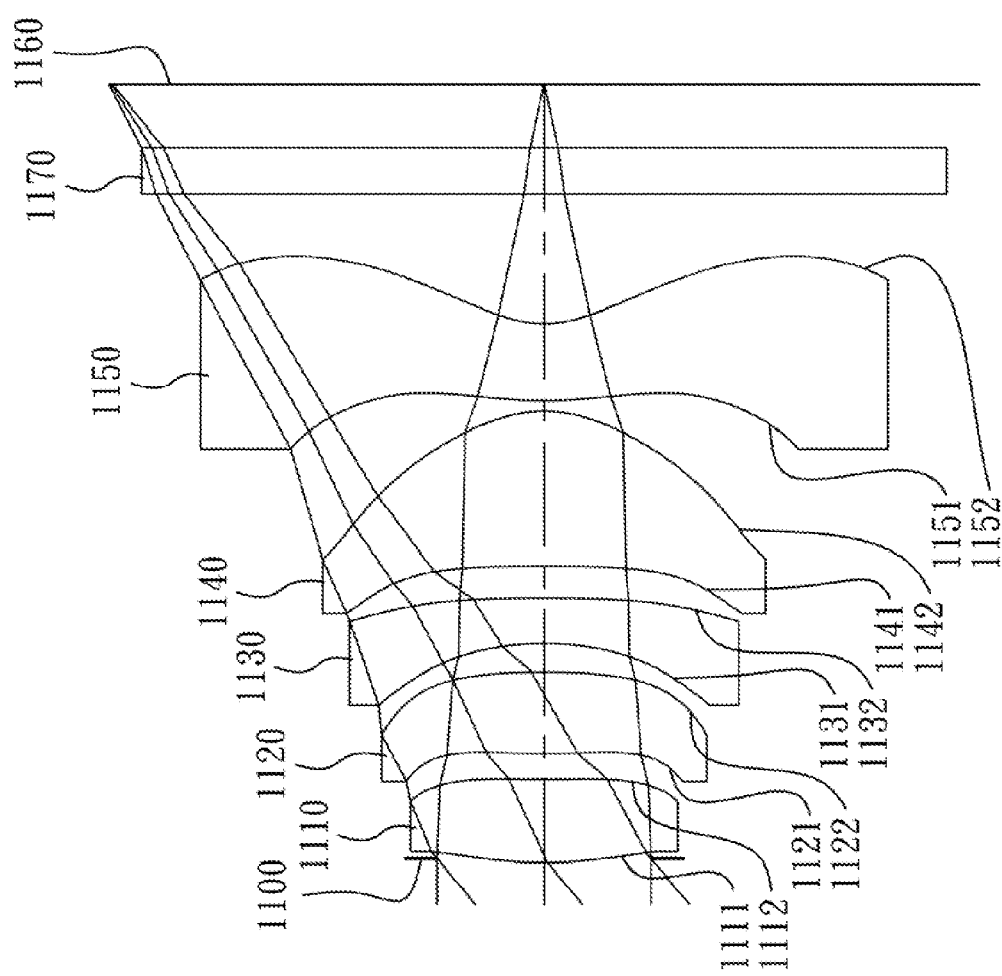
FIG. 21 is a schematic view of an image capturing optical lens assembly to according to the 11th embodiment of the present disclosure.
Figure 22:
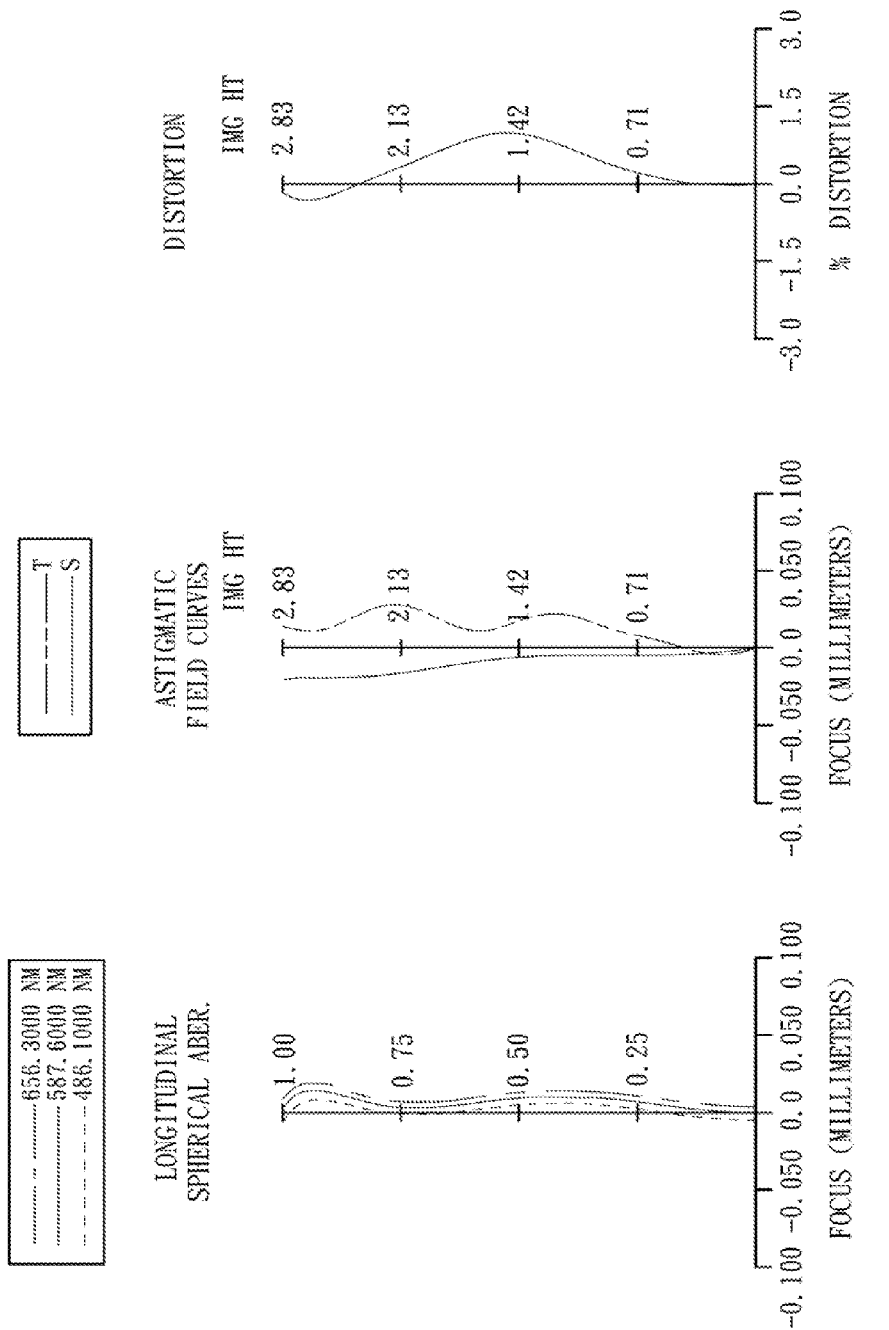
FIG. 22 shows spherical aberration curves, astigmatic field curves and a distortion curve of the image capturing optical lens assembly according to the 11th Embodiment.

FIG. 21 is a schematic view of an image capturing optical lens assembly according to the 11th embodiment of the present disclosure. FIG. 22 shows spherical aberration curves, astigmatic field curves and a distortion curve of the image capturing optical lens assembly according to the 11th embodiment. In FIG. 21, the image capturing optical lens assembly includes, in order from an object side to an image side, an aperture stop 1100, a first lens element 1110, a second lens element 1120, a third lens element 1130, a fourth lens element 1140, a fifth lens element 1150, an IR-cut filter 1170 and an image plane 1160.

The first lens element 1110 with positive refractive power has an object-side surface 1111 being convex at a paraxial region and an image-side surface 1112 being concave at a paraxial region. The first lens element 1110 is made of glass material, and has the object-side surface 1111 and the image-side surface 1112 being aspheric.

The second lens element 1120 with positive refractive power has an object-side surface 1121 being convex at a paraxial region and an image-side surface 1122 being convex at a paraxial region. The second lens element 1120 is made of plastic material, and has the object-side surface 1121 and the image-side surface 1122 being aspheric.

The third lens element 1130 with negative refractive power has an object-side surface 1131 being concave at a paraxial region, and an image-side surface 1132 being concave at a paraxial region and being convex at a peripheral region. The third lens element 1130 is made of plastic material, and has the object-side surface 1131 and the image-side surface 1132 being aspheric.

The fourth lens element 1140 with positive refractive power has an object-side surface 1141 being concave at a paraxial region and an image-side surface 1142 being convex at a paraxial region. The fourth lens element 1140 is made of plastic material, and has the object-side surface 1141 and the image-side surface 1142 being aspheric.

The fifth lens element 1150 with negative refractive power has an object-side surface 1151 being convex at a paraxial region, and an image-side surface 1152 being concave at a paraxial region and being convex at a peripheral region. The fifth lens element 1150 is made of plastic material, and has the object-side surface 1151 and the image-side surface 1152 being aspheric.

The IR-cut filter 1170 is made of glass and is located between the fifth lens element 1150 and the image plane 1160, and will not affect the focal length of the image capturing optical lens assembly.

The detailed optical data of the 11th embodiment are shown in Table 21 and the aspheric surface data are shown in Table 22 below.

TABLE 21

11th Embodiment
f = 3.38 mm, Fno = 2.40, HFOV = 40.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.044 | | | | |
| 2 | Lens 1 | 2.829 | (ASP) | 0.526 | Glass | 1.542 | 62.9 | 6.10 |
| 3 | | 18.115 | (ASP) | 0.170 | | | | |
| 4 | Lens 2 | 8.059 | (ASP) | 0.518 | Plastic | 1.544 | 55.9 | 5.37 |
| 5 | | −4.486 | (ASP) | 0.183 | | | | |
| 6 | Lens 3 | −2.732 | (ASP) | 0.300 | Plastic | 1.633 | 23.4 | −4.05 |
| 7 | | 43.060 | (ASP) | 0.236 | | | | |
| 8 | Lens 4 | −8.964 | (ASP) | 1.008 | Plastic | 1.544 | 55.9 | 1.51 |
| 9 | | −0.782 | (ASP) | 0.071 | | | | |
| 10 | Lens 5 | 4.343 | (ASP) | 0.483 | Plastic | 1.530 | 55.8 | −1.59 |
| 11 | | 0.678 | (ASP) | 0.800 | | | | |
| 12 | IR-cut filter | Plano | | 0.300 | Glass | 1.517 | 64.2 | — |
| 13 | | Plano | | 0.415 | | | | |
| 14 | Image | Plano | | — | | | | |

Note:
Reference wavelength (d-line) is 587.6 nm.

TABLE 22

Aspheric Coefficients

| | Surface # | | | | |
|---|---|---|---|---|---|
| | 2 | 3 | 4 | 5 | 6 |
| k = | −3.5898E+00 | −1.0581E+01 | −2.8083E+00 | −1.3692E+01 | −5.8195E+00 |
| A4 = | −2.8347E−02 | −1.4419E−01 | −1.3584E−01 | −4.8495E−02 | −1.0091E−01 |
| A6 = | −5.1628E−03 | −1.5033E−01 | −1.5135E−01 | −1.6861E−01 | −4.3362E−02 |
| A8 = | −1.0862E−01 | 6.6869E−02 | −7.7117E−02 | −1.1191E−03 | −9.6270E−03 |
| A10 = | 7.8393E−02 | −1.1747E−01 | −8.4388E−02 | 1.8360E−02 | 6.1859E−02 |
| A12 = | −8.7563E−02 | 3.3716E−02 | 6.1352E−03 | −8.4816E−03 | −2.0663E−02 |

| | Surface # | | | | |
|---|---|---|---|---|---|
| | 7 | 8 | 9 | 10 | 11 |
| k = | 1.5000E+01 | −9.2801E+00 | −3.6790E+00 | −1.1792E+01 | −4.2076E+00 |
| A4 = | −6.9301E−02 | −1.4512E−02 | −8.9191E−02 | −8.9723E−02 | −7.6135E−02 |
| A6 = | 1.8098E−03 | −3.3456E−02 | 1.9854E−03 | −5.0317E−02 | 1.9191E−02 |
| A8 = | 7.4869E−03 | −4.2048E−02 | −9.9394E−04 | 3.4577E−02 | −3.2994E−03 |

TABLE 22-continued

Aspheric Coefficients

| A10 = | 3.9952E−03 | 2.4320E−02 | −2.2996E−03 | −2.8060E−03 | 4.0525E−04 |
|---|---|---|---|---|---|
| A12 = | −2.2420E−03 | 4.3883E−04 | −9.2784E−05 | −1.9269E−03 | −5.1240E−05 |
| A14 = | | | 1.0438E−03 | 2.6607E−04 | 3.4562E−06 |

In the image capturing optical lens assembly according to the 11th embodiment, the definitions of f, Fno, HFOV, V1, V2, T34, T45, CT2, CT4, CT5, R5, R6, f1, f2, f4, MSAG52, Dsr4, ΣCT and Td are the same as those stated in the 1st embodiment with corresponding values for the 11th embodiment. Moreover, these parameters can be calculated from Table 21 and Table 22 as the following values and satisfy the following relationships:

| f (mm) | 3.38 | f/R6 | 0.08 |
|---|---|---|---|
| Fno | 2.40 | f4/f1 | 0.25 |
| HFOV (deg.) | 40.0 | f2/f1 | 0.88 |
| V2/V1 | 0.89 | MSAG52/CT5 | 0.87 |
| (T34 + T45)/CT4 | 0.30 | Dsr4/CT2 | 2.26 |
| R5/R6 | −0.06 | ΣCT/Td | 0.81 |

12th Embodiment

Figure 23:
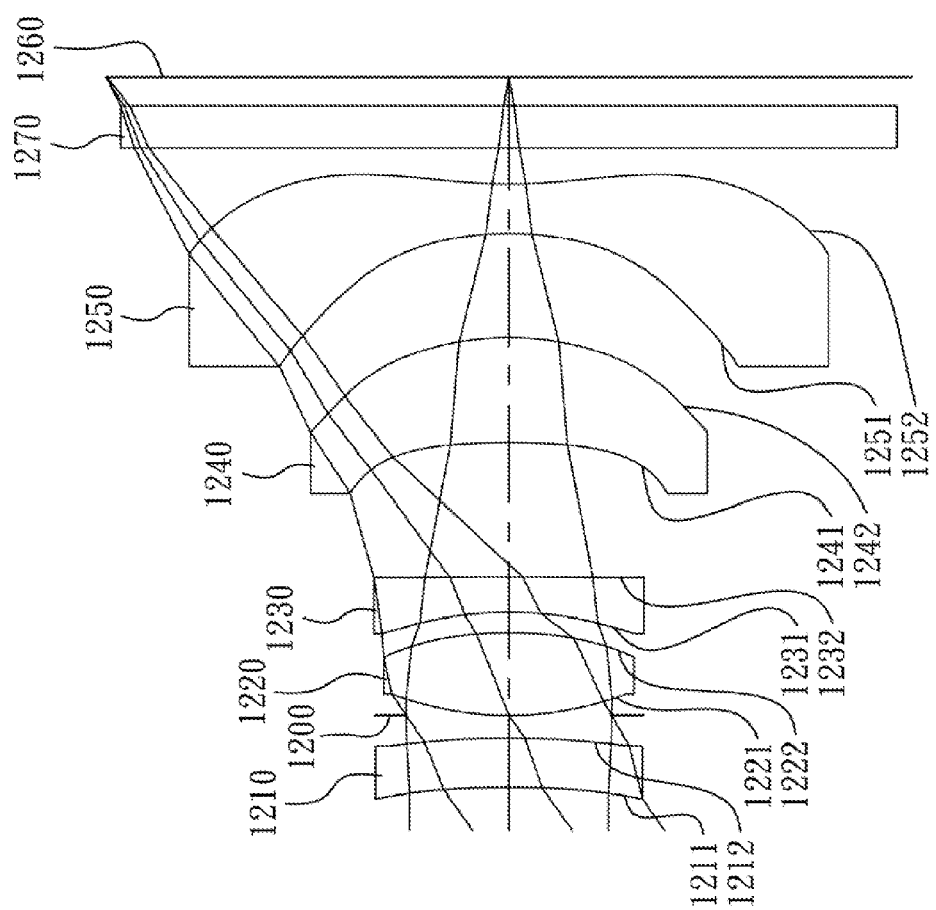
FIG. 23 is a schematic view of an image capturing optical lens assembly according to the 12th embodiment of the present disclosure.
Figure 24:
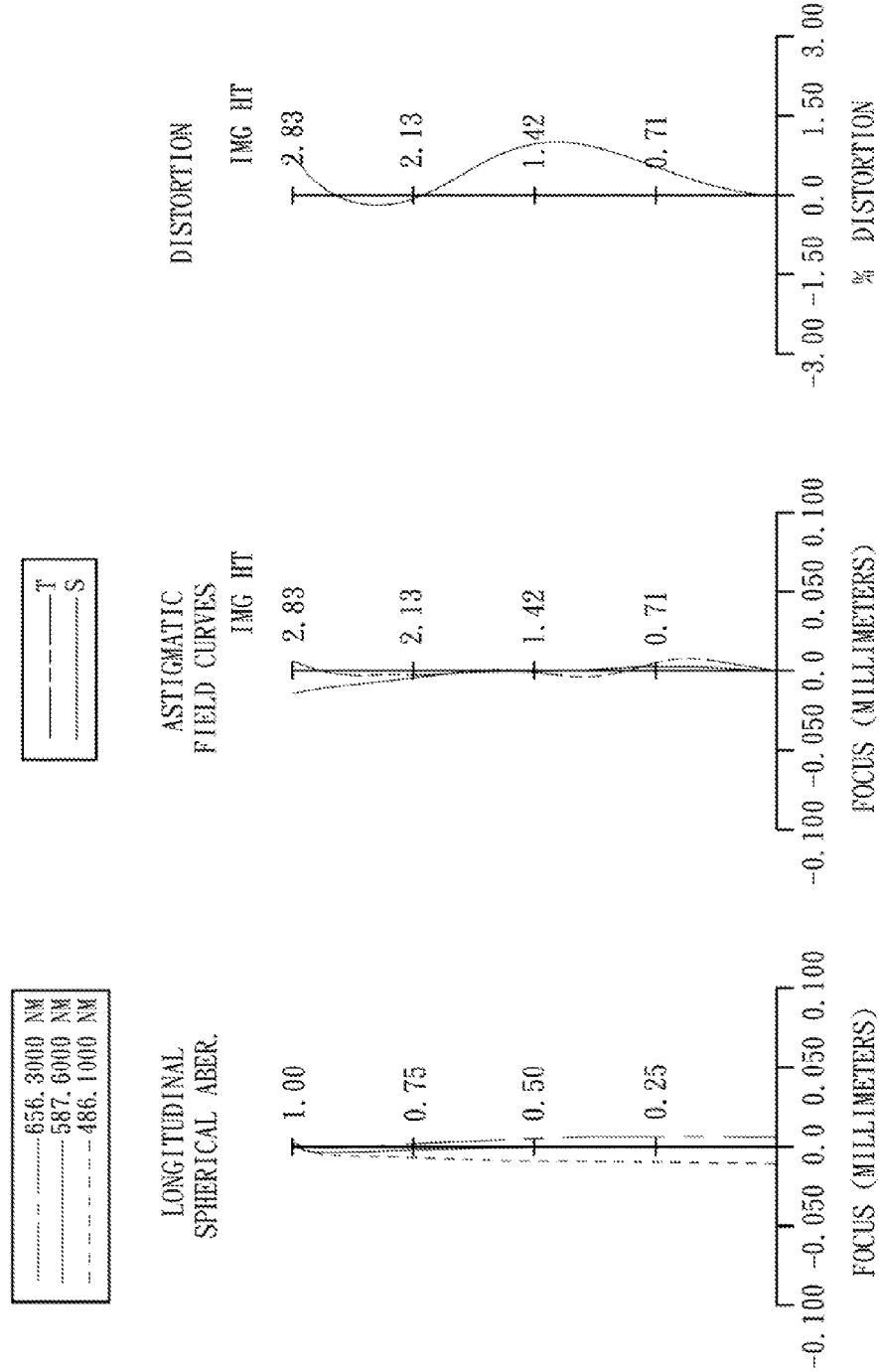
FIG. 24 shows spherical aberration curves, astigmatic field curves and a distortion curve of the image capturing optical lens assembly according to the 12th Embodiment.

FIG. 23 is a schematic view of an image capturing optical lens assembly according to the 12th embodiment of the present disclosure. FIG. 24 shows spherical aberration curves, astigmatic field curves and a distortion curve of the image capturing optical lens assembly according to the 12th embodiment. In FIG. 23, the image capturing optical lens assembly includes, in order from an object side to an image side, a first lens element 1210, an aperture stop 1200, a second lens element 1220, a third lens element 1230, a fourth lens element 1240, a fifth lens element 1250, an IR-cut filter 1270 and an image plane 1260.

The first lens element 1210 with positive refractive power has an object-side surface 1211 being concave at a paraxial region and an image-side surface 1212 being convex at a paraxial region. The first lens element 1210 is made of glass material, and has the object-side surface 1211 and the image-side surface 1212 being aspheric.

The second lens element 1220 with positive refractive power has an object-side surface 1221 being convex at a paraxial region and an image-side surface 1222 being convex at a paraxial region. The second lens element 1220 is made of plastic material, and has the object-side surface 1221 and the image-side surface 1222 being aspheric.

The third lens element 1230 with negative refractive power has an object-side surface 1231 being concave at a paraxial region and an image-side surface 1232 being convex at a paraxial region. The third lens element 1230 is made of plastic material, and has the object-side surface 1231 and the image-side surface 1232 being aspheric.

The fourth lens element 1240 with positive refractive power has an object-side surface 1241 being concave at a paraxial region and an image-side surface 1242 being convex at a paraxial region. The fourth lens element 1240 is made of plastic material, and has the object-side surface 1241 and the image-side surface 1242 being aspheric.

The fifth lens element 1250 with negative refractive power has an object-side surface 1251 being concave at a paraxial region, and an image-side surface 1252 being concave at a paraxial region and being convex at a peripheral region. The fifth lens element 1250 is made of plastic material, and has the object-side surface 1251 and the image-side surface 1252 being aspheric.

The IR-cut filter 1270 is made of glass and is located between the fifth lens element 1250 and the image plane 1260, and will not affect the focal length of the image capturing optical lens assembly.

The detailed optical data of the 12th embodiment are shown in Table 23 and the aspheric surface data e shown in Table 24 below.

TABLE 23

12th Embodiment
f = 3.92 mm, Fno = 2.80, HFOV = 35.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | −9.375 (ASP) | 0.350 | Glass | 1.722 | 29.2 | 78.75 |
| 2 | | −8.175 (ASP) | 0.161 | | | | |
| 3 | Ape. Stop | Plano | −0.001 | | | | |
| 4 | Lens 2 | 2.208 (ASP) | 0.582 | Plastic | 1.544 | 55.9 | 2.41 |
| 5 | | −2.925 (ASP) | 0.142 | | | | |
| 6 | Lens 3 | −2.874 (ASP) | 0.250 | Plastic | 1.640 | 23.3 | −4.92 |
| 7 | | −33.842 (ASP) | 0.946 | | | | |
| 8 | Lens 4 | −5.785 (ASP) | 0.740 | Plastic | 1.583 | 30.2 | 4.80 |
| 9 | | −1.977 (ASP) | 0.730 | | | | |
| 10 | Lens 5 | −2.264 (ASP) | 0.350 | Plastic | 1.583 | 30.2 | −2.32 |
| 11 | | 3.565 (ASP) | 0.250 | | | | |
| 12 | IR-cut filter | Plano | 0.300 | Glass | 1.517 | 64.2 | — |
| 13 | | Plano | 0.202 | | | | |
| 14 | Image | Plano | — | | | | |

Note:
Reference wavelength (d-line) is 587.6 nm.

TABLE 24

Aspheric Coefficients

| | Surface # | | | | |
|---|---|---|---|---|---|
| | 1 | 2 | 4 | 5 | 6 |
| k = | −5.0000E+01 | −5.0000E+01 | 2.5041E+00 | 3.5959E+00 | −5.9090E+00 |
| A4 = | −7.8118E−02 | −9.2364E−02 | −6.9291E−02 | −5.3351E−02 | −1.0018E−01 |
| A6 = | 3.2521E−02 | 1.0990E−01 | 7.7555E−02 | 1.7529E−02 | 6.7463E−02 |
| A8 = | 1.8003E−02 | −3.3659E−02 | −1.2889E−01 | 1.6023E−02 | 4.8553E−02 |
| A10 = | −2.6039E−02 | −3.2487E−02 | 8.7358E−02 | −4.2022E−04 | −9.0847E−02 |
| A12 = | 8.6328E−03 | 3.6151E−02 | −6.0302E−02 | −1.9391E−02 | 6.0675E−02 |

| | Surface # | | | | |
|---|---|---|---|---|---|
| | 7 | 8 | 9 | 10 | 11 |
| k = | −5.0000E+01 | 3.7520E+00 | −5.7248E+00 | 3.9335E−01 | −4.0629E+00 |
| A4 = | −1.7728E−02 | −6.3044E−02 | −6.3202E−02 | −2.8408E−02 | −8.0276E−02 |
| A6 = | 3.0607E−02 | −1.6549E−02 | −1.7748E−02 | −3.4524E−02 | 1.8277E−02 |
| A8 = | 1.2728E−02 | −8.6479E−02 | 7.6831E−04 | 8.6163E−03 | −4.0652E−03 |
| A10 = | −3.5726E−02 | 6.1783E−02 | −5.9093E−03 | 7.8187E−03 | 6.6964E−04 |
| A12 = | 2.2690E−02 | −2.5086E−02 | 3.7790E−03 | −2.3198E−03 | −5.6074E−05 |

In the image capturing optical lens assembly according to the 12th embodiment, the definitions of f, Fno, HFOV, V1, V2, T34, T45, CT2, CT4, CT5, R5, R6, f1, f2, f4, MSAG52, IJsr4, ΣCT and Td are the same as those stated in the 1st embodiment with corresponding values for the 12th embodiment. Moreover, these parameters can be calculated from Table 23 and Table 24 as the following values and satisfy the following relationships:

| | | | |
|---|---|---|---|
| f (mm) | 3.92 | f/R6 | −0.12 |
| Fno | 2.80 | f4/f1 | 0.06 |
| HFOV (deg.) | 35.7 | f2/f1 | 0.03 |
| V2/V1 | 1.91 | MSAG52/CT5 | 0.19 |
| (T34 + T45)/CT4 | 2.26 | Dsr4/CT2 | 1.00 |
| R5/R6 | 0.08 | ΣCT/Td | 0.53 |

13th Embodiment

Figure 25:
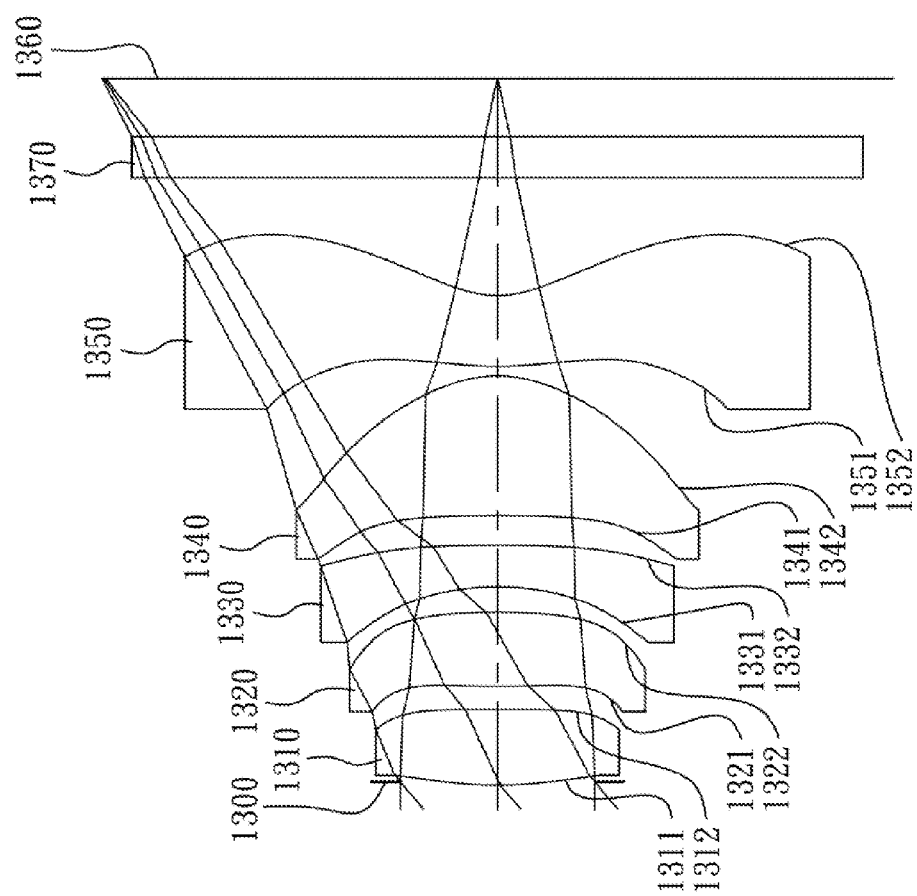
FIG. 25 is a schematic view of an image capturing optical lens assembly according to the 13th embodiment of the present disclosure.
Figure 26:
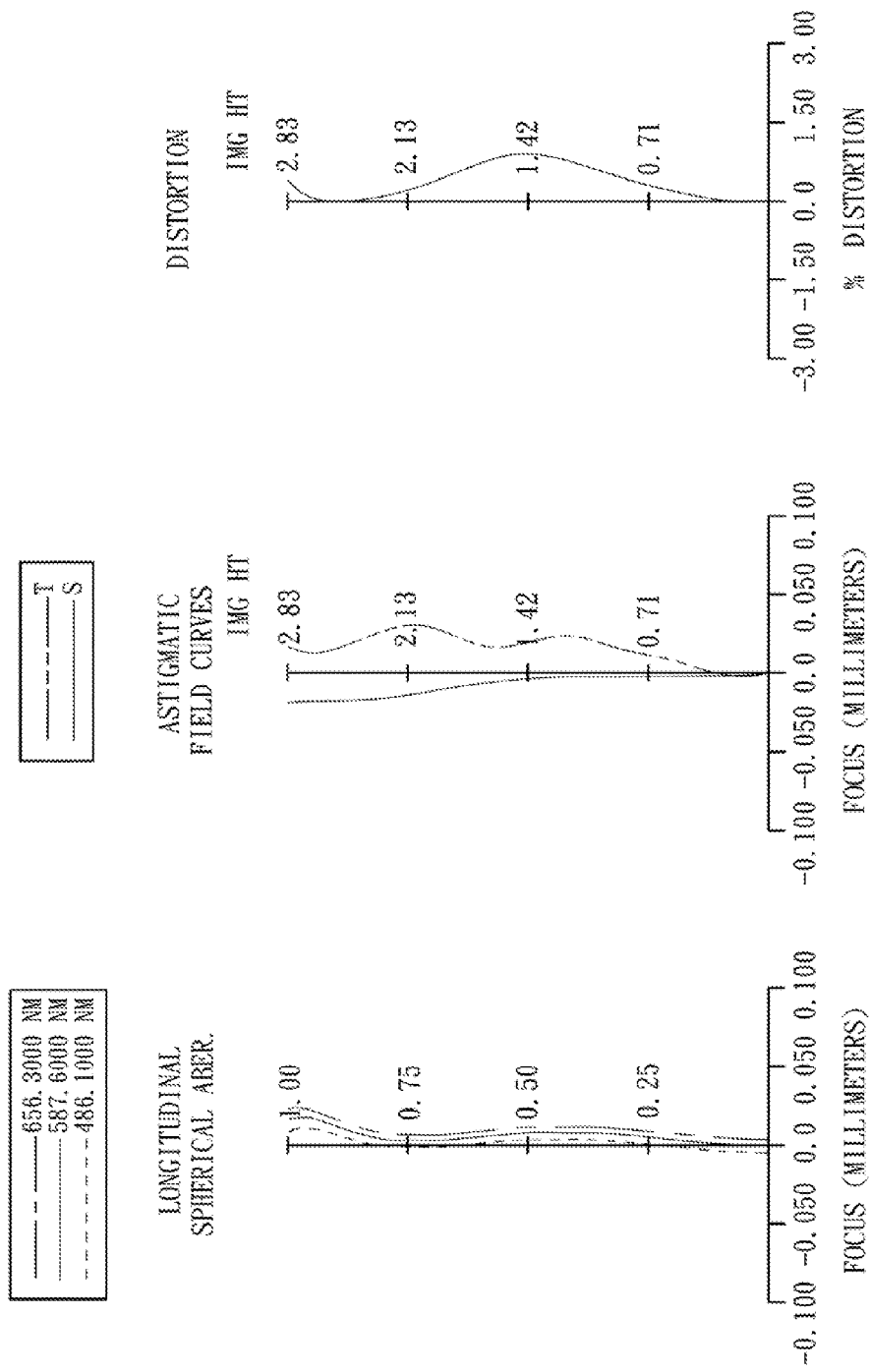
FIG. 26 shows spherical aberration curves, astigmatic field curves and a distortion curve of the image capturing optical lens assembly according to the 13th Embodiment.

FIG. 25 is a schematic view of an image capturing optical lens assembly according to the 13th embodiment of the present disclosure. FIG. 26 shows spherical aberration curves, astigmatic field curves and a distortion curve of the image capturing optical lens assembly according to the 13th embodiment. FIG. 25, the image capturing optical lens assembly includes, in order from an object side to an image side, an aperture stop 1300, a first lens element 1310, a second lens element 1320, a third lens element 1330, a fourth lens element 1340, a fifth lens element 1350, an IR-cut filter 1370 and an image plane 1360.

The first lens element 1310 with positive refractive power has an object side surface 1311 being convex at a paraxial region and an image-side surface 1312 being concave at a paraxial region. The first lens element 1310 is made of plastic material, and has the object-side surface 1311 and the image-side surface 1312 being aspheric.

The second lens element 1320 with positive refractive power has an object-side surface 1321 being convex at a paraxial region and an image-side surface 1322 being convex at a paraxial region. The second lens element 1320 is made of plastic material, and has the object-side surface 1321 and the image-side surface 1322 being aspheric.

The third lens element 1330 with negative refractive power has an object-side surface 1331 being concave at a paraxial region and an image-side surface 1332 being convex at a paraxial region. The third lens element 1330 is made of plastic material, and has the object side surface 1331 and the image-side surface 1332 being aspheric.

The fourth lens element 1340 with positive refractive power has an object-side surface 1341 being concave at a paraxial region and an image-side surface 1342 being convex at a paraxial region. The fourth lens element 1340 is made of plastic material, and has the object-side surface 1341 and the image-side surface 1342 being aspheric.

The fifth lens element 1350 with negative refractive power has an object-side surface 1351 being convex at a paraxial region, and an image-side surface 1352 being concave at a paraxial region and being convex at a peripheral region. The fifth lens element 1350 is made of plastic material, and has the object-side surface 1351 and the image-side surface 1352 being aspheric.

The IR-cut filter 1370 is made of glass and is located between the fifth to lens element 1350 and the image plane 1360, and will not affect the focal length of the image capturing optical lens assembly.

The detailed optical data of the 13th embodiment are shown in Table 25 and the aspheric surface data are shown in Table 26 below.

TABLE 25

13th Embodiment
f = 3.36 mm, Fno = 2.40, HFOV = 40.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.025 | | | | |
| 2 | Lens 1 | 2.962 (ASP) | 0.548 | Plastic | 1.544 | 55.9 | 6.00 |

TABLE 25-continued

13th Embodiment
f = 3.36 mm, Fno = 2.40, HFOV = 40.0 deg.

| Surface # | | Curvature Radius | Thickness | Material | Index | Abbe # | Focal length |
|---|---|---|---|---|---|---|---|
| 3 | | 29.705 (ASP) | 0.168 | | | | |
| 4 | Lens 2 | 7.630 (ASP) | 0.532 | Plastic | 1.544 | 55.9 | 5.28 |
| 5 | | −4.499 (ASP) | 0.186 | | | | |
| 6 | Lens 3 | −1.931 (ASP) | 0.300 | Plastic | 1.633 | 23.4 | −3.49 |
| 7 | | −16.205 (ASP) | 0.210 | | | | |
| 8 | Lens 4 | −11.760 (ASP) | 1.012 | Plastic | 1.544 | 55.9 | 1.61 |
| 9 | | −0.841 (ASP) | 0.070 | | | | |
| 10 | Lens 5 | 3.041 (ASP) | 0.506 | Plastic | 1.530 | 55.8 | −1.85 |
| 11 | | 0.700 (ASP) | 0.850 | | | | |
| 12 | IR-cut filter | Plano | 0.300 | Glass | 1.517 | 64.2 | — |
| 13 | | Plano | 0.419 | | | | |
| 14 | Image | Plano | — | | | | |

Note:
Reference wavelength (d-line) is 587.6 nm.

TABLE 26

Aspheric Coefficients

| | Surface # | | | | |
|---|---|---|---|---|---|
| | 2 | 3 | 4 | 5 | 6 |
| k = | −3.4544E+00 | −1.5000E+01 | −1.5000E+01 | −1.5000E+01 | −4.1176E+00 |
| A4 = | −2.8978E−02 | −1.5620E−01 | −1.4527E−01 | −5.0441E−02 | −1.0231E−01 |
| A6 = | −1.6427E−02 | −1.5905E−01 | −1.6398E−01 | −1.7780E−01 | −4.0379E−02 |
| A8 = | −7.6389E−02 | 1.0110E−01 | −5.0097E−02 | 3.1809E−03 | −1.1049E−02 |
| A10 = | 4.6871E−02 | −1.3140E−01 | −7.8923E−02 | 1.8381E−03 | 5.5871E−02 |
| A12 = | −8.7563E−02 | 3.3716E−02 | 6.1352E−03 | −8.4816E−03 | −1.7437E−02 |

| | Surface # | | | | |
|---|---|---|---|---|---|
| | 7 | 8 | 9 | 10 | 11 |
| k = | 4.0204E+00 | 1.5000E+01 | −3.6062E+00 | −1.5000E+01 | −3.8893E+00 |
| A4 = | −6.3289E−02 | −2.9332E−02 | −9.3190E−02 | −7.6472E−02 | −7.8371E−02 |
| A6 = | 4.7638E−03 | −3.2304E−02 | 4.1000E−03 | −4.8767E−02 | 2.0182E−02 |
| A8 = | 8.0429E−03 | −4.0498E−02 | −1.3812E−03 | 3.3610E−02 | −3.4054E−03 |
| A10 = | 3.0615E−03 | 2.4665E−02 | −2.6976E−03 | −3.0136E−03 | 4.0522E−04 |
| A12 = | −2.4581E−03 | −3.0539E−04 | −1.8323E−04 | −1.9449E−03 | −5.0325E−05 |
| A14 = | | | 1.0395E−03 | 3.3436E−04 | 3.5989E−06 |

In the image capturing optical lens assembly according to the 13th embodiment, the definitions of f, Fno, HFOV, V1, V2, T34, T45, CT2, CT4, CT5, R5, R6, f1, f2, f4, MSAG52, Dsr4, ΣCT and Td are the same as those stated in the 1st embodiment with corresponding values for the 13th embodiment. Moreover, these parameters can be calculated from Table 25 and Table 26 as the following values and satisfy the following relationships:

| f (mm) | 3.36 | f/R6 | −0.21 |
|---|---|---|---|
| Fno | 2.40 | f4/f1 | 0.27 |
| HFOV (deg.) | 40.0 | f2/f1 | 0.88 |
| V2/V1 | 1.00 | MSAG52/CT5 | 0.87 |
| (T34 + T45)/CT4 | 0.28 | Dsr4/CT2 | 2.30 |
| R5/R6 | 0.12 | ΣCT/Td | 0.82 |

14th Embodiment

Figure 27:
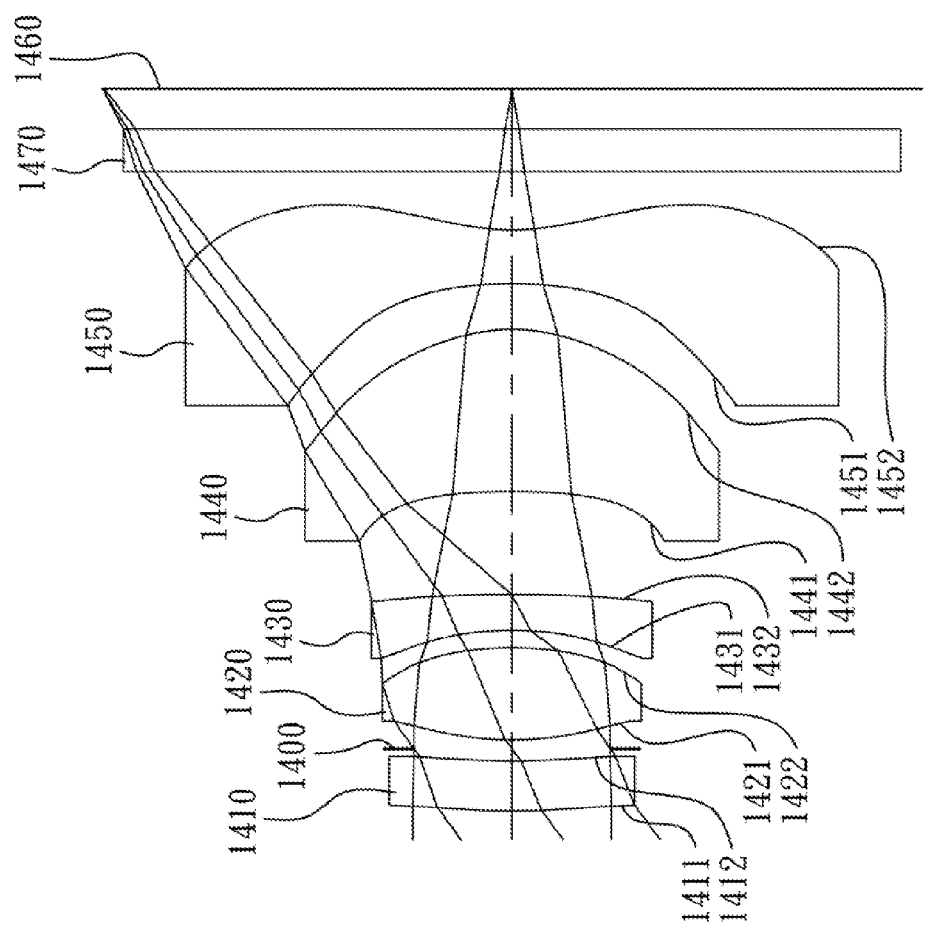
FIG. 27 is a schematic view of an image capturing optical lens assembly according to the 14th embodiment of the present disclosure.
Figure 28:
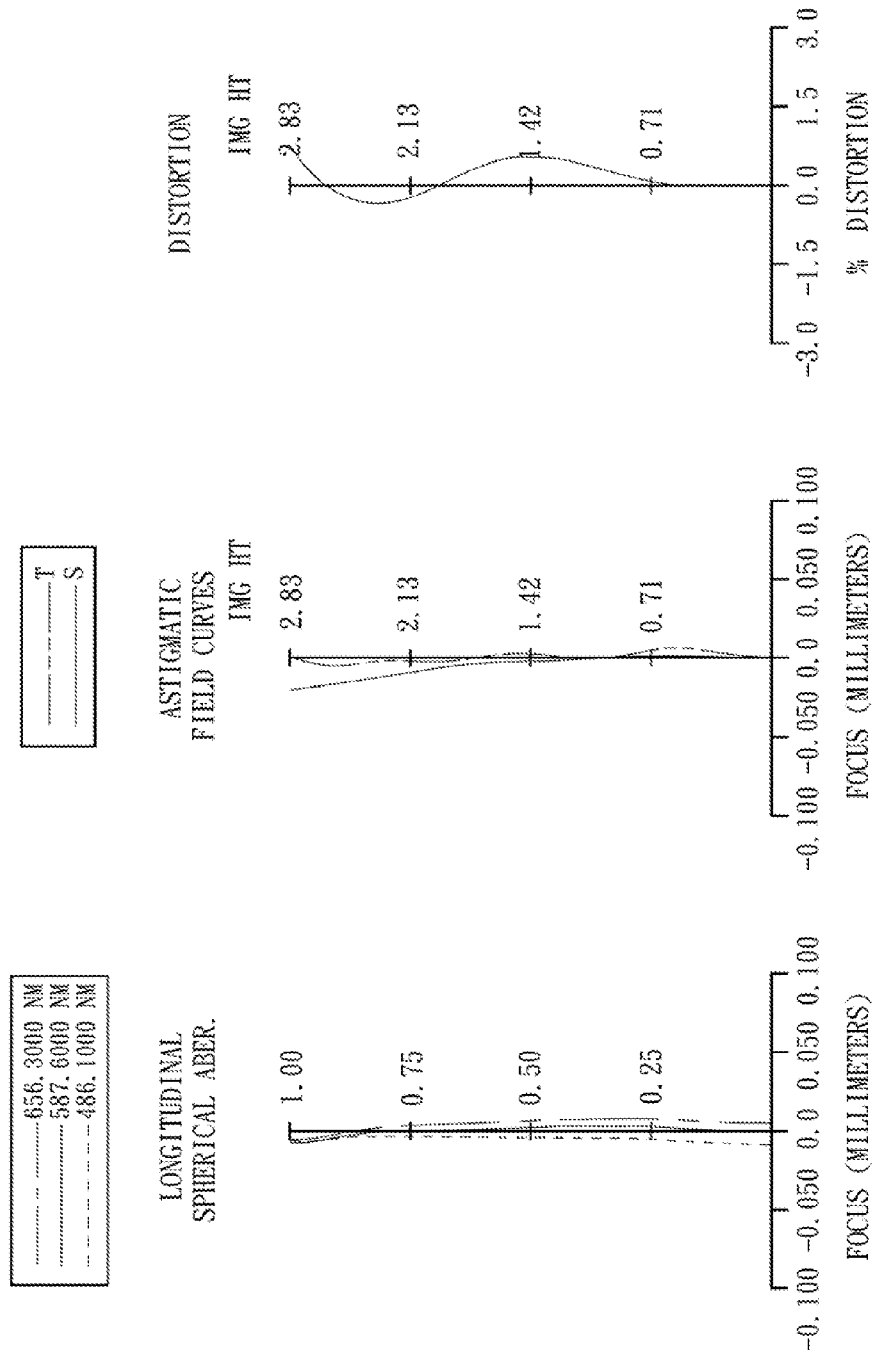
FIG. 28 shows spherical aberration curves, astigmatic field curves and a distortion curve of the image capturing optical lens assembly according to the 14th embodiment.

FIG. 27 is a schematic view of an image capturing optical lens assembly according to the 14th embodiment of the present disclosure. FIG. 28 shows spherical aberration curves, astigmatic field curves and a distortion curve of the image capturing optical lens assembly according to the 14th embodiment. FIG. 27, the image capturing optical lens assembly includes, in order from an object side to an image side, a first lens element 1410, an aperture stop 1400, a second lens element 1420, a third lens element 1430, a fourth lens element 1440, a fifth lens element 1450, an IR-cut filter 1470 and an image plane 1460.

The first lens element 1410 with positive refractive power has an object-side surface 1411 being convex at a paraxial region and an image-side surface 1412 being concave at a paraxial region. The first lens element 1410 is made of plastic material, and has the object-side surface 1411 and the image-side surface 1412 being aspheric.

The second lens element 1420 with positive refractive power has an object-side surface 1421 being convex at a paraxial region and an image-side surface 1422 being convex at a paraxial region. The second lens element 1420 is made of plastic material, and has the object-side surface 1421 and the image-side surface 1422 being aspheric.

The third lens element 1430 with negative refractive power has an object-side surface 1431 being concave at a paraxial region and an image-side surface 1432 being convex at a paraxial region. The third lens element 1430 is made of plastic material, and has the object-side surface 1431 and the image-side surface 1432 being aspheric.

The fourth lens element 1440 with positive refractive power has an object-side surface 1441 being concave at a paraxial region and an image-side surface 1442 being convex at a paraxial region. The fourth lens element 1440 is made of plastic material, and has the object-side surface 1441 and the image-side surface 1442 being aspheric.

The fifth lens element 1450 with negative refractive power has an object-side surface 1451 being concave at a paraxial region, and an image-side surface 1452 being concave at a paraxial region and being convex at a peripheral region. The fifth lens element 1450 is made of plastic material, and has the object-side surface 1451 and the image-side surface 1452 being aspheric.

The IR-cut filter 1470 is made of glass and is located between the fifth lens element 1450 and the image plane 1460, and will not affect the focal length of the image capturing optical lens assembly.

The detailed optical data of the 14th embodiment are shown in Table 27 and the aspheric surface data are shown in Table 28 below.

In the image capturing optical lens assembly according to the 14th embodiment, the definitions of f, Fno, HFOV, V1, V2, T34, T45, CT2, CT4, CT5, R5, R6, f1, f2, f4, MSAG52, Dsr4, ΣCT and Td are the same as those stated in the 1st embodiment with corresponding values for the 14th embodiment. Moreover, these parameters can be calculated from Table 27 and Table 28 as the following values and satisfy the following relationships:

| f (mm) | 3.85 | f/R6 | −0.27 |
|---|---|---|---|
| Fno | 2.80 | f4/f1 | 0.03 |
| HFOV (deg.) | 36.2 | f2/f1 | 0.03 |
| V2/V1 | 2.40 | MSAG52/CT5 | 0.46 |
| (T34 + T45)/CT4 | 0.91 | Dsr4/CT2 | 1.10 |
| R5/R6 | 0.17 | ΣCT/Td | 0.68 |

It will be apparent to those skilled in the art that various modifications and variations can be made to the structure of the present invention without departing from the scope or spirit of the invention. In view of the foregoing, it is intended

TABLE 27

14th Embodiment
f = 3.85 mm, Fno = 2.80, HFOV = 36.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 5.000 (ASP) | 0.350 | Plastic | 1.640 | 23.3 | 77.53 |
| 2 | | 5.409 (ASP) | 0.083 | | | | |
| 3 | Ape. Stop | Plano | 0.062 | | | | |
| 4 | Lens 2 | 2.203 (ASP) | 0.634 | Plastic | 1.544 | 55.9 | 2.22 |
| 5 | | −2.406 (ASP) | 0.119 | | | | |
| 6 | Lens 3 | −2.449 (ASP) | 0.252 | Plastic | 1.640 | 23.3 | −4.67 |
| 7 | | −14.124 (ASP) | 0.714 | | | | |
| 8 | Lens 4 | −4.888 (ASP) | 1.123 | Plastic | 1.583 | 30.2 | 2.48 |
| 9 | | −1.210 (ASP) | 0.313 | | | | |
| 10 | Lens 5 | −2.891 (ASP) | 0.374 | Plastic | 1.583 | 30.2 | −1.61 |
| 11 | | 1.455 (ASP) | 0.400 | | | | |
| 12 | IR-cut filter | Plano | 0.300 | Glass | 1.517 | 64.2 | — |
| 13 | | Plano | 0.279 | | | | |
| 14 | Image | Plano | — | | | | |

Note:
Reference wavelength (d-line) is 587.6 nm.

TABLE 28

Aspheric Coefficients

| | Surface # | | | | |
|---|---|---|---|---|---|
| | 1 | 2 | 4 | 5 | 6 |
| k = | −7.1680E+00 | −2.9891E+01 | 1.8970E+00 | 3.2923E+00 | −4.9242E−01 |
| A4 = | −5.9186E−02 | −6.9498E−02 | −7.7165E−02 | −7.7004E−02 | −1.1676E−01 |
| A6 = | 2.6487E−03 | 1.3492E−02 | 2.7499E−02 | 5.4069E−02 | 1.2294E−01 |
| A8 = | −2.7681E−04 | 1.7056E−01 | −5.9076E−02 | −7.8396E−03 | 4.0035E−02 |
| A10 = | 1.2675E−02 | −3.2940E−01 | 3.4826E−02 | −7.4620E−02 | −2.3523E−01 |
| A12 = | −1.5878E−02 | 2.3849E−01 | −9.1704E−02 | 2.6825E−02 | 1.8391E−01 |

| | Surface # | | | | |
|---|---|---|---|---|---|
| | 7 | 8 | 9 | 10 | 11 |
| k = | 1.0000E+01 | 7.9045E+00 | −4.4343E+00 | 2.0335E+00 | −9.6680E+00 |
| A4 = | −4.2679E−02 | −6.5437E−02 | −5.7851E−02 | −4.4555E−02 | −6.8682E−02 |
| A6 = | 5.2812E−02 | −1.6948E−02 | −2.7777E−02 | −3.4518E−02 | 1.8431E−02 |
| A8 = | −1.7178E−02 | −1.0944E−01 | 9.7927E−03 | 1.8748E−03 | −4.3404E−03 |
| A10 = | −3.0436E−02 | 7.1240E−02 | −8.5014E−03 | 1.3976E−02 | 6.4416E−04 |
| A12 = | 2.1638E−02 | −3.4637E−02 | 3.6871E−03 | −3.5292E−03 | −4.6931E−05 | that the present invention cover modifications and variations of this invention provided they fall within the scope of the following claims.

What is claimed is:

1. An image capturing optical lens assembly comprising, in order from an object side to an image side:
   a first lens element with positive refractive power;
   a second lens element with positive refractive power;
   a third lens element with negative refractive power;
   a fourth lens element with positive refractive power; and
   a fifth lens element with negative refractive power made of plastic material and having an image-side surface being concave at a paraxial region and being convex at a peripheral region, wherein at least one of an object-side surface and the image-side surface of the fifth lens element is aspheric;
   wherein a focal length of the first lens element is f1, a focal length of the second lens element is f2, a focal length of the fourth lens element is f4, a focal length of the image capturing optical lens assembly is f, a curvature radius of an image-side surface of the third lens element is R6, and the following relationships are satisfied:

$0 < f2/f1 < 0.90$;

$0 < f4/f1 < 0.30$; and $-0.35 < f/R6 \leq 0.85$.

2. The image capturing optical lens assembly of claim 1, wherein the fourth lens element has an image-side surface being convex at a paraxial region, and is made of plastic material, wherein an object-side surface and the image-side surface of the fourth lens element are aspheric.

3. The image capturing optical lens assembly of claim 2, wherein an Abbe number of the first lens element is V1, an Abbe number of the second lens element is V2, and the following relationship is satisfied:

$1.5 \leq V2/V1 < 3.0$.

4. The image capturing optical lens assembly of claim 2, wherein the second lens element has an object-side surface being convex at a paraxial region.

5. The image capturing optical lens assembly of claim 4, further comprising:
   a stop, wherein an axial distance between the stop and an image-side surface of the second lens element is Dsr4, a central thickness of the second lens element is CT2, and the following relationship is satisfied:

$0.7 < Dsr4/CT2 \leq 1.0$.

6. The image capturing optical lens assembly of claim 4, wherein the image-side surface of the third lens element is convex at a peripheral region.

7. The image capturing optical lens assembly of claim 6, wherein a curvature radius of the object-side surface of the third lens element is R5, the curvature radius of the image-side surface of the third lens element is R6, and the following relationship is satisfied:

$-2.5 < R5/R6 < 0$.

8. The image capturing optical lens assembly of claim 7, wherein the second lens element has an image-side surface being convex at a paraxial region.

9. The image capturing optical lens assembly of claim 4, wherein the third lens element has an object-side surface being concave at a paraxial region.

10. The image capturing optical lens assembly of claim 9, wherein the focal length of the first lens element is f1, the focal length of the second lens element is f2, and the following relationship is satisfied:

$0 < f2/f1 < 0.50$.

11. The image capturing optical lens assembly of claim 10, wherein a sum of the central thickness from the first through fifth lens elements is $\Sigma CT$, an axial distance between an object-side surface of the first lens element and the image-side surface of the fifth lens element is Td, and the following relationship is satisfied:

$0.75 < \Sigma CT/Td < 0.90$.

12. The image capturing optical lens assembly of claim 9, wherein a distance in parallel with an optical axis from a critical point on the image-side surface of the fifth lens element to an axial vertex on the image-side surface of the fifth lens element is MSAG52, a central thickness of the fifth lens element is CT5, and the following relationship is satisfied:

$0.4 < MSAG52/CT5 < 1.5$.

13. The image capturing optical lens assembly of claim 9, wherein an axial distance between the third lens element and the fourth lens element is T34, an axial distance between the fourth lens element and the fifth lens element is T45, a central thickness of the fourth lens element is CT4, and the following relationship is satisfied:

$0 < (T34+T45)/CT4 < 0.50$.

14. The image capturing optical lens assembly of claim 9, further comprising:
    a stop located between the first lens element and the second lens element.

15. An image capturing optical lens assembly comprising, in order from an object side to an image side:
    a first lens element with positive refractive power;
    a second lens element with positive refractive power;
    a third lens element with negative refractive power;
    a fourth lens element with positive refractive power; and
    a fifth lens element with negative refractive power made of plastic material, and having an image-side surface being concave at a paraxial region and being convex at a peripheral region, wherein at least one of an object-side surface and the image-side surface of the fifth lens element is aspheric;
    wherein a focal length of the first lens element is f1, a focal length of the second lens element is f2, an axial distance between the third lens element and the fourth lens element is T34, an axial distance between the fourth lens element and the fifth lens element is T45, a central thickness of the fourth lens element is CT4, a focal length of the image capturing optical lens assembly is f, a curvature radius of an image-side surface of the third lens element is R6, and the following relationships are satisfied:

$0 < f2/f1 < 0.90$;

$0 < (T34+T45)/CT4 < 1.0$; and $-0.35 < f/R6 \leq 0.85$.

16. The image capturing optical lens assembly of claim 15, wherein the axial distance between the third lens element and the fourth lens element is T34, the axial distance between the fourth lens element and the fifth lens element is T45, the central thickness of the fourth lens element is CT4, and the following relationship is satisfied:

$0 < (T34+T45)/CT4 < 0.75$.

17. The image capturing optical lens assembly of claim 16, wherein the focal length of the image capturing optical lens assembly is f, the curvature radius of the image-side surface of the third lens element is R6, and the following relationship is satisfied:

$$0<f/R6<0.85.$$

18. The image capturing optical lens assembly of claim 17, wherein the object-side surface of the fifth lens element is convex at a paraxial region.

19. The image capturing optical lens assembly of claim 17, wherein the second lens element has an object-side surface being convex at a paraxial region, and the fourth lens element has an image-side surface being convex at a paraxial region.

20. The image capturing optical lens assembly of claim 19, wherein the axial distance between the third lens element and the fourth lens element is T34, the axial distance between the fourth lens element and the fifth lens element is T45, the central thickness of the fourth lens element is CT4, and the following relationship is satisfied:

$$0<(T34+T45)/CT4<0.50.$$

21. The image capturing optical lens assembly of claim 15, wherein the focal length of the first lens element is f1, the focal length of the second lens element is f2, and the following relationship is satisfied:

$$0<f2/f1<0.50.$$

22. The image capturing optical lens assembly of claim 21, wherein a sum of the central thickness from the first through fifth lens elements is ΣCT, an axial distance between an object-side surface of the first lens element and the image-side surface of the fifth lens element is Td, and the following relationship is satisfied:

$$0.75<\Sigma CT/Td<0.90.$$

23. The image capturing optical lens assembly of claim 21, wherein a distance in parallel with an optical axis from a critical point on the image-side surface of the fifth lens element to an axial vertex on the image-side surface of the fifth lens element is MSAG52, a central thickness of the fifth lens element is CT5, and the following relationship is satisfied:

$$0.4<MSAG52/CT5<1.5.$$

24. The image capturing optical lens assembly of claim 21, wherein an Abbe number of the first lens element is V1, an Abbe number of the second lens element is V2, and the following relationship is satisfied:

$$1.5<V2/V1<3.0.$$

25. The image capturing optical lens assembly of claim 21, further comprising:
a stop located between the first lens element and the second lens element.

26. An image capturing optical lens assembly comprising, in order from an object side to an image side:
a first lens element with positive refractive power;
a second lens element with positive refractive power having an object-side surface being convex at a paraxial region;
a third lens element with negative refractive power having an object-side surface being concave at a paraxial region;
a fourth lens element with positive refractive power made of plastic material, and having an object-side surface being concave at a paraxial region and an image-side surface being convex at a paraxial region, wherein the object-side surface and the image-side surface of the fourth lens element are aspheric; and
a fifth lens element with negative refractive power made of plastic material, and having an image-side surface being concave at a paraxial region and being convex at a peripheral region, wherein at least one of an object-side surface and the image-side surface of the fifth lens element is aspheric;
wherein the image capturing optical lens assembly further comprises a stop located between an object and the second lens element, a focal length of the first lens element is f1, a focal length of the second lens element is f2, a focal length of the fourth lens element is f4, a focal length of the image capturing optical lens assembly is f, a curvature radius of an image-side surface of the third lens element is R6, and the following relationships are satisfied:

$$0<f2/f1<0.90;$$

$$0<f4/f1<0.30; \text{ and}$$

$$-0.85 \leq f/R6 \leq 0.85.$$

27. The image capturing optical lens assembly of claim 26, wherein a sum of the central thickness from the first through fifth lens elements is ΣCT, an axial distance between an object-side surface of the first lens element and the image-side surface of the fifth lens element is Td, and the following relationship is satisfied:

$$0.75<\Sigma CT/Td<0.90,$$

28. The image capturing optical lens assembly of claim 27, wherein the focal length of the first lens element is f1 the focal length of the second lens element is f2, and the following relationship is satisfied:

$$0<f2/f1<0.50.$$

29. The image capturing optical lens assembly of claim 27, wherein a distance in parallel with an optical axis from a critical point on the image-side surface of the fifth lens element to an axial vertex on the image-side surface of the fifth lens element is MSAG52, a central thickness of the fifth lens element is CT5, and the following relationship is satisfied:

$$0.4<MSAG52/CT5<1.5$$

30. The image capturing optical lens assembly of claim 27, wherein the stop is located between the first lens element and the second lens element.

* * * * *